(12) United States Patent
Favero et al.

(10) Patent No.: US 10,206,534 B2
(45) Date of Patent: Feb. 19, 2019

(54) SYSTEM FOR THE PREPARATION OF A BEVERAGE

(71) Applicants: Koninklijke Douwe Egberts B.V., Utrecht (NL); Koninklijke Philips Electronics N.V., Eindhoven (NL)

(72) Inventors: Andrea Favero, Quarto d'Altino (IT); Guiseppe Fin, Meolo (IT); Ka Cheung Tsang, Utrecht (NL); Ralf Kamerbeek, De Meern (NL); Hendrik Cornelis Koeling, Amersfoort (NL); Angenita Dorothea van Loon-Post, Utrecht (NL)

(73) Assignees: Koninklijke Douwe Egberts B.V., Utrecht (NL); Koninklijke Philips Electronics N.V., Eindhoven (NL)

( * ) Notice: Subject to any disclaimer, the term of this patent is extended or adjusted under 35 U.S.C. 154(b) by 748 days.

(21) Appl. No.: 13/765,536

(22) Filed: Feb. 12, 2013

(65) Prior Publication Data

US 2013/0276635 A1 Oct. 24, 2013

Related U.S. Application Data

(63) Continuation of application No. PCT/EP2011/062740, filed on Jul. 25, 2011.

(30) Foreign Application Priority Data

Aug. 13, 2010 (IT) .................................. FI2010A0178
Oct. 11, 2010 (WO) .................. PCT/EP2010/065212

(Continued)

(51) Int. Cl.
*A47J 31/00* (2006.01)
*A47J 31/40* (2006.01)
*A47J 31/36* (2006.01)

(52) U.S. Cl.
CPC ......... *A47J 31/407* (2013.01); *A47J 31/3633* (2013.01); *A47J 31/3638* (2013.01)

(58) Field of Classification Search
CPC combination set(s) only.
See application file for complete search history.

(56) References Cited

U.S. PATENT DOCUMENTS 5,555,791 A * 9/1996 McNeill .............. A47J 31/4467
          210/480
5,776,527 A * 7/1998 Blanc .................. A47J 31/3633
          206/5

(Continued)

FOREIGN PATENT DOCUMENTS

CN       101703363        5/2010
EP     1 721 553 A1      11/2006
(Continued)

OTHER PUBLICATIONS

English Translation of EP 2077087A1, Jing Aug. 7, 2009.*
(Continued)

*Primary Examiner* — Anne M Antonucci
*Assistant Examiner* — Renee LaRose
(74) *Attorney, Agent, or Firm* — Foley & Lardner LLP

(57) ABSTRACT

A system, device and method for the brewing of a capsule. The device comprises a first chamber portion and a second chamber portion movable with respect to each other to be moved between an open position and a closed position. The device further comprises a capsule handler arranged to enable insertion therein of the capsule and to position said capsule in a brewing position, wherein the capsule handler retains the capsule in the brewing position when the capsule handler is in a ready position. When the first chamber portion and the second chamber portion are moved with respect to each other from the closed position to the open position, the capsule can fall freely from the brewing posi- (Continued)

tion under the influence of gravity when the capsule handler is in an ejection position.

10 Claims, 28 Drawing Sheets

(30) Foreign Application Priority Data

Dec. 13, 2010 (EP) .................................... 10194741
Apr. 27, 2011 (WO) ................. PCT/EP2011/056680

(56) References Cited

U.S. PATENT DOCUMENTS

| | | | |
|---|---|---|---|
| 6,182,554 B1* | 2/2001 | Beaulieu | A47J 31/3628 99/289 R |
| 6,941,855 B2 | 9/2005 | Denisart et al. | |
| 7,059,239 B2 | 6/2006 | Balkau | |
| 7,703,380 B2* | 4/2010 | Ryser | A47J 31/3633 99/295 |
| 8,079,300 B2* | 12/2011 | Jing | A47J 31/3633 99/289 R |
| 8,613,247 B2 | 12/2013 | Deuber | |
| 2002/0002913 A1* | 1/2002 | Mariller | A47J 31/3633 99/495 |
| 2003/0066431 A1* | 4/2003 | Fanzutti | A47J 31/36 99/279 |
| 2005/0126400 A1* | 6/2005 | Bragg | A47J 31/0673 99/279 |
| 2005/0129809 A1* | 6/2005 | Cortese | A47J 31/3633 426/77 |
| 2007/0221066 A1* | 9/2007 | Sullivan | A47J 31/3695 99/279 |
| 2008/0115674 A1* | 5/2008 | Huang | A47J 31/32 99/279 |
| 2009/0308258 A1* | 12/2009 | Boussemart | A47J 31/3633 99/295 |
| 2010/0037779 A1* | 2/2010 | Pecci | A47J 31/3633 99/289 R |
| 2010/0101428 A1* | 4/2010 | Fin | A47J 31/3638 99/295 |
| 2013/0276635 A1 | 10/2013 | Favero et al. | |

FOREIGN PATENT DOCUMENTS

| | | |
|---|---|---|
| RU | 2003132057 A | 2/2005 |
| RU | 2288627 C2 | 12/2006 |
| RU | 2324419 C2 | 5/2008 |
| WO | WO-2005/016094 A1 | 2/2005 |
| WO | WO-2009/118269 A1 | 10/2009 |
| WO | WO 2010/103044 | 9/2010 |

OTHER PUBLICATIONS

International Search Report for International Application No. PCT/EP2011/062740, dated Nov. 15, 2011, 5 pages.
Australian Examination Report, Australian App. No. 2016202189, Koninklijke Douwe Egberts B.V. et al., 2 pages (Jul. 28, 2017).
Canadian Office Action, Canadian App. No. 2,814,999, Koninklijke Douwe Egberts B.V. et al., 3 pages (dated May 1, 2017).

* cited by examiner

SYSTEM FOR THE PREPARATION OF A BEVERAGE

CROSS REFERENCE TO RELATED APPLICATIONS

The present application is a continuation of International Patent Application Serial No. PCT/EP2011/062740 filed on Jul. 25, 2011; which claimed priority to Italian Application No. FI2010A000178 filed on Aug. 13, 2010, International Application No. PCT/EP2010/065212 filed on Oct. 11, 2010, European Application No. 10194741.4 filed on Dec. 13, 2010, and International Application No. PCT/EP2011/056680 filed on Apr. 27, 2011—all of which are hereby incorporated herein by reference.

BACKGROUND

The invention relates to a device for preparing a beverage suitable for consumption from a capsule comprising beverage ingredients. The invention also relates to a system comprising such device and a capsule, and to a method for preparing a beverage suitable for consumption from a capsule comprising beverage ingredients.

The present invention relates to the field of the machines for producing drinks or other food products by brewing starting from capsules containing the product therein.

More in particular, but not exclusively, an object of the present invention is a brewing device for preparing coffee or other hot drinks by e.g. extraction or dilution of substances contained in, generally single-dose, capsules.

Furthermore, an object of the invention is also a machine for producing food products comprising said brewing device and also a method for implementing brewing of a beverage using a capsule by means of a brewing device.

As it is known, for preparing hot beverages and other food products apparatuses are ever more frequently used, which utilize packagings, that is usually single-dose capsules, inside of which a substance is contained which is to be dissolved, e.g. in water, or from which an aroma is to be extracted by means of the passage of a liquid, such as hot water. Such apparatuses or machines are typically used for preparing coffee drinks.

Hereinafter, both with reference to the present description and to the enclosed claims, under capsule any type of packaging, usually a single-dose type, is meant, adapted to be used in this type of apparatuses. Such capsule can be sealed, to be pierced with a suitable piercing member or equipped with a pervious, e.g. permeable to the water, surface, so as not to require perforation. Herein, under the term capsule a packaging implemented with non-woven fabric or other permeable material, technically commonly designated as "pod" or "pad" is also meant.

Devices for preparing a beverage suitable for consumption from a capsule comprising beverage ingredients are generally known. Some of these devices are known as "front loading" devices, wherein the capsule is inserted in a slot or drawer at the front of the device. Other devices are known as "top loading" devices, wherein the capsule is inserted in a slot at the top of the device. It will be appreciated that front loading and top loading devices each provide their own possibilities and difficulties with respect to machine design options and user convenience. Also, it will be appreciated that the complexity or simplicity of construction may vary widely depending on the nature of the device. Especially, ejecting of the capsule after preparing the beverage may add to the complexity of the construction of some devices.

SUMMARY

It is one object of the invention to provide a device with a loading and/or ejecting mechanism of reduced complexity. It is also an object of the invention to provide an alternative capsule loading and ejection mechanism. It is further an object of the invention to provide an alternative device which may be designed as either top lading or front loading, or even another category of devices in order to improve design options and user convenience.

A very widespread type of device for brewing or extracting drinks from single-dose capsules provides the use of a brewing chamber, usually implemented in two portions which can be translated one with respect to the other one between an open and a closed configuration. Of such two chamber portions, one portion may be fixed with respect to a frame of the device wherein the brewing chamber is defined. The other chamber portion may translated by means of a (lever) mechanism actuated by the user (typically a lever associated to a piston rod, in turn, hinged to the chamber portion which has to be translated).

A further object of the present invention is to implement a new brewing device for preparing coffee or other drinks resulting to be particularly simple both in constructive and use terms.

A further important task of the present invention is to develop a brewing device for preparing coffee or other drinks which is particularly reliable.

A further object of the present invention is to develop a method for producing drinks by means of a brewing device which is easy and economical to be implemented.

Thereto, according to the invention is provided a beverage preparation device comprising:
  a first chamber portion; and
  a second chamber portion,
    wherein the first chamber portion and the second chamber portion are movable with respect to each other to be moved between an open position and a closed position, wherein in the open position a capsule can be inserted between the first chamber portion and the second chamber portion in a brewing position from which the capsule cannot escape in the closed position of the first chamber portion and the second chamber portion;
    wherein the device further comprises a capsule handler arranged to enable insertion therein of the capsule and to position said capsule in the brewing position, wherein the capsule handler is movable between a ready position and an ejection position,
    wherein the capsule handler is arranged for retaining the capsule in the brewing position when the capsule handler is in the ready position, and
    wherein when the first chamber portion and the second chamber portion are moved with respect to each other from the closed position to the open position, the capsule can fall freely from the brewing position under the influence of gravity when the capsule handler is in the ejection position.

According to the invention is also provided a system for the preparation of a beverage using a capsule, the system comprising a beverage preparation device and a capsule, wherein the device comprises:
  a first chamber portion; and
  a second chamber portion, wherein the first chamber portion and the second chamber portion are movable with respect to each other to be moved between an open position and a closed position, wherein in the open position the capsule can be inserted between the first chamber portion and the second chamber portion in a brewing position from which the capsule cannot escape in the closed position of the first chamber portion and the second chamber portion;

wherein the device further comprises a capsule handler arranged to enable insertion therein of the capsule and to position said capsule in the brewing position, wherein the capsule handler is movable between a ready position and an ejection position, wherein the capsule handler and the capsule are adapted to each other such that the capsule handler retains the capsule in the brewing position when the capsule handler is in the ready position, and that when the first chamber portion and the second chamber portion are moved from the closed position to the open position, the capsule can fall freely from the brewing position under the influence of gravity when the capsule handler is in the ejection position.

It will be appreciated that the capsule handler provides the advantage that the capsule is already retained in the brewing position ready for brewing when the capsule handler is in the ready position. Hence, the capsule can be pre-positioned in the brewing position before the first chamber portion and the second chamber portion enclose the capsule for brewing. This allows for more accurate positioning of the capsule. This also allows for less complex movement of the capsule inside the device. Thus, the reliability of the device may be improved and the cost of the device may be decreased.

Optionally, the capsule handler comprises retaining means for retaining the capsule in the capsule handler when the capsule handler is in the ready position. Hence retaining of the capsule, e.g. in the brewing position when the capsule handler is in the ready position, is simplified.

Optionally, the capsule handler comprises guide means for guiding the capsule to the brewing position. Herein, the guide means may be arranged for engaging the capsule both when the capsule handler is in the ready position and in the ejection position. Thus the capsule may be guided both upon insertion into the device and upon ejection from the brewing position.

Optionally, the capsule handler is movable between the ready position and the ejection position in a direction substantially parallel to a guiding direction of the guide means.

Optionally, the capsule handler is movable in a direction substantially perpendicular to a moving direction of the first chamber portion. Hence a very simple movement of the capsule handler and first chamber portion relative to each other may be obtained. Optionally, the capsule handler is movable in a direction substantially perpendicular to a moving direction of the second chamber portion.

Optionally, the capsule handler is movable with respect to the first chamber portion and the second chamber portion.

Optionally, the capsule handler is immobile in a direction of movement of the first chamber portion and/or the second chamber portion. Hence, the capsule handler may define a brewing position for the capsule in the direction of movement of the first chamber portion and/or the second chamber portion, while allowing movement of the capsule handler between the ready position and the ejection position in a direction substantially perpendicular to the direction of movement of the first chamber portion and/or the second chamber portion.

Preferably, the capsule comprises guiding means that can comprise a guiding edge, e.g. in the form of a flange. The guide means of the capsule handler may comprise two rails arranged for engaging the guiding edge of the capsule. Optionally, the guide means comprise slides for slidingly guiding the guiding edge of the capsule to the brewing position of the capsule in the capsule handler.

The retaining means may be arranged for abutting against the guiding edge when the capsule is located in the brewing position in the capsule handler when positioned in the ready position.

Optionally, the retaining means may be arranged within the guide rails. Optionally, the guide means, e.g. the guide rails, and the retaining means are movable in unison. Optionally, the capsule handler is arranged for forcing the retaining means beyond the capsule. Thereto, the retaining means, the capsule handler and/or at least a portion of the capsule interacting with the retaining means may be flexible. Thus, the capsule may be flexed beyond the retaining means and/or the retaining means may be flexed beyond the capsule.

Optionally, the capsule handler is arranged for having the retaining means pass a widest point of the guiding edge when the capsule handler moves from the ready position to the ejection position when the capsule is in the brewing position. Optionally, the capsule handler is arranged to move upwardly in a plane in which the guiding edge extends when the capsule handler moves from the ready position to the ejection position when the capsule is in the brewing position.

The retaining means may be formed by a passage of the capsule handler having a transverse dimension that is slightly smaller than a transverse dimension of a portion of the capsule interacting with the retaining means. Optionally, the retaining means comprises at least one, preferably two, protrusion. The at least one protrusion may be substantially rigid. The capsule handler, comprising the two protrusions, and being movable with respect to the first chamber portion and the second chamber portion enables that the retaining means are moved to pass beyond the capsule such that the two protrusions move in the same direction with respect to the capsule. This enables a simpler movement of the retaining means than for instance retaining means moving in mutually opposite directions.

Alternatively, or additionally, the retaining means may be retractable. Thereto, the retaining means may be activated with a mechanism comprising actuators, rods, levers, cams, wires or the like.

Optionally, the capsule handler is arranged for positioning an exit face of the capsule against, or close to, a brewing plate of the second chamber portion when the capsule is in the brewing position in the capsule handler. The brewing plate may be immobile with respect to the capsule in the brewing position in the capsule handler. Hence a simple device construction may be obtained. Alternatively, the brewing plate may be mobile with respect to the capsule in the brewing position in the capsule handler. Hence, easy inserting the capsule into the brewing position or ejecting the capsule from the brewing position may be facilitated.

Optionally, the second chamber portion may be arranged to remain immobile while the first chamber portion is moved from the open position to the closed position, and is arranged to move relative to the brewing position in a direction substantially opposite to the direction of movement of the first chamber portion from the closed position to the open position after brewing. Herein the second chamber portion 12 is not moved prior to brewing, i.e. between the moment the device is ready to accept a capsule and actually brewing the beverage using that capsule. The second chamber portion may remain immobile in a position such that the capsule abuts against the second chamber portion upon insertion of the capsule into the brewing position. Also herein the second chamber portion may be moved away from the capsule that is in the loading position upon opening of the device. Thus, accurate loading of the capsule abutting against the second chamber portion may be combined with easy unloading of the capsule when the second chamber portion is moved away from the capsule. It will be appreciated that the second chamber portion may start moving simultaneously with the first chamber portion. It is also possible that the second chamber portion starts moving earlier or later than the first chamber portion.

Optionally at least a part, e.g. a leading edge, of the first chamber portion and the capsule handler are adapted to each other such that the part of the first chamber portion can pass into the capsule handler, e.g. to abut against a rim of the capsule. This may allow leak-tight closing of the first chamber portion onto the capsule.

Optionally, at least a part, e.g. a leading part, of the second chamber portion and the capsule handler are adapted to each other such that the part of the second chamber portion can pass into the capsule handler, e.g. abut against an exit face of the capsule. Thus, the capsule can be allowed to abut the second chamber portion immediately upon insertion into the device.

Optionally, the device is arranged such that the capsule handler is positioned in the ready position when the device is ready for insertion of the capsule. Hence, the capsule immediately reaches the brewing position upon insertion into the capsule handler.

Alternatively, the capsule handler is movable from a loading position, different from the ready position, to the ready position, and the device is arranged such that the capsule handler is positioned in the loading position when the device is ready for insertion of the capsule. Hence, the capsule handler is to be transported from the loading position to the ready position for transporting the capsule to the brewing position upon insertion of the capsule. This may provide additional design freedom for the device.

Optionally, the capsule handler is arranged such that when the capsule handler is in the loading position, the retaining means retain the capsule in an insertion position different from the brewing position. The capsule handler may be arranged for transporting the capsule from the insertion position to the ready position while maintaining the capsule substantially immobile with respect to the capsule handler.

Optionally, the capsule handler is arranged to be swivelled about a swivel axis from the ready position to the ejection position. Optionally, the capsule handler is arranged to be swivelled about the swivel axis from the loading position to the ready position.

The capsule handler may be separate from the first chamber portion and the second chamber portion.

Optionally, the capsule handler is a monolithic part. The capsule handler may e.g. be a single injection moulded, e.g. plastics, part. This greatly reduces complexity of the device. Preferably, at least a portion of the capsule handler holding the capsule in the brewing position and/or in the loading position is a monolithic part. The retaining means may form an integral part of the monolithic capsule handler. Hence the capsule handler including the retaining means may be a monolithic part.

Preferably, the device is arranged such that individual displacements of the capsule handler and the first chamber portion are coupled, such that the capsule handler reaches the ejection position from the ready position prior to the first chamber portion reaching the open position starting from the closed position.

Optionally, the device is arranged such that the individual displacements of the capsule handler and the first chamber portion are coupled such that a start of displacing the first chamber portion from the closed position to the open position lags with respect to a start of displacing the capsule handler from the ready position to the ejection position.

Optionally, the device is arranged such that the individual displacements of the capsule handler and the first chamber portion are coupled, such that the capsule handler reaches the ready position from the loading position prior to the first chamber portion reaching the closed position from the open position.

Optionally, the device is arranged such that the individual displacements of the capsule handler and the first chamber portion are coupled, such that a start of displacing the first chamber portion from the open position to the closed position lags with respect to a start of displacing the capsule handler from the loading position to the ready position.

Optionally, the device further comprises a receptacle for receiving at least part of the capsule when inserted in the capsule handler, wherein the receptacle is arranged such that the capsule handler is movable with respect to the receptacle. Preferably, the receptacle comprises a mobile part arranged for opening the receptacle for allowing the capsule to exit the receptacle in order to be moved to the brewing position.

In a preferred embodiment the capsule comprises an extractable product, such as roast and ground coffee. Hence the device may be used for preparing a beverage such as a coffee beverage, such as espresso or long coffee.

The capsule may comprise a porous and/or perforate entrance face and/or exit face for allowing fluid to enter and/or beverage to exit the capsule, respectively. Preferably, the capsule is designed for preparing a single serving of beverage, such as a single cup of beverage. Preferably, the capsule is designed as a single-use capsule, i.e. to be disposed after single use.

Optionally, the system according to the invention is such that the capsule comprises an actuating member, and that the beverage preparation device comprises:

a capsule holder arranged for holding the capsule,
a fluid supply unit arranged for supplying a fluid towards the capsule when the capsule is in the capsule holder,
a flow control unit arranged for controlling a parameter of the fluid to be supplied towards the capsule, wherein the flow control unit is arranged for selectively operating in one of at least a first mode and a second mode, wherein in the first mode the parameter is adjusted to a first level, and in the second mode the parameter is adjusted to a second level, different from the first level,
wherein the flow control unit comprises a switching member movable between a first position and a second position, and the switching member being arranged for being engaged by the actuating member of the capsule to be positioned in the first or second position when the capsule is in the capsule holder, and
wherein the system is arranged such that the flow control unit is in the first mode when the switching member is in the first position, and wherein the flow control unit is in the second mode when the switching member is in the second position.

Herein the capsule holder may comprise (part of) the first chamber portion. Herein the capsule may comprise a, preferably substantially rigid, cup-shaped body and a lid for closing the body.

This provides the advantage that the system may be operated in the first mode or in the second mode, depending on a characteristic of the actuating member, and/or on the presence or absence of the actuating member. Moreover, the actuating member and/or the switching member may aid in easily correctly positioning the capsule in the capsule holder. Thus, the capsule may be positioned in the brewing position by the capsule handler and positioning of the capsule in the capsule holder may be aided by the actuating member and/or the switching member, so that very accurate positioning of the capsule in the brewing position is possible.

Optionally, the switching member is positioned in a first recess of an inner wall of the capsule holder, and/or the actuating member is positioned in a second recess of an outer contour of the capsule.

Optionally, the switching member is recessed in the first recess with respect to the inner wall of the capsule holder, and/or the actuating member is recessed in the second recess with respect to the outer contour of the capsule.

Preferably, the parameter is one or more of flow rate, pressure and volume of the fluid to be supplied t the capsule. The parameter may also be one or more of temperature, time duration of supplying the fluid to the capsule, flow rate of the fluid to be supplied to the capsule as a function of time, pressure of the fluid to be supplied to the capsule as a function of time, volume of the fluid to be supplied to the capsule as a function of time, and temperature of the fluid to be supplied to the capsule as a function of time.

Thus, when the capsule having the actuating member is introduced into the device, the actuating member of the capsule may automatically engage the switching member to be positioned in the second position. Hence the flow control unit will be in the second mode. This causes the device to provide the fluid with the parameter, e.g. the flow rate and/or pressure, at the second level. Preferably, the second level is set so as to allow the beverage to be prepared. Alternatively, when no capsule is introduced into the device, no actuating member will be present, so that the switching member may be in the first position. Hence, the flow control unit will be in the first mode. In this case the device automatically provides the fluid with the parameter, e.g. the flow rate and/or pressure, at the first level. This may be referred to as a default mode. It will be appreciated that the first level may be set so as to provide sufficient flow rate and/or pressure for rinsing the device, whereas the first level flow rate and/or pressure may be set to be sufficiently low to remove, or at least diminish, the risk presented to the user. Thereto, the flow rate and/or pressure in the first mode may be smaller than the flow rate and/or pressure in the second mode. It will be appreciated that both the first level and the second level are to be chosen such that the flow rate and pressure of the fluid supplied to the capsule are non-zero.

Alternatively, when a capsule not having an actuating member is introduced into the device, no actuating member will be present, so that the switching member may be in the first position. Hence, the flow control unit will be in the first mode. In this case, the device automatically provides the fluid with the parameter, e.g. the flow rate and/or pressure, at the first level. The first level may be set so as to allow a first type of beverage to be prepared. When a capsule having the actuating member is introduced into the device, the actuating member of the capsule may automatically engage the switching member to be positioned in the second position. Hence the flow control unit will be in the second mode. This automatically causes the device to provide the fluid with the parameter, e.g. the flow rate and/or pressure, at the second level. The second level may be set so as to allow a second type of beverage to be prepared. This may provide versatility in the preparation of beverages. It is for instance possible to prepare a first type of beverage at a lower pressure, e.g. tea or American coffee, using the first mode and to prepare a second type of beverage at a higher pressure, e.g. espresso coffee, using the second mode.

Alternatively, when a first capsule having an actuating member is introduced into the device the actuating member of the first capsule may automatically engage the switching member to be positioned in the first position. Hence, the flow control unit will be in the first mode. In this case, the device automatically provides the fluid with the parameter, e.g. the flow rate and/or pressure, at the first level. The first level may be set so as to allow a first type of beverage to be prepared using the first capsule. When a second capsule having a different actuating member is introduced into the device, the different actuating member of the second capsule may automatically engage the switching member to be positioned in the second position. Hence the flow control unit will be in the second mode. This automatically causes the device to provide the fluid with the parameter, e.g. the flow rate and/or pressure, at the second level. The second level may be set so as to allow a second type of beverage to be prepared using the second capsule. This may provide versatility in the preparation of beverages. It is for instance possible to prepare a first type of beverage at a lower pressure, e.g. tea or American coffee, using the first mode and a first capsule having an actuating member, and to prepare a second type of beverage at a higher pressure, e.g. espresso coffee, using the second mode and a second capsule having a different actuating member.

It will be appreciated that the switching member being recessed in a first recess with respect to the inner wall of the capsule holder provides the advantage that the switching member is protected from damage, e.g. by foreign objects. It will be appreciated that the actuating member being recessed in a second recess with respect to the outer contour of the capsule, provides the advantage that the actuating member is protected from damage, e.g. during manufacture, transport or handling of the capsule. Thus, the system according to the invention is robust. Optionally, the switching member is recessed with respect to the inner wall of the capsule holder, and the actuating member is recessed with respect to the outer contour of the capsule.

Optionally, the inner wall of capsule holder comprises a protruding portion, and the switching member is recessed with respect to said protruding portion. This provides the advantage that the protruding portion may form a protecting wall surrounding the switching member.

Optionally, the protruding portion of the inner wall of the capsule holder extends into the second recess of the capsule when the capsule is in the capsule holder. Hence, the capsule and the device may mesh, providing extra protection for the switching member and the actuating member.

Optionally, the actuating member, such as the protrusion, is positioned at an axis of symmetry of the capsule. The axis of symmetry may be such that the capsule is rotation symmetric about said axis. This provides the advantage that the rotational orientation of the capsule within the device is not important and the actuating member will always be correctly positioned with respect to the device, so that insertion of the capsule into the device is easy for the consumer.

Optionally, the switching member is positioned at an axis coaxial with the axis of symmetry of the capsule when the capsule is in the capsule holder. Thus, the switching member may be positioned such that the rotational orientation of the capsule within the device is not important and the actuating member will always be correctly positioned with respect to the switching member. The switching member may be positioned at an axis of symmetry of the capsule holder. More in general, at least part of the switching member may be positioned coaxial with the actuating member when the capsule is in the capsule holder.

In an embodiment, the actuating member is a projection of the capsule. This provides for ease of manufacture of a capsule including the actuating member. Also the projection can engage the switching member, in a simple manner. The switching member may be part of a switch, preferably arranged to interact with the projection of the capsule.

Preferably, the projection is comprised in the second recess of the capsule, such that the projection substantially resides within an outer contour of the cup-shaped body. Hence, the projection is protected against deformation or other damage during manufacture, transport or handling. Hence, the correct functioning of the projection can be assured. Thus, the protruding portion of the inner wall of the capsule holder may extend into the second recess of the capsule when the capsule is in the capsule holder, while the actuating member, in the form of the projection of the capsule, extends into the protruding portion of the inner wall of the capsule holder for engaging the switching member that is recessed in the first recess within the protruding portion.

Preferably, a maximum width of the second recess is less than six times a minimum width of the projection, more preferably less than four times. Hence, the projection is closely held in the recess, even better protecting against damage or tampering.

Optionally, the system comprises optical detection means for detecting the position of the switching member. Hence, mechanical wear of the system is minimized. The optical detection means may comprise at least one light barrier unit. Such light barrier units are known per se and normally include a light source and a light detector. The light source and light detector are normally positioned facing each other along an optical path. The switching member may comprise a vane for selectively obstructing or freeing an optical path of the at least one light barrier unit.

Optionally, the system comprises magnetic detection means for detecting the position of the switching member. Thus too, mechanical wear may be minimized. The magnetic detection means may comprise at least one magnetic induction sensor. The switching member may comprise a magnetic indicator, such as a magnet or a magnetisable part, for being detected by the magnetic induction sensor. Normally the magnetic indictor is detected when sufficiently close to the magnetic induction sensor, and is not detected when sufficiently remote from the magnetic induction sensor. This provides a simple way of determining whether the magnetic indictor is at a predetermined position near the magnetic induction sensor or not.

Optionally, the system comprises optical detection means for detecting the position of the actuating member. The optical detection means may comprise at least one light barrier unit. The actuating member may comprises a vane for selectively obstructing or freeing the optical path of the at least one light barrier unit.

Optionally, the system comprises magnetic detection means for detecting the position of the actuating member. The magnetic detection means may comprise at least one magnetic induction sensor. The actuating member comprises a magnetic indicator for being detected by the magnetic detection means.

Optionally, the flow control unit comprises a valve for controlling the flow rate of the fluid. Alternatively, the flow control unit comprises a valve for controlling the pressure of the fluid. Alternatively, the flow control unit comprises a valve for controlling the flow rate and/or the pressure of the fluid. Hence, the flow rate and/or pressure can be controlled in a simple manner.

Optionally, the valve is mechanically actuated by the actuating member of the capsule. This provides for a mechanically simple and reliable system. The actuating member of the capsule, e.g. the projection, may e.g. interact, directly or indirectly, with a stem or head of the valve. The switching member may e.g. be coupled with the stem or head. The switching member may e.g. be part of the stem or head of the valve.

Alternatively, or additionally, the valve is actuated by an electronic, electric, magnetic, pneumatic and/or hydraulic actuator. Said electronic, electric, magnetic, pneumatic and/or hydraulic actuator may be activated by the switching member. The switching member may e.g. be part of an electrical switch, actuation of which causes the valve to be actuated electrically, magnetically, pneumatically and/or hydraulically. The switching member may also be part of a pneumatic or hydraulic switch actuation of which causes the valve to be actuated electrically, magnetically, pneumatically and/or hydraulically.

Optionally, the valve is arranged such that the flow rate and/or pressure in the first mode is smaller than the flow rate and/or pressure in the second mode.

Optionally, the flow control unit is arranged for instructing the fluid supply unit to control the flow rate and/or pressure of the fluid to be supplied to the capsule.

Optionally, the valve is designed as a leaking valve, such that in the first mode the valve is in a closed position but allowed to leak, and in the second mode the valve is in an open position. The valve switching between the closed and the open position, wherein in the closed position the valve leaks, in a very simple manner provides that the flow rate and/or pressure in the first mode differs from the flow rate and/or pressure in the second mode. The leaking valve in a simple manner may provide the flow rate and/or pressure at the first level, e.g. for rinsing.

Optionally, the switching member is in the first position when the switching member is not engaged by an actuating member of a capsule. This provides any easy activation of the first mode, e.g. as rinse mode.

Optionally, the switching member is in the second position upon engagement by an actuating member of a capsule. Optionally, the switching member is in the first position upon engagement by a different actuating member of a capsule.

Optionally, the flow control unit is arranged for further operating in a third mode, wherein in the third mode the parameter, e.g. the flow rate, volume and/or pressure, is adjusted to a third level, different from the first level and the second level. It will be appreciated that the flow control unit may also be arranged to operate in more than three different modes. The third mode may be activated by the capsule having a second actuating member differing from the actuating member activating the second mode. The second actuating member may also differ from an actuating member activating the first mode. Optionally, the switching member is in a third position upon engagement by the second actuating member of a capsule. Nevertheless, the second actuating member is preferably located at the same position on the capsule and preferably differs in only one aspect, e.g. the length of the protrusion.

Providing more than two modes to be actuated with the similar actuating members provides the advantage that not a plurality of actuating members needs to be present on a single capsule, but that a single actuating member per capsule suffices. For instance, a single protrusion of the capsule may cause the device to operate in one of more than two modes by its length when present and/or by its absence. This can even more easily be implemented when the actuating member is positioned at the axis of symmetry of the capsule as described hereinabove.

The control unit may also be arranged to allow stepless control of the parameter, e.g. the flow rate, volume and/or pressure, between a minimum and maximum level. The length of the projection may be representative for the flow rate and/or pressure and/or volume. It is possible that the flow rate is proportional to a length of the projection of the capsule. It is also possible that the pressure is proportional to the length of the projection of the capsule. It is also possible that the volume is proportional to the length of the projection of the capsule.

Optionally, the system comprises a first capsule and a second capsule. The first capsule may comprise a first actuating member. The second capsule may comprise a second actuating member, different from the first actuating member. The first actuating member may be arranged to have the flow control unit operate in the second mode. The second actuating member may be arranged to have the flow control unit operate in the third mode. The first actuating member may e.g. be a projection having a first length and the second actuating member may be a similar projection, at the same position on the capsule, but having a second length, different from the first length.

Thus, when the capsule having the first actuating member is introduced into the device, the first actuating member of the capsule automatically causes the device to provide the fluid with the parameter, e.g. the flow rate and/or pressure, at the second level. The second level may be set so as to allow a first type of beverage to be prepared. When the capsule having the second actuating member is introduced into the device, the second actuating member of the capsule automatically causes the switching member to be in a third position. This causes the device to provide the fluid with the parameter, e.g. the flow rate and/or pressure, at the third level. The third level may be set so as to allow a second type of beverage to be prepared. This may provide versatility in the preparation of beverages. It is for instance possible to prepare the first type of beverage at a lower pressure, e.g. tea or American coffee, and to prepare the second type of beverage at a higher pressure, e.g. espresso coffee. Additionally, when no capsule is introduced into the device, no actuating member will be present, so that the device automatically provides the fluid with the flow rate and/or pressure at the first level. It will be appreciated that the first level may be set so as to provide sufficient flow rate and/or pressure for rinsing the device, whereas the first level flow rate and/or pressure may be set to be sufficiently low to remove, or at least diminish, the risk presented to the user. Thereto, the flow rate and/or pressure in the first mode may be smaller than the flow rate and/or pressure in the second mode and the third mode. It will be appreciated that causing the device to provide the fluid with the flow rate and/or pressure at the first level may also be obtained by providing a third capsule with a further actuating member, having a length different from the first and second actuating members. This may also be utilised for preparing a third type of beverage.

Optionally, the capsule of the system comprises a beverage ingredient, preferably an extractable product, such as roast and ground coffee.

Optionally, the capsule comprises porous and/or perforate entrance face and/or exit face for allowing fluid to enter and/or beverage to exit the capsule, respectively.

Optionally, the capsule suitable for use in the beverage preparation device according to the invention comprises a cleaning agent and/or descaling agent for cleaning and/or descaling the device, respectively. Suitable cleaning agents and descaling agents are known per se. It will be appreciated that the capsule comprising the cleaning agent and/or descaling agent need not necessarily comprise an actuating member, since cleaning and/or descaling may be performed in the default mode as described hereinabove.

The invention also relates to a beverage preparation device of the system as described hereinabove. Such device may comprise a capsule holder arranged for holding a capsule, a fluid supply unit arranged for supplying a fluid towards the capsule when the capsule is in the capsule holder, a flow control unit arranged for controlling a parameter of the fluid to be supplied towards the capsule, wherein the flow control unit is arranged for selectively operating in one of at least a first mode and a second mode, wherein in the first mode the parameter is adjusted to a first level, and in the second mode the parameter is adjusted to a second level, different from the first level, wherein the flow control unit comprises a switching member movable between a first position and a second position, the switching member being arranged for being engaged by the actuating member of the capsule to be positioned in the first or second position when the capsule is in the capsule holder, and wherein the flow control unit is arranged such that the flow control unit is in the first mode when the switching member is in the first position, and wherein the flow control unit is in the second mode when the switching member is in the second position. Optionally, the switching member is positioned in a first recess of an inner wall of the capsule holder.

The beverage preparation device may be part of a more complex machine, for example a coffee machine, equipped with additional members known per se such as one or more of a water reservoir, heater, a pump for supplying water under pressure, a beverage dispensing spout, a waste container for used capsules, etc.

The invention also relates to a capsule of the system according to the invention. As mentioned, such capsule may comprise a beverage ingredient. It is also possible that such capsule comprises a cleaning agent and/or descaling agent for cleaning and/or descaling the beverage preparation device as described hereinabove. It will be clear that such capsule may comprise an actuating member. Such capsule may also lack an actuating member, e.g. to activate a default mode of the beverage preparation device.

According to an aspect of the invention is provided a capsule for preparing a consumable beverage in a beverage preparation device, comprising:

a, preferably substantially rigid, cup-shaped body,
a lid for closing the body, and an actuating member arranged for engaging a switching member of the beverage preparation device.

It will be appreciated that such capsule may be used for preparing the beverage in the beverage preparation device of the system as described hereinabove. Such capsule may engage the switching member of said beverage preparation device.

Preferably, the actuating member is a projection of the capsule. This can be manufactured easily. The projection may e.g. be a pin extending from the cup-shaped body. The pin may e.g. be 0.5-4 mm wide. The pin may e.g. be 1-6 mm long.

The cup-shaped body may substantially be manufactured from a plastics material, e.g. by means of injection moulding. The projection may be a, purposive, elongation of the injection location of the cup-shaped body. Hence the projection can easily be incorporated in the design of the cup-shaped body.

Optionally, the projection is comprised in a recess of the capsule, such that the projection substantially resides within the outer contour of the cup-shaped body. Hence, the projection is protected against deformation or other damage during manufacture, transport or handling. Hence, the correct functioning of the projection can be assured.

Alternatively, the actuating member is a recess of the capsule. A depth of the recess may cause the switching member to differentiate between the first and second (and optional further) positions.

Optionally, the recess is positioned in the cup-shaped body opposite the lid.

Optionally, the actuating member is positioned at the cup-shaped body opposite the lid. The actuating member is preferably positioned at an outer surface of the cup-shaped body.

Optionally, the actuating member is positioned at an axis of symmetry of the capsule. The axis of symmetry may be such that the capsule is rotation symmetric about said axis. This provides the advantage that the rotational orientation of the capsule within the device is not important and the actuating member will always be correctly positioned with respect to the device, so that insertion of the capsule into the device is easy for the consumer.

Optionally, the actuating member and the cup-shaped body form a monolithic part.

Optionally, the capsule comprises a circumferential rim. Preferably, the circumferential rim extends outwardly of the cup-shaped body at an open end thereof. Preferably the capsule comprises a lid closing the open end.

Preferably, the capsule comprises (a volume of) a beverage ingredient, such as an extractable product, such as roast and ground coffee. The capsule may comprise a porous and/or perforate entrance face and/or exit face for allowing fluid to enter and/or beverage to exit the capsule, respectively.

Such capsule may also form part of a kit, preferably as second capsule of the kit. Such kit may comprise a first capsule for preparing a first consumable beverage and a second capsule for preparing a second consumable beverage in a beverage preparation device, each capsule comprising:
 a, preferably substantially rigid, cup-shaped body,
 a lid for closing the body,
 a volume of beverage ingredient,
  wherein the first capsule comprises no actuating member arranged for engaging a switching member of the beverage preparation device, and
  wherein the second capsule comprises an actuating member, arranged for engaging the switching member of the beverage preparation device.

It will be appreciated that such capsules may be used for preparing the beverages in the beverage preparation device of the system as described hereinabove. Such capsules may either engage or not engage the switching member of said beverage preparation device.

Thus, the first beverage may be prepared with the fluid at the first flow rate/and or pressure while the second beverage may be prepared with the fluid at the second flow rate and/or pressure. It will be appreciated that the first beverage ingredient may differ from the second beverage ingredient.

The invention also relates to a kit comprising a first capsule for preparing a first consumable beverage and a second capsule for preparing a second consumable beverage in a beverage preparation device, each capsule comprising:
 a, preferably substantially rigid, cup-shaped body,
 a lid for closing the body,
 a volume of beverage ingredient,
  wherein the first capsule comprises a first actuating member arranged for engaging a switching member of the beverage preparation device, and
  wherein the second capsule comprises a second actuating member, different from the first actuating member, arranged for engaging the switching member of the beverage preparation device.

It will be appreciated that such capsules may be used for preparing the first and second beverages in the device of the system as described hereinabove. Such first capsule may be arranged to engage the switching member of said beverage preparation device such that the switching member is in the first position, and the flow control unit operates in the first mode. Such second capsule may be arranged to engage the switching member of said beverage preparation device such that the switching member is in the second position and the flow control unit operates in the second mode. Alternatively, such first capsule may be arranged to engage the switching member of said beverage preparation device such that the switching member is in the second position and the flow control unit operates in the second mode. Such second capsule may then be arranged to engage the switching member of said beverage preparation device such that the switching member is in the third position and the flow control unit operates in the third mode.

Optionally a dimension of the first actuating member differs from a dimension of the second actuating member.

The first actuating member may be a first projection of the first capsule. The second actuating member may be a second projection of the second capsule. The second projection may be taller than the first projection. The first or second projection may e.g. be a pin extending from the cup-shaped body. The pin may e.g. be 0.5-4 mm wide. The pin may e.g. be 1-6 mm long.

The cup-shaped bodies may substantially be manufactured from a plastics material, e.g. by means of injection moulding. The projections may be, purposive, elongations of the injection location of the cup-shaped bodies.

Optionally, the projections are comprised in recesses of the capsules, such that the projections substantially reside within the outer contours of the cup-shaped bodies.

Alternatively, the first actuating member may be a first recess of the first capsule. The second actuating member may be a second recess of the second capsule. A depth of the first recess may differ from a depth of the second recess.

Optionally, the actuating members and the respective cup-shaped bodies form monolithic parts.

Preferably, the first capsule comprises a first beverage ingredient. Preferably, the second capsule comprises a second beverage ingredient. Preferably the first beverage ingredient is different from the second beverage ingredient. Hence, the first beverage may be prepared using the first beverage ingredient and the fluid at one flow rate and/or pressure. Hence, the second beverage may be prepared using the second beverage ingredient and the fluid at a different flow rate and/or pressure.

The first beverage ingredient may differ from the second beverage ingredient e.g. in volume, mass, density, composition, grind size, or the like.

The first and/or second beverage ingredient may be an extractable product such as roast and ground coffee.

The capsules may comprise porous and/or perforate entrance faces and/or exit faces for allowing fluid to enter and/or beverage to exit the capsules, respectively.

The invention also relates to a kit comprising a first capsule comprising a cleaning and/or descaling agent and a second capsule e.g. comprising a beverage ingredient. Herein, the first capsule may be arranged to cause the beverage preparation device to be in the first mode and the second capsule may be arranged to cause the beverage preparation device to be in the second mode as described hereinabove.

According to the invention is also provided a method for preparing a beverage suitable for consumption from a capsule comprising beverage ingredients, comprising:
  providing a capsule, and
  providing a device comprising:
    a first chamber portion; and
    a second chamber portion,
    a capsule handler comprising retaining means,
the method comprising the steps of
  positioning the first chamber portion and the second chamber portion in an open position such that the capsule can be inserted between the first chamber portion and the second chamber portion,
  inserting the capsule in the capsule handler and having the capsule handler assume a ready position such that the retaining means retain the capsule in an brewing position in between the first chamber portion and the second chamber portion,
  positioning the first chamber portion and the second chamber portion in a closed position corresponding to the brewing position of the capsule such that the capsule cannot escape from the first chamber portion,
  moving the capsule handler from the ready position to an ejection position such that the retaining means pass beyond the capsule,
  positioning the first chamber portion and the second chamber portion in the open position to allow the capsule to fall freely from the brewing position under the influence of gravity.

Optionally, the method comprises having the capsule handler force the retaining means beyond the capsule.

Preferably, the method comprises positioning an exit face of the capsule against, or close to, a brewing plate of the second chamber portion when the capsule is in the brewing position in the capsule handler.

Optionally, the method comprises inserting a capsule into the device when the capsule handler is positioned in the ready position. Hence, the capsule immediately reaches the brewing position upon insertion into the capsule handler.

Alternatively, the method may comprise inserting a capsule into the device when the capsule handler is positioned in a loading position, different from the ready position, and moving the capsule handler from the loading position to the ready position. Hence, the capsule is to be transported from the loading position to the ready position. This may provide additional design freedom for the device.

Optionally, the method comprises, upon insertion of the capsule, holding a guiding edge, such as the rim, of the capsule. Optionally, the method comprises slidingly guiding the guiding edge of the capsule to the brewing position of the capsule in the capsule handler.

Optionally, the method comprises retaining the capsule in an insertion position different from the brewing position when the capsule handler is in the loading position. The capsule handler may be arranged for transporting the capsule from the insertion position to the ready position while maintaining the capsule substantially immobile with respect to the capsule handler.

Optionally, the method comprises swivelling the capsule handler from the ready position to the ejection position. Optionally, the method comprises swivelling the capsule handler from the loading position to the ready position.

Optionally, the method comprises providing the capsule handler wherein the retaining means are formed by two protrusions, and moving the capsule handler with respect to the first chamber portion and the second chamber portion enables the retaining means to be moved to pass beyond the capsule such that the two protrusions move in the same direction with respect to the capsule.

Preferably, the method comprises having the capsule handler reach the ejection position from the ready position prior to the first chamber portion reaching the open position starting from the closed position.

Optionally, the method comprises having a start of displacing the first chamber portion from the closed position to the open position lagging with respect to a start of displacing the capsule handler from the ready position to the ejection position.

Optionally, the method comprises having the capsule handler reach the ready position from the loading position prior to the first chamber portion reaching the closed position from the open position.

Optionally, the method comprises having a start of displacing the first chamber portion from the open position to the closed position lagging with respect to a start of displacing the capsule handler from the loading position to the ready position.

Optionally the method comprises:
  providing the beverage preparation device further comprising:
    a capsule holder arranged for holding the capsule,
    a fluid supply unit arranged for supplying a fluid towards the capsule when the capsule is in the capsule holder, and
  selectively providing a fluid to the capsule in one of at least a first mode and a second mode, wherein in the first mode the parameter, e.g. the flow rate and/or pressure, of the fluid to be supplied to the capsule is adjusted to a first level, and in the second mode the parameter, e.g. the flow rate and/or pressure, is adjusted to a second level, different from the first level, depending on the presence and/or absence of an actuating member of the capsule.

Optionally, the method comprises:
  providing a capsule comprising an actuating member;
  providing the beverage preparation device further comprising:
    a capsule holder arranged for holding the capsule, a fluid supply unit arranged for supplying a fluid towards the capsule when the capsule is in the capsule holder, and selectively providing a fluid to the capsule in one of at least a first mode and a second mode, wherein in the first mode a parameter, e.g. flow rate and/or pressure, of the fluid to be supplied to the capsule is adjusted to a first level, and in the second mode the parameter, e.g. the flow rate and/or pressure, is adjusted to a second level, different from the first level, depending on the actuating member of the capsule. The invention also relates to use of a capsule in a device according to the invention for preparing a beverage.

Herein the capsule holder may comprise (part of) the first chamber portion. Herein the capsule may comprise a, preferably substantially rigid, cup-shaped body and a lid for closing the body.

It will be appreciated that, in general, the method according to the invention may comprise each step corresponding to the system as described hereinabove.

In general, the method according to the invention may encompass the following sequence of events:
a) position the capsule handler in the ready position;
b) position the first chamber portion and second chamber portion in the open position;
c) insert a capsule into the capsule handler;
d) have the capsule handler guide and/or position the capsule in the brewing position, in which brewing position the capsule is retained by the retaining means;
e) move the first chamber portion and optionally the second chamber portion to the closed position;
f) brew the beverage by supplying a fluid, such as hot water under pressure, to the capsule;
g) move the capsule handler to the ejection position, wherein the retaining means pass beyond the capsule;
h) move the first chamber portion and optionally the second chamber portion to the open position;
i) have the capsule fall from the brewing position since the capsule is no longer supported by the retaining means and the first and/or second chamber portion.

It will be clear that the order of steps a) and b) may be reversed. Further, it is possible that the capsule handler is positioned in a loading position prior to step c). Then step d) may include moving the capsule handler from the loading position to the ready position. It will be clear that the order of steps f) and g) may be reversed. In case the second chamber portion remains immobile prior to brewing and moves after brewing, an additional step j) may be included for returning the second chamber portion to the initial position prior to brewing a further beverage.

According to a further aspect of the invention is provided a brewing device for preparing a food product, especially a drink, from capsules, characterized in comprising:
a frame wherein an area for inserting a capsule towards a brewing position is defined;
a brewing chamber defined by a first chamber portion and a second chamber portion, slidingly arranged in a sliding area defined by the frame; such chamber portions can slide both one with respect to the other one between a closing configuration and an opening configuration and vice versa, and with respect to said frame;
ducts, respectively for supplying a brewing fluid in the chamber and for draining the brewed product from the chamber itself;
a pair of opposed guiding channels for inserting, preferably from the top, the capsule in the fixed brewing position with respect to the frame;
at least one member (preferably two) supporting the capsule in said brewing position.

The at least one member can be reversibly moved upon command between a supporting position and a freeing position by allowing the capsule to fall from the brewing position directly downwards.

Evidently, in general, the device according to the invention can be inserted inside a more complex machine, for example a coffee machine equipped with additional members known per se such as a boiler, a pump for supplying hot water, a coffee dispensing spout, etc.

In the present aspect of the invention, the ducts for supplying a brewing fluid in the chamber and for draining the brewed product from the chamber itself can be in variable number according to the needs, such as for example a single supply duct and a single outlet duct, or several supply ducts or outlet ducts.

For the purposes of the present invention, the device frame is considered substantially fixed during the use with respect to an absolute reference system, wherein the area for inserting the capsule in the device defined in the frame is motionless.

Evidently, according to the present aspect of the invention the capsule housed in the brewing position never changes position with respect to the frame. In fact both portions of the brewing chamber are put in motion for implementing in an extremely simple way all the motions necessary to close the brewing chamber and to perform possible piercing by piercing needles and to implement the chamber opening and the separation of the capsule from the needles, as well as the fall of the capsule directly from the brewing position. This involves a considerable advantage in terms of reliability of the device and of structural simplicity of the same with respect to the devices of known type.

According to a preferred embodiment of the invention, at least a member for supporting the capsule is arranged to sustain the capsule from the bottom and it can be reversibly moved upon command between a supporting position, e.g. the ready position, and a releasing position, e.g. the ejection position, by allowing the fall of the capsule from the brewing position directly downwards.

According to a preferred embodiment of the invention, the device comprises a command lever for opening and closing the brewing chamber, connected to a single kinematic chain of joined motion of the two chamber portions between the closing position and opening position and vice versa.

In practice, with a single command and without the help of one or more electrical actuators, it is possible moving both brewing chamber portions, by simplifying considerably the way in which the devices of known type are structured, in particular to implement the extraction of the capsule from the chamber portion containing it in case piercing needles are present.

According to a particularly advantageous preferred embodiment, the device according to the invention provides a moving member for a retaining member on a plane substantially coincident or parallel to the lying planes of the guiding channels. The motion of the retaining member on such plane allows simplifying considerably the device structure, for example limiting considerably the whole overall dimensions of the device as the channels do not need space along the "axis" of the device (herein axis is understood as the sliding direction of the portions of the brewing chamber inside the frame sliding area). Preferably, in this point of view, a preferred embodiment of the invention provides that the moving member comprises a translator upwards for at least the retaining member.

Optionally, said kinematic chain comprises a motion piston rod at one first end hinged in eccentric way to a pin hinged to the frame, said pin being rotating by means of a kinematic connection to the control lever, said motion piston rod being hinged at an opposed second end to a pin integral to said second chamber portion and bound to slide along a sliding direction of said second chamber portion.

Optionally, said kinematic chain comprises an intermediate group to a kinematic end of which said control lever is articulated and to the opposed kinematic end a first pushing piston rod is articulated which, in turn, is articulated to said first brewing chamber portion.

Optionally, said intermediate group comprises:
- a crank hinged at an end to said first pushing piston rod and with the opposite end to the frame,
- a rocker arm hinged at one end to the frame and having a pair of opposed rabbetings angularly staggered therebetween with respect the hinged axis of the rocker arm, said crank being positioned between said rabbetings, said rabbetings being adapted to collide alternatively against said crank according to the direction of rotation of the rocker arm,
- a second piston rod the ends of which are hinged respectively in an intermediate position of said rocker arm and to a projection of the control lever opposed to the hinging axis to the frame of said control lever.

Optionally, the axis for hinging to the frame of said rocker arm, the hinging axis of said pushing piston rod to the first brewing chamber portion, and the hinging axis of said motion piston rod to the second portion of brewing chamber lie on the same plane whereon even the sliding axis of said chamber portions lies, said sliding axis being orthogonal to the first ones, by intersecting them.

Optionally, said guiding channels and said at least one member for supporting the capsule are integral therebetween.

Optionally, the device comprises motion means for said at least one supporting member on a plane substantially coincident or parallel to said guiding channels.

Optionally, said motion means comprise a translator arranged and implemented to impose a shift upwards to said at least one said supporting member.

Optionally, said motion means comprise a positioning member for a capsule in the brewing position, said guiding channels and a pair of convexities outgoing from said channels constituting a pair of said supporting members the capsule being defined on said positioning member, said positioner being translatable upwards to bring said concavities above the diametral ends of the capsule when the same is in the brewing position.

Optionally, said translator upwards comprises a kinematic mechanism with linear cam restrained to said frame and interacting both with said control lever and with said positioner, so that:
- in wholly raised position of said control lever said positioner is in a supporting position for a capsule in brewing position, whereas said brewing chamber is wholly opened,
- a rotation of said control lever from said wholly raised position to a wholly lowered position on the frame causes the closing of said brewing chamber the capsule remaining engaged both by said first chamber portion containing it and by said supporting members in the positioner,
- a first partial rotation of said control lever from said wholly lowered position on the frame upwards causes a vertical raising of said positioner, the brewing chamber remaining substantially closed,
- a second partial rotation upwards of said control lever subsequent to said first partial rotation as far as the wholly raised position of said control lever causes the opening of said brewing chamber and the falling downwards of said capsule and the translation downwards of said positioner.

Optionally, the kinematic mechanism with linear cam comprises at least an elongated slide bound to slide on an inside flank of the frame parallelly to the sliding axis of said chamber portions, said slide comprising a shape eyelet with linear cam formed by at least a tract tilted upwards, slidingly coupled to a pin integral to said positioner; on said slide, in position opposed to said eyelet being present an area interacting with said control lever, said interaction area providing an end flap of the slide elastically deformable by bending according to a direction parallel to the direction of the axis for hinging said control lever to the frame, said end flap being shaped to allow the overlapping of a pushing appendix, integral to said control lever, when the same control lever is in wholly raised position, said pushing appendix resulting instead at the ending face of said end flap (28A) of the slide when said control lever is in wholly lowered position.

Optionally, said ending face of said end flap is bevelled outside of the frame, to prevent the elastic deformation of said end small flap towards outside of the frame by said pushing appendix.

Optionally, the upper face of said end flap of the slide is bevelled on the upper portion towards the inside of the frame in order to ease the elastic deformation by bending by said pushing appendix.

Optionally, said device is part of a machine for producing food products by means of extraction from a capsule.

As mentioned, according to another aspect, the invention comprises even a method for implementing a brew from a capsule by means of a brewing device. Such method is characterized by:
- guiding the capsule in a fixed brewing position with respect to the device frame,
- sustaining from the bottom the capsule in said brewing position,
- approaching from opposite directions two portions of a brewing chamber towards the brewing position in which the capsule is arranged,
- closing the brewing chamber defined by said chamber portions,
- making said chamber to be traversed by a brewing fluid, preferably by directing it towards a gathering area,
- freeing on the lower side the capsule allowing it to fall downwards directly from said brewing position.

According to a preferred embodiment of the present method, the phase for freeing the capsule to allow it to fall downwards provides a phase for moving upwards at least a member supporting the capsule from said brewing position; during such motion the capsule remains still in the brewing position whereas the supporting member deforms the capsule portion which is near the same member during the supporting phase. The capsule portion practically is an obstacle for the motion upwards of the supporting member. The supporting member may be forced beyond the capsule portion forming the obstacle.

BRIEF DESCRIPTION OF THE DRAWINGS

The invention will now be elucidated by means of non-limiting examples referring to the drawing in which.

In the figures like elements are indicated with like reference numerals.

DETAILED DESCRIPTION OF EXEMPLARY EMBODIMENTS

Figure 1A:
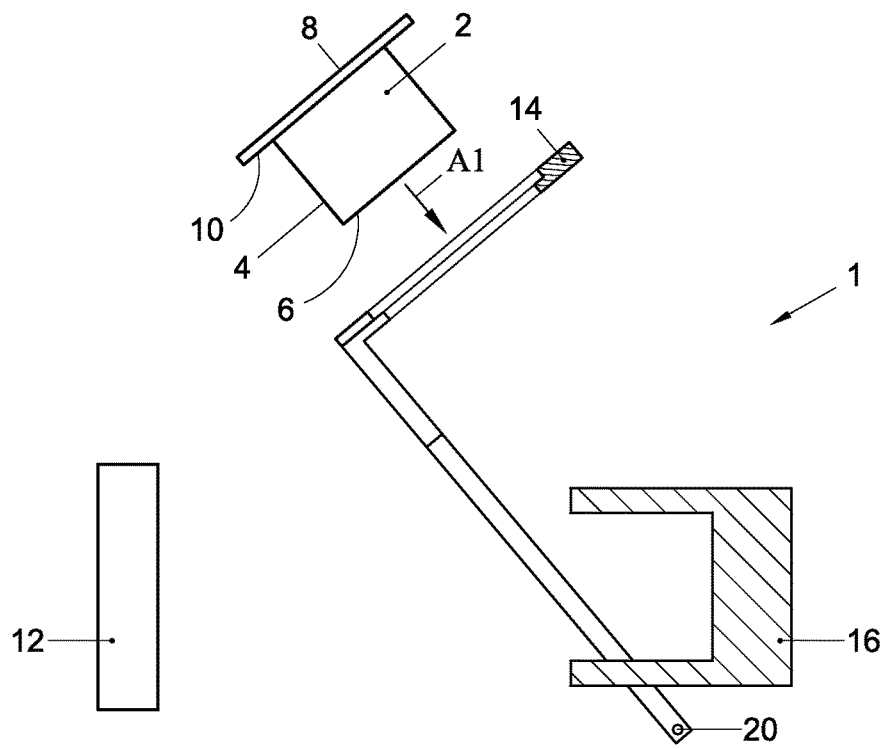
FIGS. 1A-1G show a schematic representation of an exemplary sequence of events in a first example of a device according to the invention for preparing a beverage using a capsule.

The Figures show schematic representations of exemplary sequences of events in examples of systems including devices 1 according to the invention for preparing a beverage using a capsule 2 according to the invention.

In the following examples, the capsule 2 comprises a circumferential wall 4. Here the circumferential wall 4 is depicted as being substantially cylindrical, although it will be appreciated that other shapes are possible, such as frustoconical, (hemi)spherical, polygonal, etc.

In the examples the capsule 2 further comprises an entrance face 6. The entrance face 6 is configured for allowing a liquid, such as hot water, to enter the capsule 2 for interacting with a beverage ingredient contained within the capsule 2. In the examples the entrance face 6 is integral with the circumferential wall 4, closing the circumferential wall 4 at a first end. Also, in the examples the entrance face 6 is provided with perforations for allowing the liquid to enter the capsule 2. It will be appreciated that the entrance face 6 may also be porous. Alternatively, the entrance face 6 may be fluid tight, e.g. in case the device is arranged for opening, such as by piercing, the entrance face 6 for allowing the liquid to enter the capsule.

In the examples the capsule 2 further comprises an exit face 8. The exit face 8 is designed for allowing the beverage and/or liquid to exit the capsule, e.g. after interaction with the beverage ingredient. In the examples the exit face is a separate sheet connected to an outwardly extending flange-like rim 10 of the capsule. Here the rim 10 is integral with the circumferential wall 4. Here the exit face 8 closes the capsule at a second end. In the examples the exit face 8 is a sheet comprising a plurality of exit openings. It will be appreciated that the exit face 8 may also be porous. Alternatively, the exit face 8 may be fluid tight, e.g. in case the device is arranged for opening, such as by piercing, the exit face 8 for allowing the beverage and/or liquid to exit the capsule.

In the examples, the circumferential wall, rim 10 and entrance face 6 form a unitary part. In the examples, this unitary part is substantially rigid, and e.g. made from a plastics material.

In the examples, the capsule 2 has an axis of symmetry, such that the capsule is rotation symmetric about said axis. In the examples the capsule is asymmetrical in the plane in which the rim extends.

In the examples, the device 1 is designed such that the capsule 2 is positioned with its axis of symmetry substantially horizontal during brewing of the capsule.

FIGS. 1A-1G show a schematic representation of an exemplary sequence of events in a first example of a device 1 according to the invention for preparing a beverage using a capsule 2.

In this example of FIGS. 1A-1G the device 1 comprises a first chamber portion 16, here in the form of an enclosing member. The enclosing member 16 is arranged for at least partly enclosing the capsule 2. In the example of FIGS. 1A-1G, the device 1 further comprises a second chamber portion 12, here in the form of a brewing plate 12. The brewing plate 12 is configured such that when the exit face 8 of the capsule 2 abuts against, or at least is brought in proximity of the brewing plate 12, the beverage exiting the capsule 2 can be drained through the brewing plate 12. Thereto the brewing plate 12 may be provided with perforations, not shown in FIGS. 1A-1G but known in the art. The enclosing member 16 is also arranged for forming a brew chamber 18 enclosing the capsule 2 by closing the enclosing member 16 onto the capsule 2 and the brewing plate 12. It will be appreciated that the enclosing member 16 may comprise liquid supply means (not shown, but known in the art) for supplying the liquid, such as hot water, to the entrance face 6 of the capsule 2.

In the example of FIGS. 1A-1G, the device 1 further comprises a capsule handler 14. The features and functions of the capsule handler in this example will be elucidated below.

An exemplary functioning of the device according to FIGS. 1A-1G is as follows.

In a starting position, the enclosing member 16 is positioned remote from the brewing plate 12, such that it is possible to insert the capsule 2 in between the enclosing member 16 and the brewing plate 12 as shown in FIG. 1A. The enclosing member 16 being remote from the brewing plate 12 is also referred to as the open position of the enclosing member 16 with respect to the brewing plate 12. In FIG. 1A the capsule handler 14 is positioned in a loading position. In this loading position of the capsule handler 14 the capsule 2 may be inserted into the capsule handler as indicated with arrow A1.

Figure 1B:
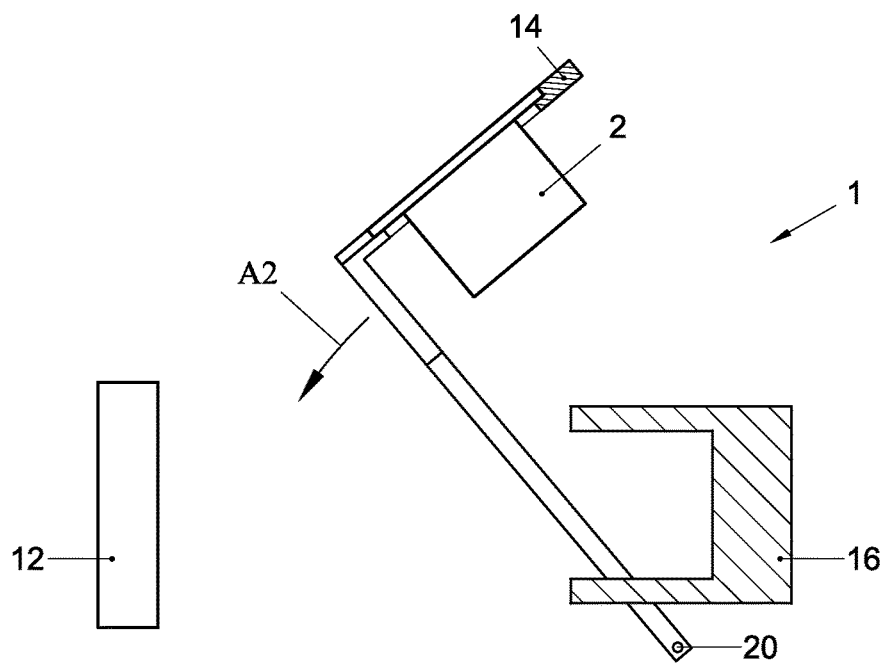
Figure 1C:
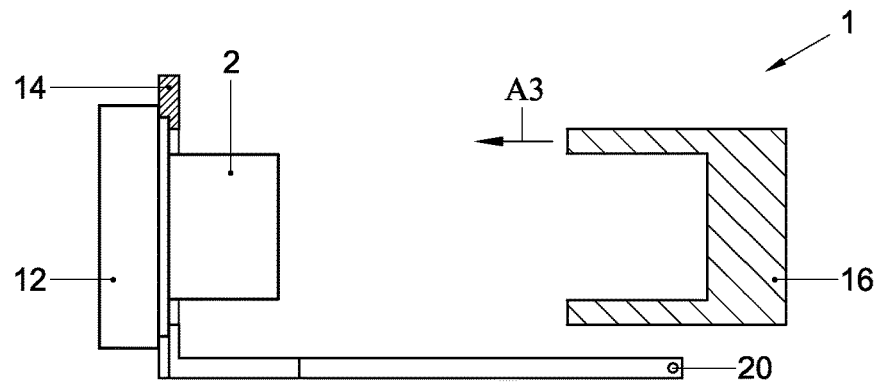

Once the capsule 2 has been inserted in the capsule handler 14, the capsule handler is moved, in this example downwardly, towards a ready position as indicated by arrow A2 in FIG. 1B. In FIG. 1C the capsule handler 14 is shown in the ready position. It should be noted that in this example the capsule handler 14 is pivotable about an axis 20 between the loading position, as shown in FIG. 1A, and the ready position, as shown in FIG. 1C. In the ready position the exit face 8 of the capsule 2 abuts the brewing plate 12 in this example.

When the capsule handler 14 has reached the ready position, the enclosing member 16 may close upon the capsule 2 for forming the brew chamber 18. Hence the enclosing member 16 and the brewing plate 12 define a brewing position of the capsule 2. It will be appreciated that here when the capsule handler 14 is in the ready position, the capsule 2 is in the brewing position. In FIG. 1C the closing of the enclosing member 16 is indicated by the arrow A3. It will be appreciated that the movement of the enclosing member 16 may already start before the capsule handler 14 carrying the capsule 2 has reached the ready position.

While the capsule 2 is enclosed by the enclosing member 16 and the brewing plate 12 in the brew chamber 18 (see FIG. 1D), a liquid, such as hot water e.g. under pressure, may be supplied to enter the capsule 2 through the entrance face 6. Thus, the beverage may be prepared inside the capsule 2. The prepared beverage, and possibly residual liquid, may now exit the capsule 2 through the exit face 8.

Figure 1D:
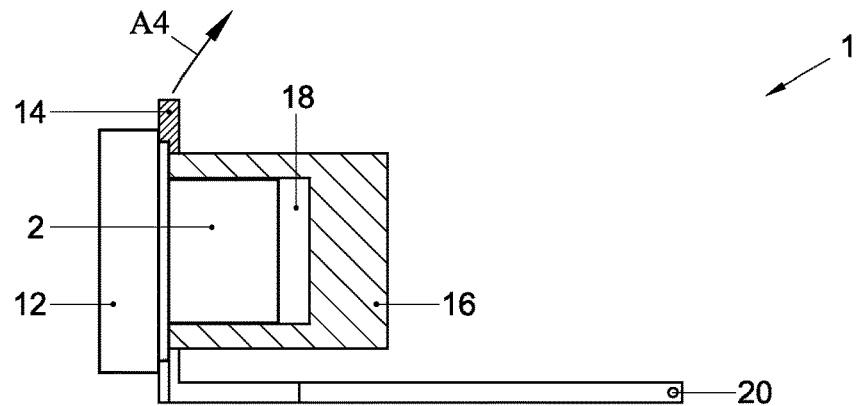

As can be seen in FIG. 1D, in this example a leading edge of the enclosing member 16 and the capsule handler 14 are adapted to each other such that the leading edge passes into the capsule handler 14 to abut against the rim 10 of the capsule 2. This may allow leak-tight closing of the enclosing member 16 onto the capsule 2. It will be appreciated that a similar adaptation of the enclosing member and the capsule handler can be seen in FIGS. 2D, 2E, 3D, 5D, 15a and 16a.

Figure 1E:
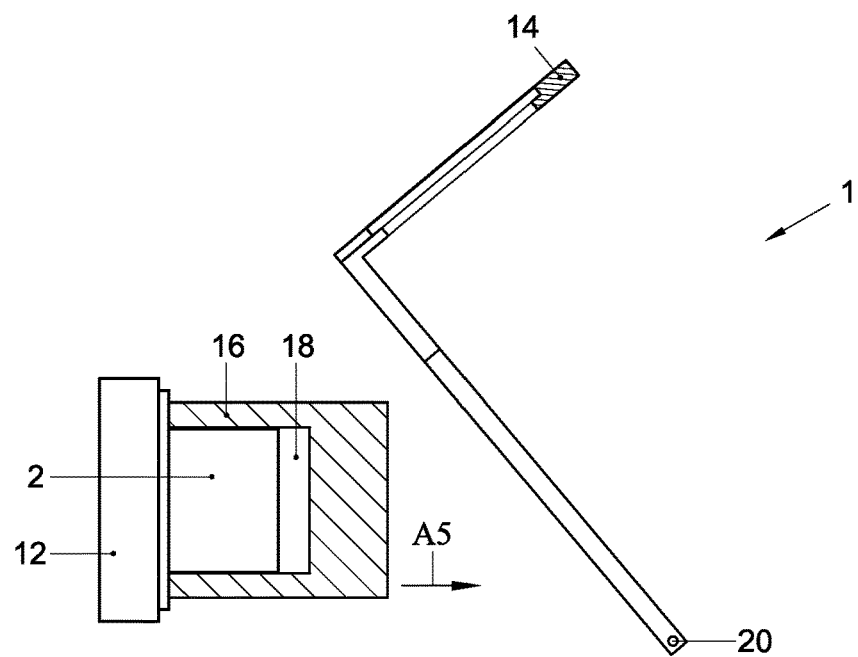
Figure 1F:
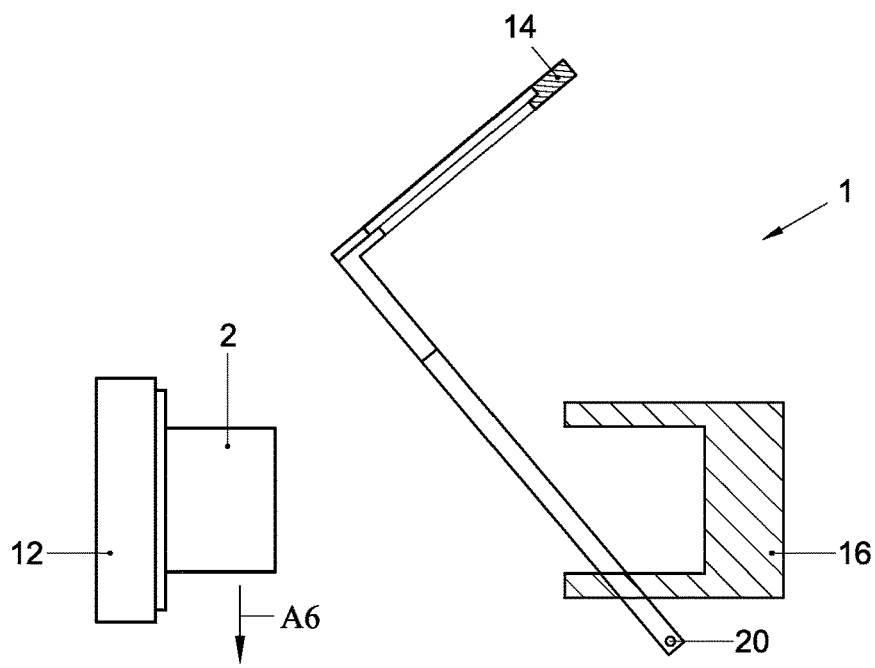

In this example after the beverage has been prepared, the capsule handler 14 is moved upwardly to an ejection position, as indicated by arrow A4 in FIG. 1D. In this example, the ejection position coincides with the loading position. Hence, the capsule handler 14 can be positioned back into the loading position, or start moving back towards the loading position, while the capsule 2 is still enclosed by the enclosing member 16 and the brewing plate 12 in the brew chamber 18 as depicted in FIG. 1E. The enclosing member 16 prevents the capsule 2 from being taken along with the moving capsule handler 14.

Figure 1G:
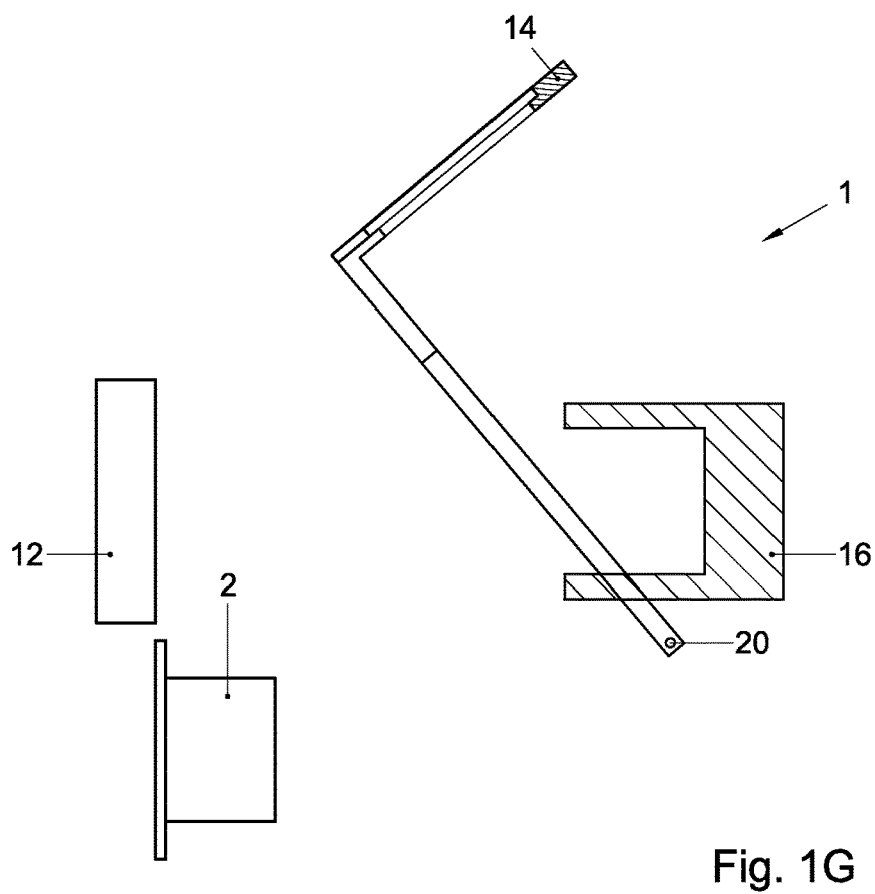

Finally, the enclosing member 16 is moved away from the brewing plate 12 as indicated with arrow A5. When there is sufficient space between the brewing plate 12 and the enclosing member 16 the capsule 2 may be ejected, e.g. by gravity as indicated with arrow A6 in FIG. 1F, so as to be removed from the brewing plate 12 as shown in FIG. 1G.

In this example, the liquid is supplied to the capsule 2 while the capsule handler 14 is in the ready position as shown in FIG. 1D. In a slightly modified embodiment, the liquid may be supplied to the capsule 2 while the capsule handler is in the loading position as shown in FIG. 1E, or while the capsule handler 14 is moving from the ready position to the loading position.

It will be appreciated that the device 1 as described with respect to FIGS. 1A-1G may be designed as a top leading device, e.g. when the loading position is designed such that the capsule handler 14 is pointing upwardly, e.g. substantially perpendicular to a horizontal plane. Alternatively, the device 1 may be designed substantially as a front loading device, e.g. when the loading position is designed such that the part of the capsule handler 14 accepting the capsule 2 is positioned just above the brewing plate 12. It will be appreciated that the device 1 may also be designed as something in between top loading and front loading, i.e. a further category of devices, depending on the angle the capsule handler 14 makes with the horizontal plane in the loading position. Preferably, then the loading position is designed such that loading tray 14 is positioned such that the exit face 8 of the capsule, when inserted, makes an angle of between approximately 30° to 60° with a horizontal plane on which the device 1 may be placed, such as a counter top. Without wishing to be bound to any theory it has been found that such loading position provides a good user experience and enhances the ease with which the capsule can be inserted into the loading tray.

FIGS. 2A-2H show a schematic representation of an exemplary sequence of events in a second example of a device 1 according to the invention for preparing a beverage using a capsule 2.

Figure 2A:
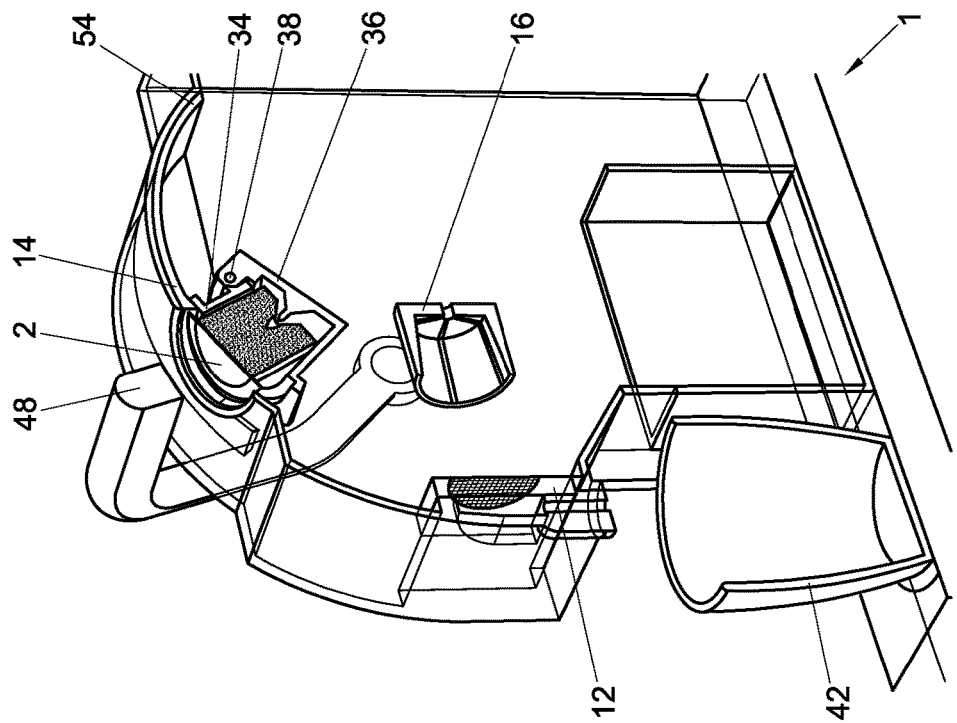
FIGS. 2A-2H show a schematic representation of an exemplary sequence of events in a second example of a device according to the invention for preparing a beverage using a capsule.

FIG. 2A shows the situation wherein the capsule 2 has been inserted in the capsule handler 14 in the loading position. In this example, the device 1 further comprises a receptacle 32 for receiving the capsule 2 in the loading position in addition to the loading tray 14. The receptacle comprises a fixed part 34, stationary with respect to the remainder of the device 1, and a mobile part 36. The receptacle 32 may aid in inserting the capsule 2 into the device 1 as will be described later.

Figure 2B:
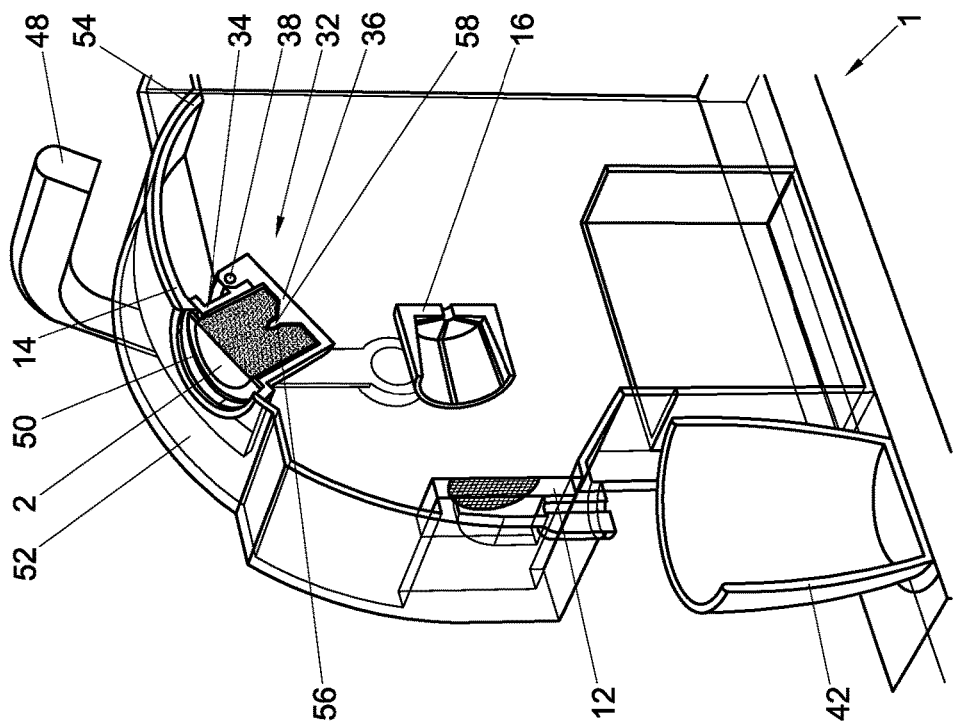

Once the capsule 2 has been inserted in the capsule handler 14 and the receptacle 32, the capsule handler 14 is moved, here downwardly, towards the ready position. For the capsule 2 to be able to move along with the capsule handler 14, the mobile part 36 of the receptacle 32 opens. In this example, the mobile part swivels around a receptacle axis 38. In FIG. 2B the mobile part 36 is shown as having just opened, while in FIG. 2C the receptacle 32 is fully opened.

Figure 2C:
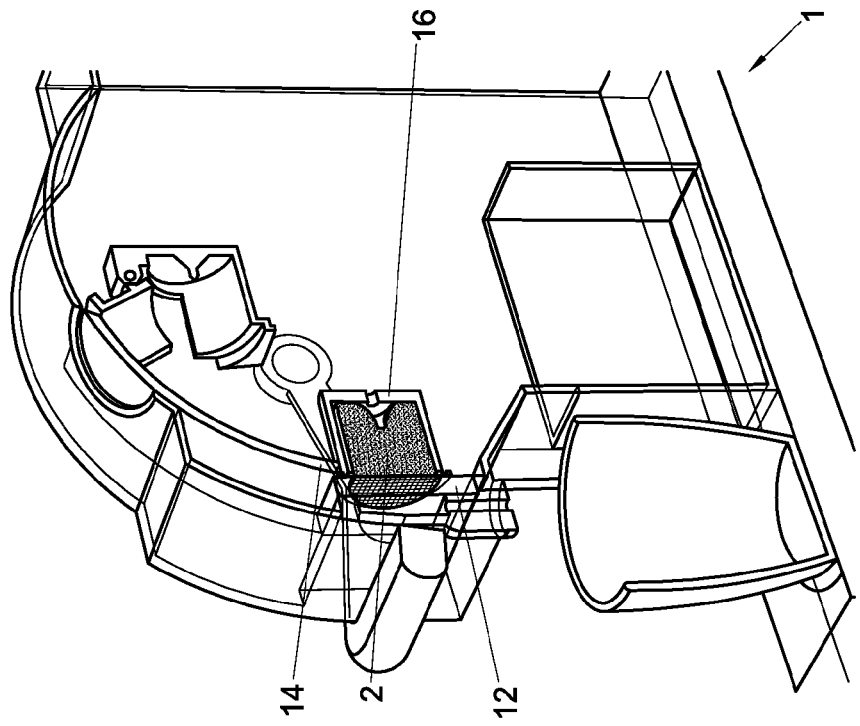
Figure 2D:
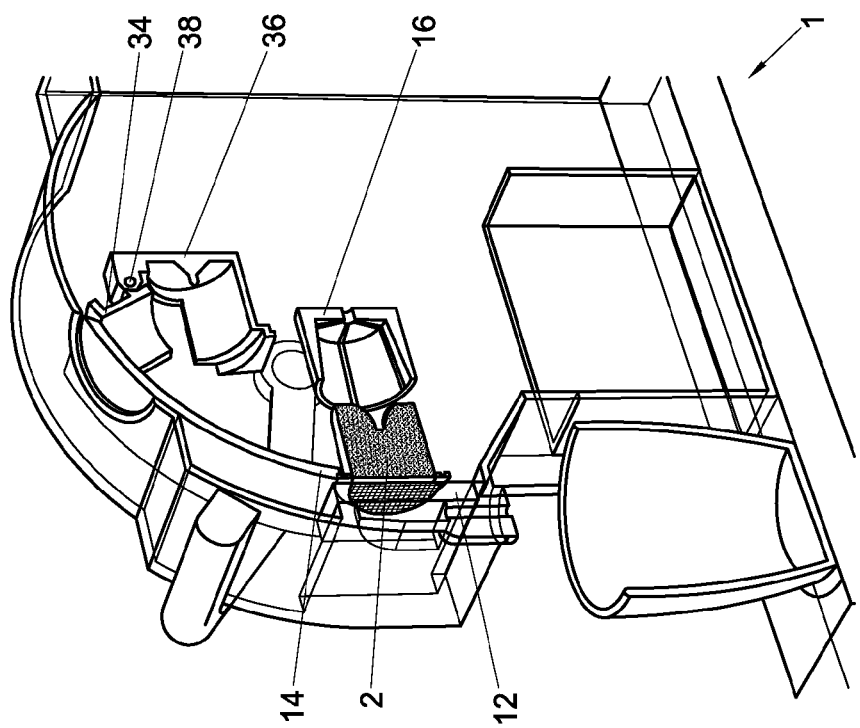
Figure 2F:
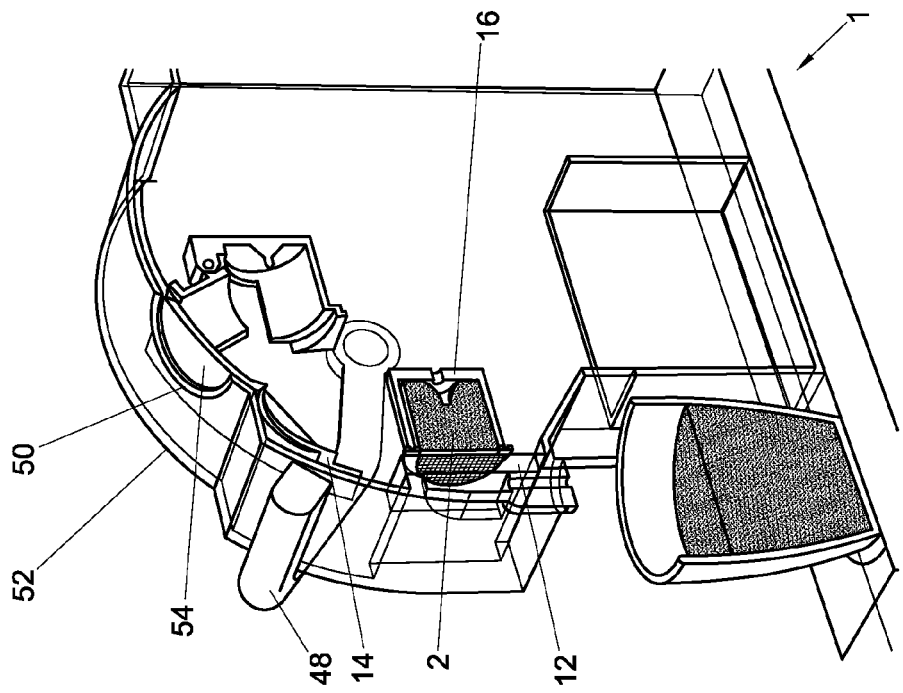
Figure 2E:
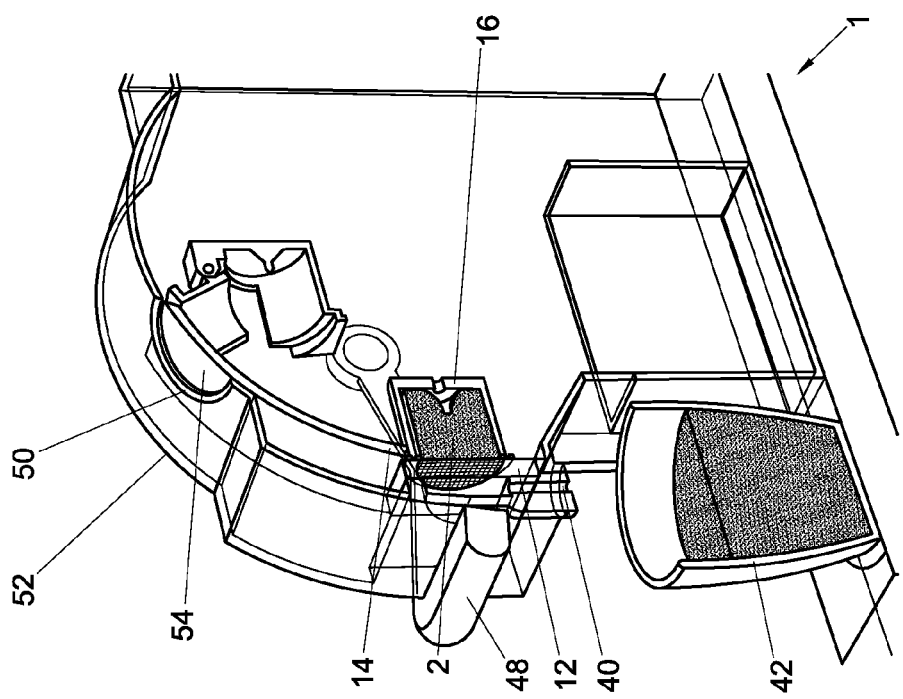
Figure 2G:
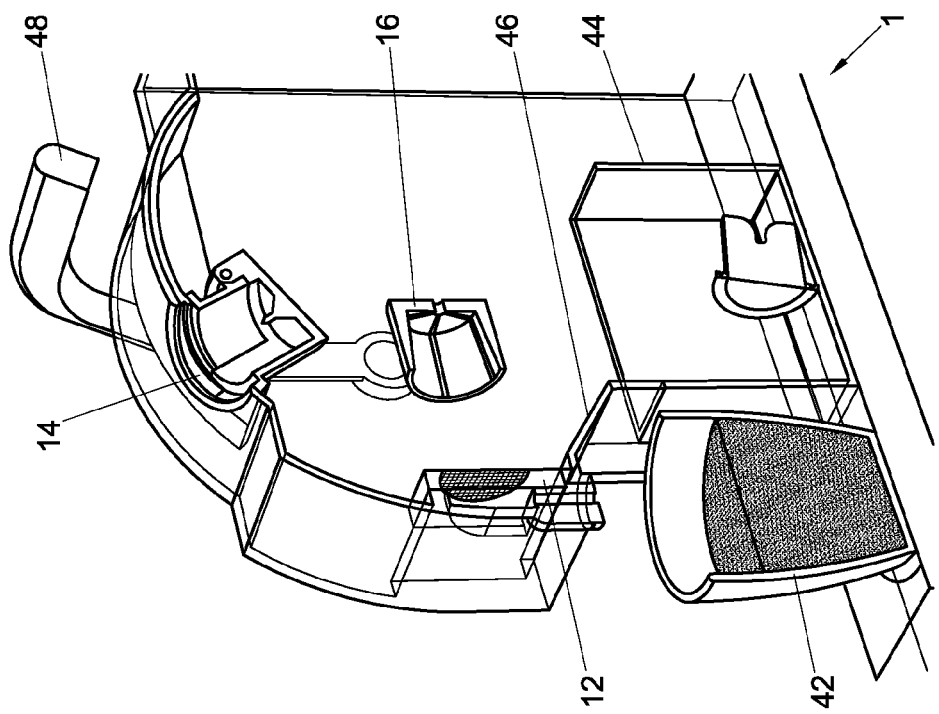
Figure 2H:
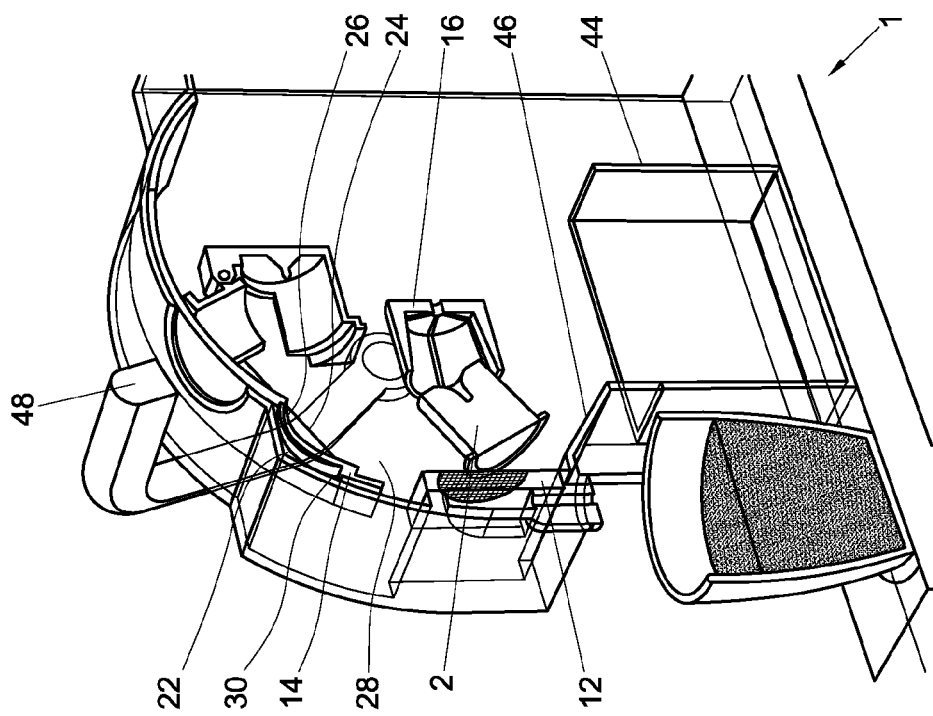

The embodiment of the capsule handler 14 of this example is best seen in FIGS. 2G and 2H. The capsule handler comprises a body 22. The body 22 is provided with a hole 24. In this example the size and shape of the hole 24 substantially corresponds to the size and shape of the circumferential wall 4 of the capsule 2. Hence, the circumferential wall 4 of the capsule can be positioned into the hole 24. In this example at least a portion of the perimeter of the hole 24 is provided with a recessed ledge 26. The recess 26 acts as guide means for holding the rim 10 of the capsule 2. In this example the size and shape of the recess substantially corresponds to the size and shape of the rim 10 of the capsule. Hence, the rim 10 can be positioned into the recess 26. Thus, in this example the exit face 8 of the capsule 2 can be positioned substantially flush with an outer face of the capsule handler 14.

In this example the capsule handler 14 further comprises a cut-out 28. Here a width of the cut-out 28 substantially corresponds to a width of the circumferential wall 4 of the capsule. The capsule handler 14 further comprises a protrusion 30. In this example the capsule handler 14 comprises two protrusions 30 placed symmetrically on either side of the cut-out 28. In this example a shortest distance between the protrusions 30 is slightly smaller than a largest cross dimension of the rim 10 of the capsule 2. In this example, the protrusions 30 are adjacent to the recessed ledge 26. It will be appreciated that the protrusions 30 act as retaining means preventing the rim 10 of the capsule 2 from sliding out of the recess 26, while the cut-out 28 allows the circumferential wall 4 of the capsule 2 to slide out of the hole 24. Hence, in this example the capsule 2 is held in the capsule handler 14 at its rim 10, by the recess 26 and the protrusions 30.

Here, the capsule handler 14 transports the capsule 2 from the loading position to the brewing position of the capsule 2 in such a way that the capsule 2 is stationary with respect to the capsule handler 14. The movement of the capsule 2 from the loading position to the brewing position is a translation along a section of an arc in this example.

When the capsule handler 14 has reached the ready position as shown in FIG. 2C, the enclosing member 16 may close upon the capsule 2 for forming the brew chamber 18 as shown in FIG. 2D. It will be appreciated that the movement of the enclosing member may start before the capsule 2 and the capsule handler 14 have reached the brewing position.

While the capsule 2 is enclosed by the enclosing member 16 and the brewing plate 12 in the brew chamber 18 (see FIG. 2E), a liquid, such as hot water e.g. under pressure, may be supplied to enter the capsule 2 through the entrance face 6. Thus, the beverage may be prepared inside the capsule 2. The prepared beverage, and possibly residual liquid, may now exit the capsule 2 through the exit face 8. The beverage may pass through the brewing plate 12 and beverage conducting means 40, e.g. towards a holder 42 such as a cup.

In this example after the beverage has been prepared, the capsule handler 14 is moved, here upwardly, towards the ejection position, as shown in FIG. 2F. Here the ejection position coincides with the loading position. It will be appreciated that in this example the capsule handler has not fully returned to the loading position in FIG. 2F yet. It will be appreciated that by moving the capsule handler 14 towards the ejection position, the protrusions 30 pass beyond the rim 10 of the capsule 2. The enclosing member 16 prevents the capsule 2 from being taken along with the moving capsule handler 14. In this example, the protrusions 30 are forced beyond the capsule 2, relying on flexibility of the protrusions 30, the capsule handler 14, and/or the rim 10 of the capsule 2. It will be appreciated that the protrusions 30 may also be mounted to the capsule handler 14 in a flexible way, e.g. by means of resilient elements such as a leaf spring, helical spring, rubber mass or the like. Alternatively, or additionally, the protrusions 30 may be actively retracted by a movement mechanism of which many examples are known per se, such as rods, cams, wires, etc.

Next, the enclosing member 16 is moved away from the brewing plate 12 as shown in FIG. 2G. When there is sufficient space between the brewing plate 12 and the enclosing member 16 the capsule 2 may be ejected, e.g. by gravity. The capsule 2 may be fall into a waste container 44 as shown in FIG. 2H. Thereto, the capsule may be guided by guiding means 46.

Finally, in this example, the capsule handler 14 is returned to the loading position as shown in FIG. 2H and the device 1 is ready for receiving another capsule 2.

In this example, the liquid is supplied to the capsule 2 while the capsule handler 14 is in the ready position as shown in FIG. 2E. In a slightly modified embodiment, the liquid may be supplied to the capsule 2 while the capsule handler is in the loading position as shown in FIG. 2F or 2H, or while the loading tray 14 is moving from the brewing position to the loading position.

In FIGS. 2A-2H a lever 48 is shown. It will be appreciated that this lever may actuate the movement of the capsule handler 14 and the enclosing member 16 and possibly the mobile part 36 of the receptacle 32. Thereto, the lever 48 may be coupled to the capsule handler 14 and the enclosing member 16, and possibly the mobile part 36 of the receptacle 32, e.g. by conventional means such as gears, levers, rods, cams, pinions, racks, wires or the like. It will be appreciate that it is also possible that the capsule handler 14 and the enclosing member 16, and possibly the mobile part 36 of the receptacle 32, are actuated by automated actuators such as electric motors, plungers, or hydraulic or pneumatic actuators.

In the example of FIG. 2A the capsule 2 has been inserted into the capsule handler 14 through an aperture 50 in the housing 52. Hence, the capsule handler is shielded from the user by the housing 52. In FIG. 2E can be seen that in this example the capsule handler 14 comprises shield 54. The shield 54 is oriented and dimensioned such that it covers the aperture 50 in the housing 52 while the capsule handler 14 is not in the loading position. Hence, the user is shielded from the internal parts of the device 1. Thus safety of the device 1 is improved.

In the example of FIG. 2A the capsule 2 has been inserted into the receptacle 32. It will be appreciated that a shape and dimension of an inner surface of the receptacle, e.g. of the fixed part 34 and the mobile part 36, in this example substantially corresponds with the shape and dimension of an outer surface of the capsule 2. Thus the receptacle 32 aids in correctly positioning the capsule 2 in the capsule handler 14. In this example, the capsule 2 comprises a recess 56 at the entrance face 6. This recess 56 cooperates with a projection 58 of the receptacle 32. Hence the ease of correctly inserting the capsule 2 into the receptacle 32 and into the capsule handler 14 can even be improved further. It will be appreciated that alternatively, or additionally, the capsule 2 may be provided with a projection cooperating with a recess of the receptacle 32.

FIGS. 3A-3F show a schematic representation of an exemplary sequence of events in a third example of a device 1 according to the invention for preparing a beverage using a capsule 2.

In the example of FIGS. 3A-3F, the device 1 comprises a second chamber portion in the form of a brewing plate 12. The brewing plate 12 is designed such that when the exit face 8 of the capsule 2 abuts against, or at least is brought close to the brewing plate 12, the beverage exiting the capsule 2 can be drained through the brewing plate 12. Thereto the brewing plate 12 may be provided with perforations, not shown in FIGS. 3A-3F.

In the example of FIGS. 3A-3F, the device 1 further comprises a capsule handler 14. The features and functions of the capsule handler in this example will be elucidated below.

In this example of FIGS. 3A-3F the device 1 further comprises a first chamber portion in the form of an enclosing member 16. The enclosing member 16 is arranged for enclosing the capsule 2. The enclosing member 16 is also arranged for forming a brew chamber 18 enclosing the capsule 2 by closing the enclosing member 16 onto the capsule 2 and the brewing plate 12. It will be appreciated that the enclosing member 16 may comprise liquid supply means (not shown) for supplying the liquid, such as hot water, to the entrance face 6 of the capsule 2.

An exemplary functioning of the device according to FIGS. 3A-3F is as follows.

Figure 3A:
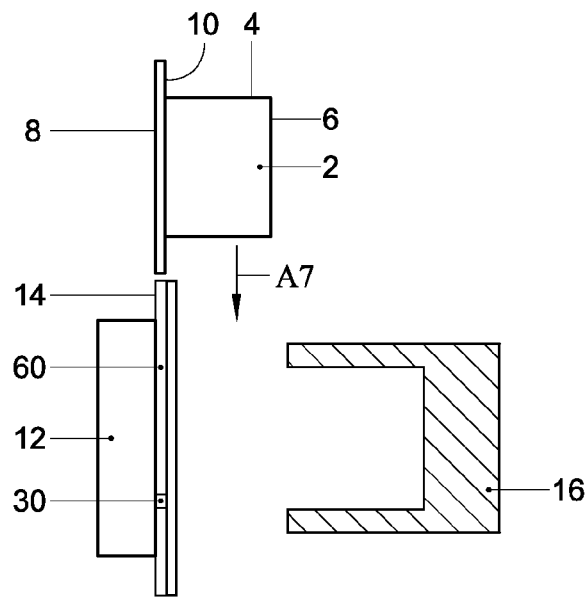
FIGS. 3A-3F show a schematic representation of an exemplary sequence of events in a third example of a device according to the invention for preparing a beverage using a capsule.

In a starting position, the enclosing member 16 is positioned remote from the brewing plate 12, such that it is possible to insert the capsule 2 in between the enclosing member 16 and the brewing plate 12 as shown in FIG. 3A. The enclosing member 16 being remote from the brewing plate 12 is also referred to as the open position of the enclosing member 16 with respect to the brewing plate 12. In FIG. 3A the capsule handler 14 is positioned in a loading position. In this loading position of the capsule handler 14 the capsule 2 may be inserted into the capsule handler as indicated with arrow A7.

Figure 3B:
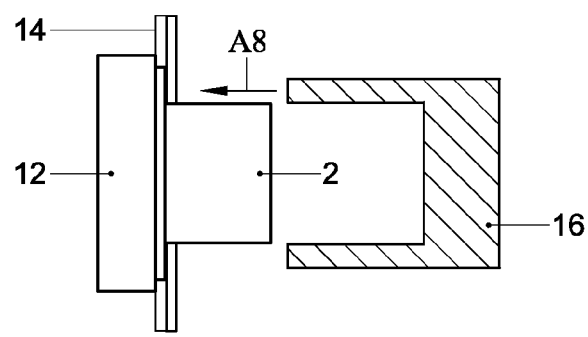

In this example, the loading position of the capsule handler 14 is the same position as the ready position of the capsule handler 14. Hence, once the capsule 2 has been inserted in the capsule handler 14, the capsule moves towards the brewing position as shown in FIG. 3B. When the capsule 2 is in the brewing position the exit face 8 of the capsule 2 abuts the brewing plate 12 in this example.

In this example the capsule handler 14 comprises two grooves 60 (only one groove 60 is shown in the cross section of FIGS. 3A-3F). The grooves 60 act as guide means, guiding the guiding edge 10 of the capsule 2 in its movement towards the brewing position. In this example, the grooves 60 act as slides for allowing the guiding edge 10 of the capsule 2 to slide through the grooves.

The capsule handler 14 further comprises a protrusion 30. In this example the capsule handler 14 comprises two protrusions 30 placed symmetrically opposite to each other, one in each groove 60. In this example a shortest distance between the protrusions 30 is slightly smaller than a largest cross dimension of the rim 10 of the capsule 2. It will be appreciated that the protrusions 30 act as retaining means preventing the rim 10 of the capsule 2 from sliding out of the grooves 60 at the bottom. Hence, in this example the capsule 2 is held in the capsule handler 14 at its rim 10, by the grooves 60 and the protrusions 30.

When the capsule 2 has reached the brewing position with the capsule handler 14 in the ready position, the enclosing member 16 may close upon the capsule 2 for forming the brew chamber 18. Hence the enclosing member 16 and the brewing plate 12 define the brewing position of the capsule 2. In FIG. 3B the closing of the enclosing member 16 is indicated with the arrow A8.

While the capsule 2 is enclosed by the enclosing member 16 and the brewing plate 12 in the brew chamber 18 (see FIG. 3C), a liquid, such as hot water e.g. under pressure, may be supplied to enter the capsule 2 through the entrance face 6. Thus, the beverage may be prepared inside the capsule 2. The prepared beverage, and possibly residual liquid, may now exit the capsule 2 through the exit face 8.

Figure 3C:
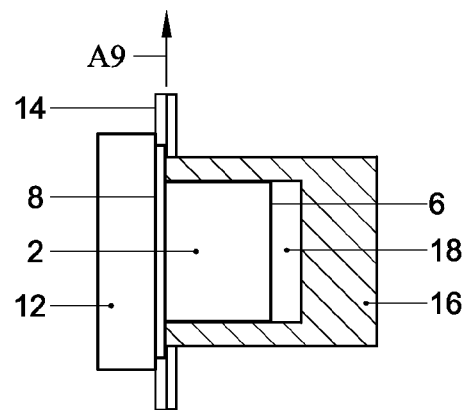
Figure 3D:
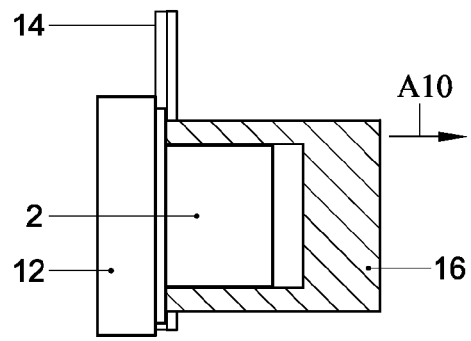
Figure 3E:
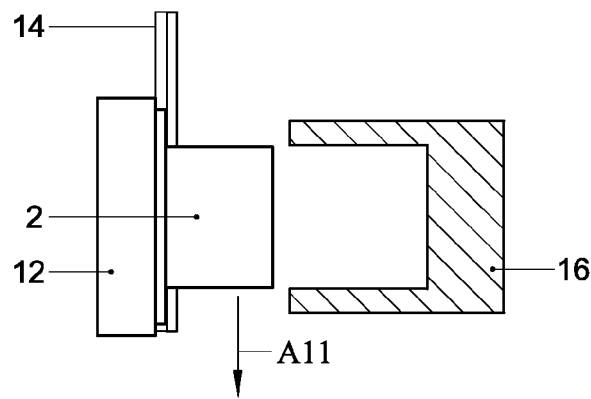

In this example after the beverage has been prepared, the capsule handler 14 is moved, here upwardly, to an ejection position, as indicated with arrow A9 in FIG. 3C. Hence, the capsule handler 14 can be positioned into the ejection position, or start moving towards the ejection position, while the capsule 2 is still enclosed by the enclosing member 16 and the brewing plate 12 in the brew chamber 18 as depicted in FIG. 3D. It will be appreciated that during moving the capsule handler 14 from the ready position to the ejection position, the retaining means, here formed by the protrusions 30, pass the beyond the capsule. In this example, the protrusions 30 are forced beyond the capsule 2, relying on flexibility of the protrusions 30, the capsule handler 14, and/or the rim 10 of the capsule 2. It will be appreciated that the protrusions 30 may also be mounted to the capsule handler 14 in a flexible way, e.g. by means of resilient elements such as a leaf spring, helical spring, rubber mass or the like. Alternatively, or additionally, the protrusions 30 may be actively retracted by a movement mechanism of which many examples are known per se, such as rods, cams, wires, etc. The enclosing member 16 prevents the capsule 2 from being taken along with the moving capsule handler 14.

Figure 3F:
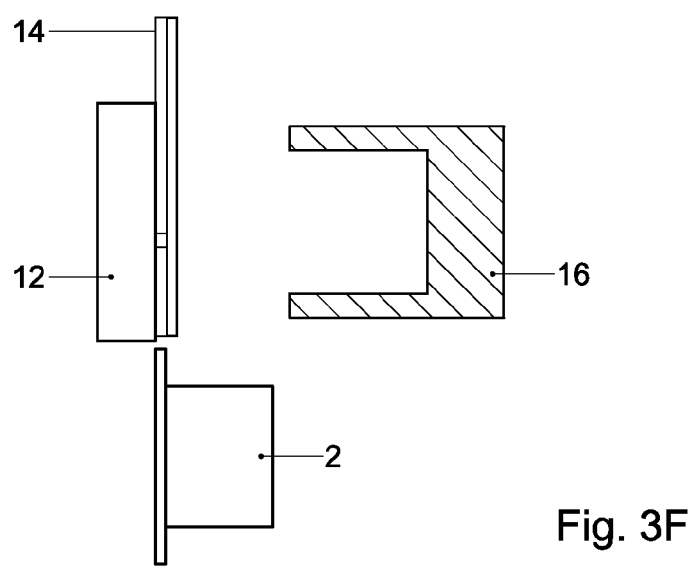

Finally, the enclosing member 16 is moved away from the brewing plate 12 as indicated with arrow A10. When there is sufficient space between the brewing position and the enclosing member 16 the capsule 2 may be ejected, e.g. by gravity as indicated with arrow A11 in FIG. 3E, so as to be removed from the brewing plate 12 as shown in FIG. 3F. If desired, the capsule handler 14 may be returned, here downwardly, to the ready position, so that the device 1 is ready to accept another capsule.

In this example, the liquid is supplied to the capsule 2 while the capsule handler 14 is in the ready position as shown in FIG. 3C. In a slightly modified embodiment, the liquid may be supplied to the capsule 2 while the capsule handler is in the ejection position as shown in FIG. 3D, or while the capsule handler 14 is moving from the ready position to the ejection position.

It will be appreciated that the device 1 as described with respect to FIGS. 3A-3F may be designed as a top loading device.

Figure 4:
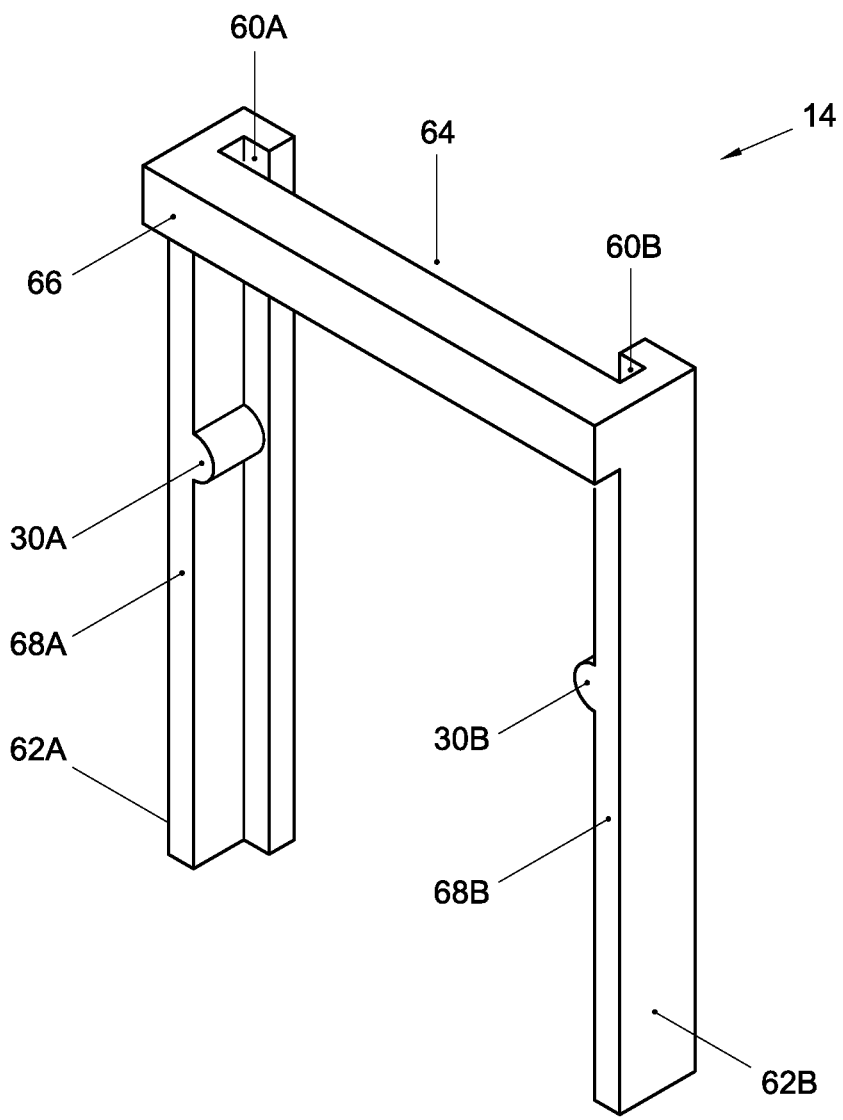
FIG. 4 shows an example of a capsule handler for use in a device according to the third example.

FIG. 4 shows an example of a capsule handler 14 for use in the device 1 as discussed with respect to FIGS. 3A-3F. In this example, the capsule handler comprises a first guide means 62A and a second guide means 62B. The first guide means 62A comprises a first groove 60A. The second guide means comprises a second groove 60B. In this example, the capsule handler 14 comprises a bridge 66 connecting the first and second guide means 62A,62B. Hence, in this example, the capsule handler 14 is designed as a monolithic part. The capsule handler 14 being a monolithic part greatly decreases the complexity of the device 1.

In use the capsule handler 14 may be positioned adjacent to the brewing plate 12. The capsule handler may abut the brewing plate 12 with front faces 68A and 68B. Hence, the grooves 60A,60B may be complemented by the brewing plate. It will be appreciated that it is also possible that the grooves are completely formed in the guide means. Then each groove may be flanked by a ridge towards the brewing plate 12 and towards the enclosing member 16 (see FIG. 5A) In this example, the bridge 66 is designed to be positioned over the brewing plate 12.

The capsule handler of FIG. 4 comprises a substantially T-shaped insertion slot 64. The capsule 2 may be inserted into the insertion slot 64 such that the rim 10 of the capsule 2 is guided in the grooves 60A,60B. The capsule may slide through the grooves 60A, 60B, along the brewing plate 12 towards an brewing position. The rim 10 of the capsule 2 may be supported by the protrusions 30A, 30B when the capsule is in the brewing position.

FIGS. 5A-5F show a schematic representation of an exemplary sequence of events in a fourth example of a device 1 according to the invention for preparing a beverage using a capsule 2.

In the example of FIGS. 5A-5F, the device 1 comprises a second chamber portion in the form of a brewing plate 12. The brewing plate 12 is designed such that when the exit face 8 of the capsule 2 abuts against, or at least is brought close to the brewing plate 12, the beverage exiting the capsule 2 can be drained through the brewing plate 12. Thereto the brewing plate 12 may be provided with perforations, not shown in FIGS. 5A-5F.

In the example of FIGS. 5A-5F, the device 1 further comprises a capsule handler 14. The features and functions of the capsule handler in this example will be elucidated below.

In this example of FIGS. 5A-5F the device 1 further comprises a first chamber portion in the form of an enclosing member 16. The enclosing member 16 is arranged for enclosing the capsule 2. The enclosing member 16 is also arranged for forming a brew chamber 18 enclosing the capsule 2 by closing the enclosing member 16 onto the capsule 2 and the brewing plate 12. It will be appreciated that the enclosing member 16 may comprise liquid supply means (not shown) for supplying the liquid, such as hot water, to the entrance face 6 of the capsule 2.

An exemplary functioning of the device according to FIGS. 5A-5F is as follows.

Figure 5A:
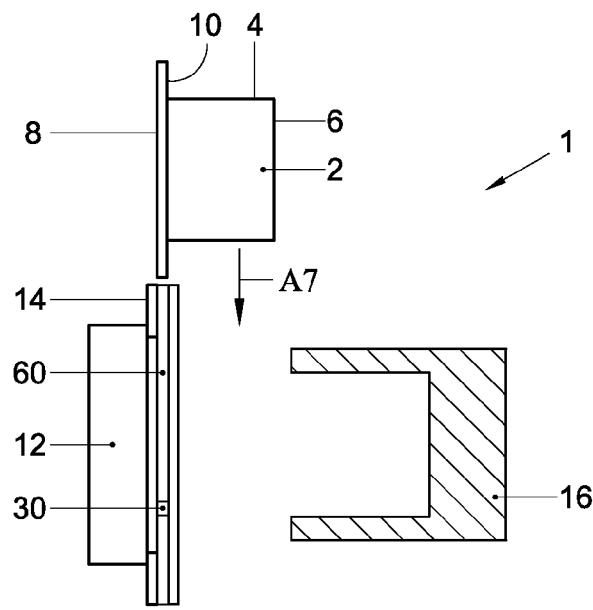
FIGS. 5A-5F show a schematic representation of an exemplary sequence of events in a fourth example of a device according to the invention for preparing a beverage using a capsule.

In a starting position, the enclosing member 16 is positioned remote from the brewing plate 12, such that it is possible to insert the capsule 2 in between the enclosing member 16 and the brewing plate 12 as shown in FIG. 5A. The enclosing member 16 being remote from the brewing plate 12 is also referred to as the open position of the enclosing member 16 with respect to the brewing plate 12. In FIG. 5A the capsule handler 14 is positioned in a loading position. In this loading position of the capsule handler 14 the capsule 2 may be inserted into the capsule handler as indicated with arrow A7.

Figure 5B:
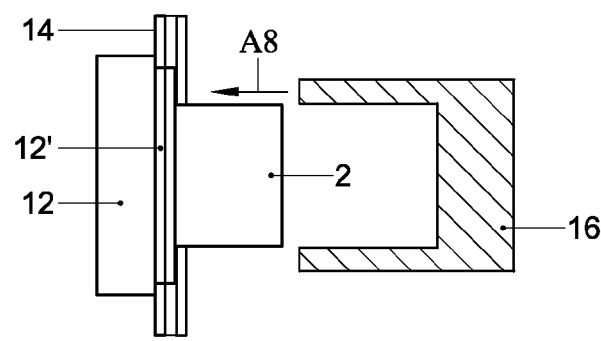

In this example, the loading position of the capsule handler 14 is the same position as the ready position of the capsule handler 14. Hence, once the capsule 2 has been inserted in the capsule handler 14, the capsule moves towards the brewing position as shown in FIG. 5B. When the capsule 2 is in the brewing position the exit face 8 of the capsule 2 abuts the brewing plate 12 in this example.

In this example the capsule handler 14 comprises two grooves 60 (only one groove 60 is shown in the cross section of FIGS. 5A-5F). The grooves 60 act as guide means, guiding the guiding edge 10 of the capsule 2 in its movement towards the brewing position. In this example, the grooves 60 act as slides for allowing the guiding edge 10 of the capsule 2 to slide through the grooves.

The capsule handler 14 further comprises a protrusion 30. In this example the capsule handler 14 comprises two protrusions 30 placed symmetrically opposite to each other, one in each groove 60. In this example a shortest distance between the protrusions 30 is slightly smaller than a largest cross dimension of the rim 10 of the capsule 2. It will be appreciated that the protrusions 30 act as retaining means preventing the rim 10 of the capsule 2 from sliding out of the grooves 60. Hence, in this example the capsule 2 is held in the capsule handler 14 at its rim 10, by the grooves 60 and the protrusions 30.

When the capsule 2 has reached the brewing position with the capsule handler 14 in the ready position, the enclosing member 16 may close upon the capsule 2 for forming the brew chamber 18. Hence the enclosing member 16 and the brewing plate 12 define the brewing position of the capsule 2. In FIG. 5B the closing of the enclosing member 16 is indicated with the arrow A8.

Figure 5C:
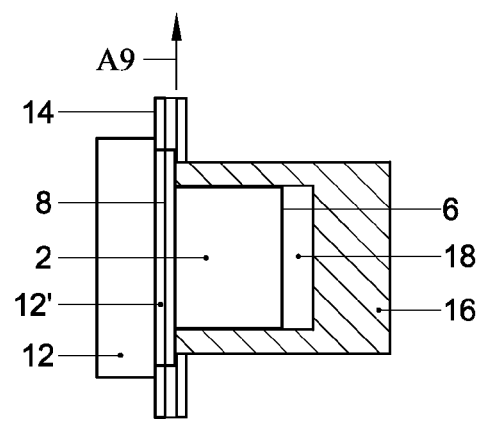

As can be seen in FIG. 5C, in this example a leading portion 12' of the brewing plate 12 and the capsule handler 14 are adapted to each other such that the leading portion 12' passes into the capsule handler 14 to abut against the exit face 8 of the capsule 2. Hence, the capsule 2 is made to abut the brewing plate 12 immediately upon insertion into the device. It will be appreciated that a similar adaptation of the enclosing member 12 and the capsule handler 14 can be seen in FIGS. 13a, 14a, 15a and 16a.

While the capsule 2 is enclosed by the enclosing member 16 and the brewing plate 12 in the brew chamber 18 (see FIG. 5C), a liquid, such as hot water e.g. under pressure, may be supplied to enter the capsule 2 through the entrance face 6. Thus, the beverage may be prepared inside the capsule 2. The prepared beverage, and possibly residual liquid, may now exit the capsule 2 through the exit face 8.

In this example after the beverage has been prepared, the capsule handler 14 is moved, here upwardly, to an ejection position, as indicated with arrow A9 in FIG. 5C. Hence, the capsule handler 14 can be positioned into the ejection position, or start moving towards the ejection position, while the capsule 2 is still enclosed by the enclosing member 16 and the brewing plate 12 in the brew chamber 18 as depicted in FIG. 5D.

It will be appreciated that during moving the capsule handler 14 from the ready position to the ejection position, the retaining means, here formed by the protrusions 30, pass the beyond the capsule. In this example, the protrusions 30 are forced beyond the capsule 2, relying on flexibility of the protrusions 30, the capsule handler 14, and/or the rim 10 of the capsule 2. It will be appreciated that the protrusions 30 may also be mounted to the capsule handler 14 in a flexible way, e.g. by means of resilient elements such as a leaf spring, helical spring, rubber mass or the like. Alternatively, or additionally, the protrusions 30 may be actively retracted by a movement mechanism of which many examples are known per se, such as rods, cams, wires, etc.

Figure 5D:
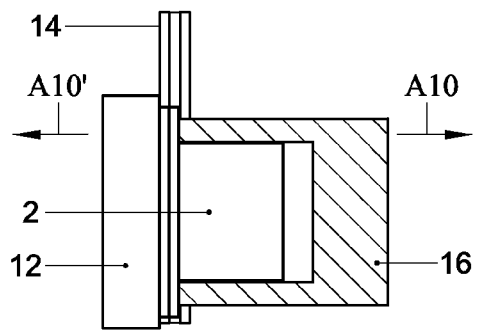
Figure 5E:
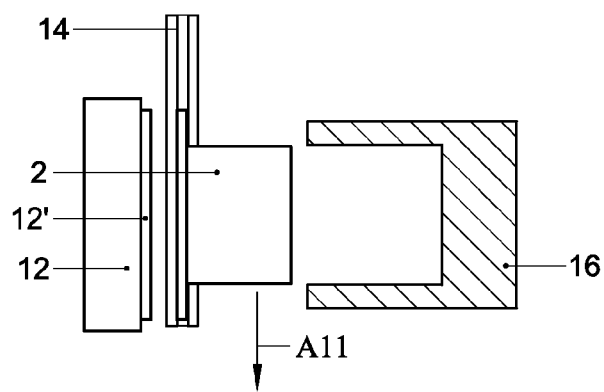
Figure 5F:
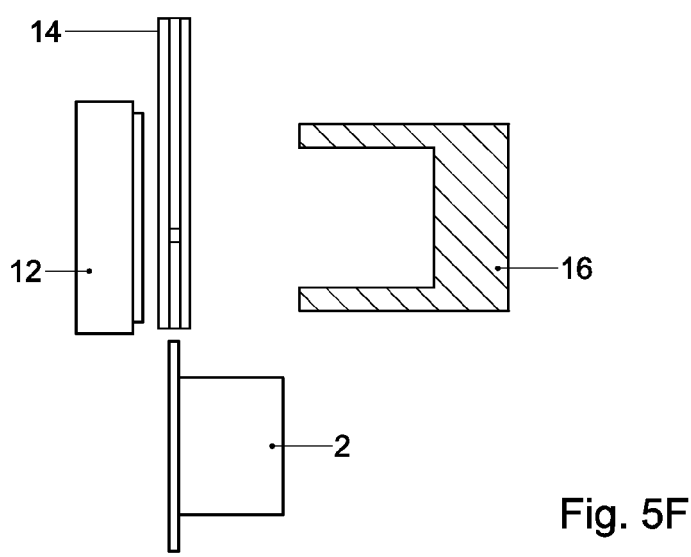
Figure 6:
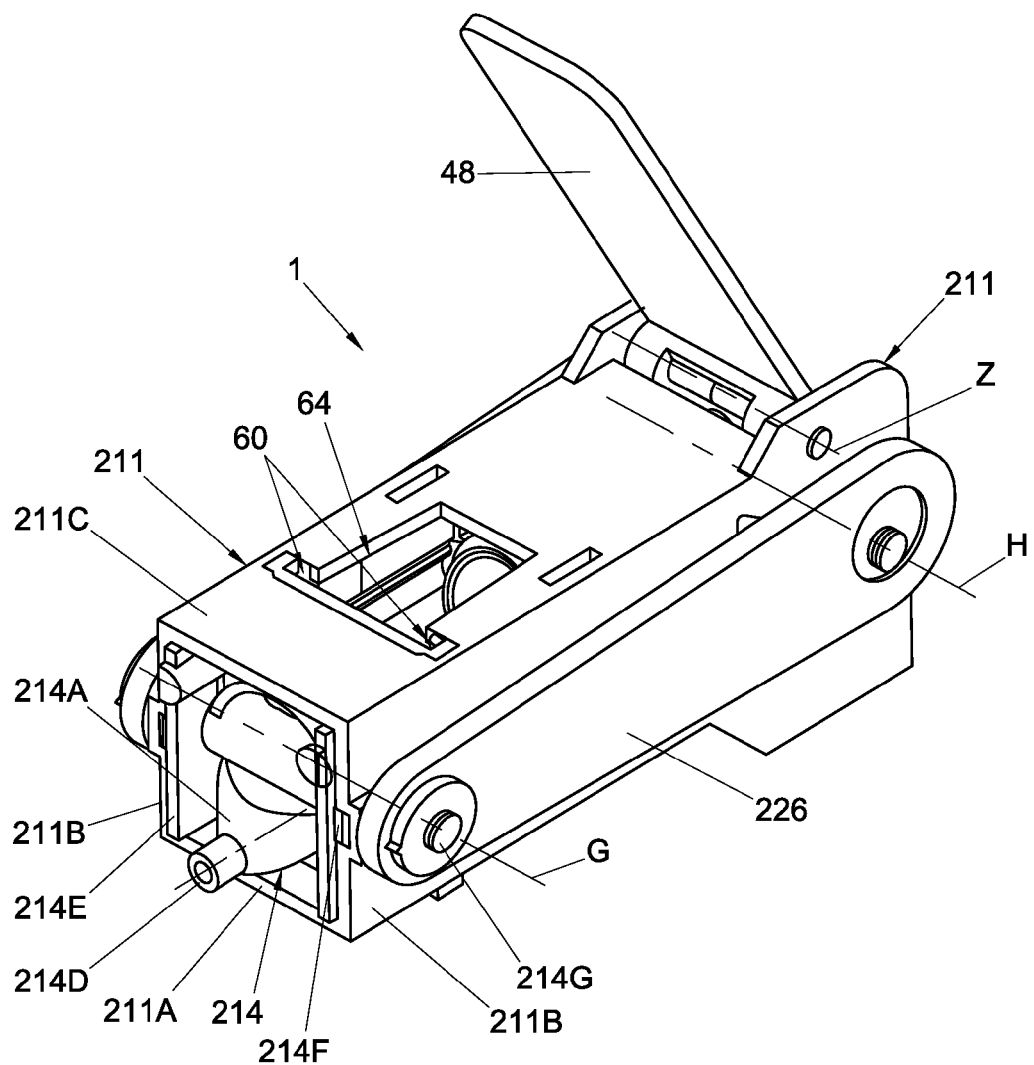
FIG. 6 represents an axonometric view of a fifth example of a device according to the invention, with the raised actuation lever.
Figure 7:
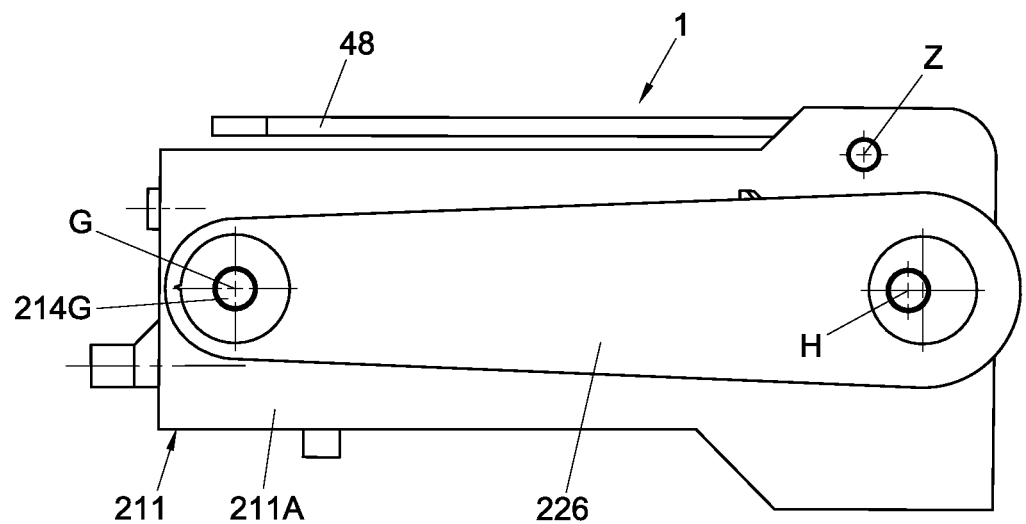
FIG. 7 represents a side view of the device of FIG. 6, with the lowered actuation lever.
Figure 8:
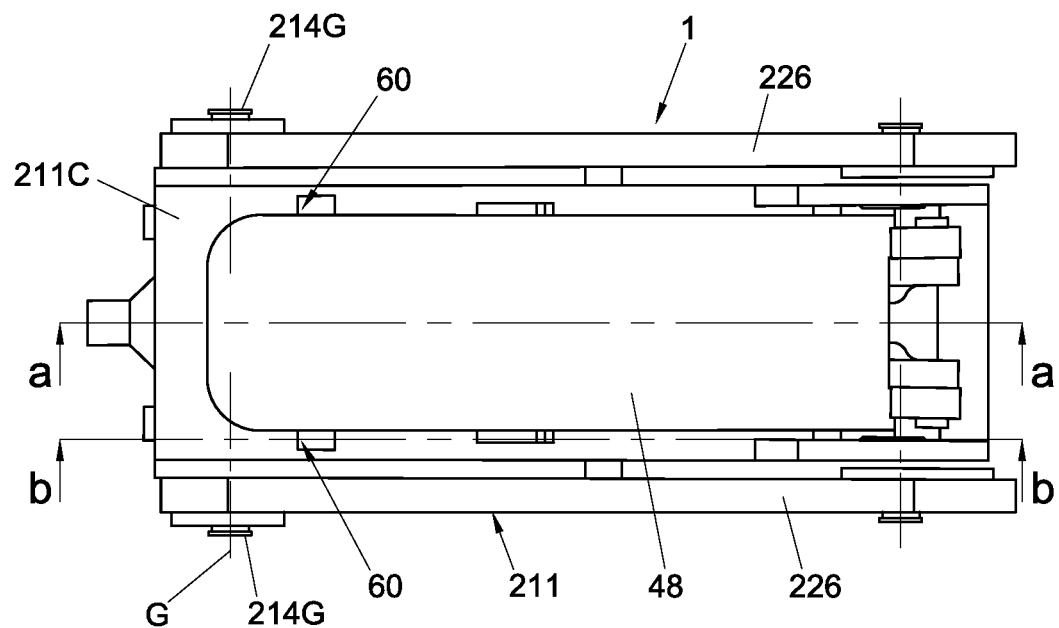
FIG. 8 represents a top view of the device of FIG. 7.
Figure 9:
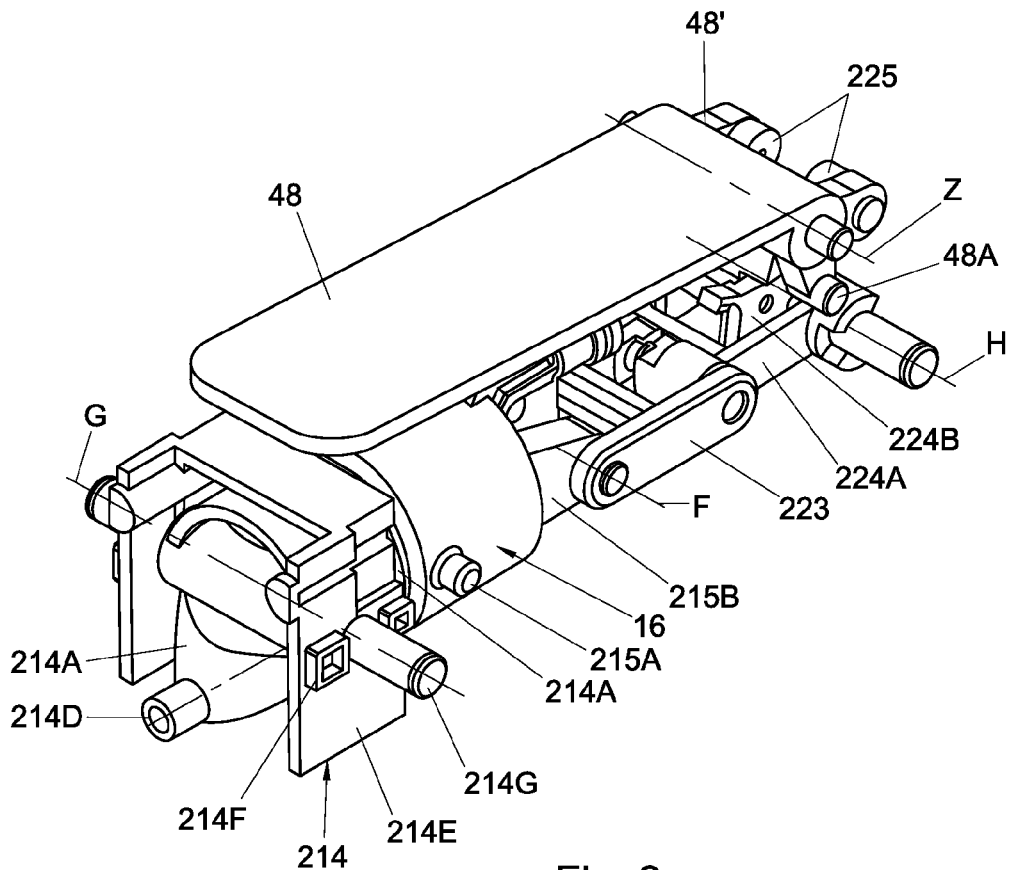
FIG. 9 represents an axonometric view of a first group of components of the device according to FIGS. 6-8, with the lowered actuation lever.
Figure 10:
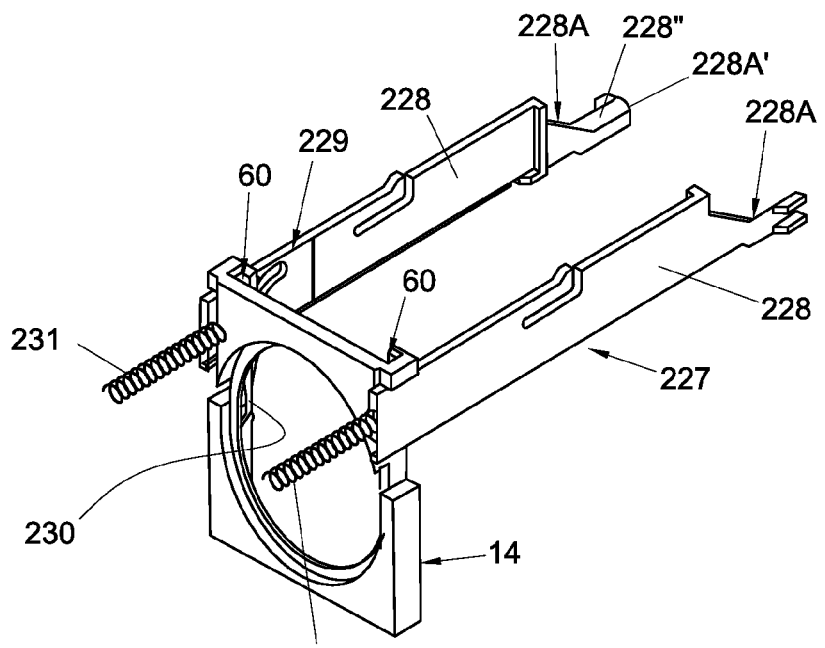
FIG. 10 represents an axonometric view of a second group of components of the device according to the FIGS. 6-8.
Figure 12:
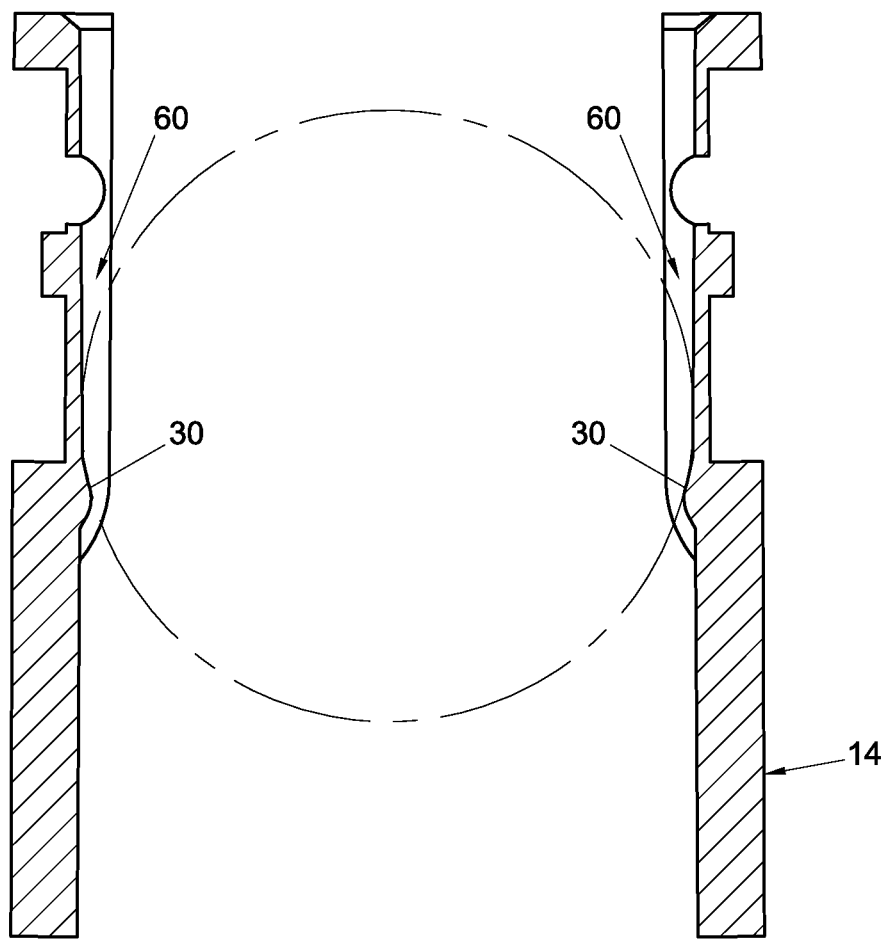
FIG. 12 represents a front view of the component of FIG. 11 in section according to the plane VII-VII of FIG. 11.
Figure 11:
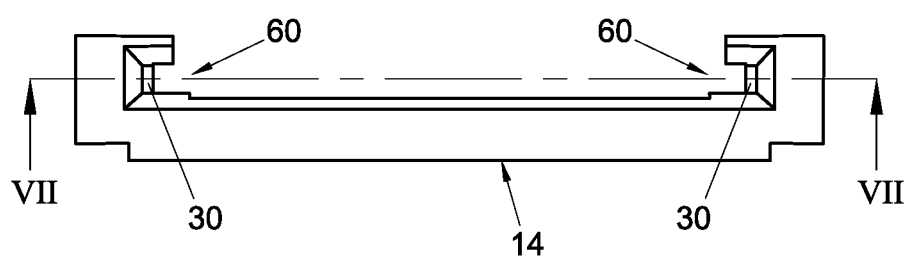
FIG. 11 represents the top view of a component of the device shown in FIGS. 6-10, apt to guide and support a capsule which can be used in the device.

Finally, the enclosing member 16 and the brewing plate 12 are moved apart as indicated with arrows A10 and A10' in FIG. 5D. It will be appreciated that moving both the enclosing member 16 and the brewing plate 12 away from the brewing position may aid in allowing to free the capsule 2. It will be appreciated that moving the brewing plate 12 away from the brewing position may prevent the capsule 2 from remaining attached to the brewing plate 12. When there is sufficient space between the brewing plate 12 and the enclosing member 16 the capsule 2 may be ejected, e.g. by gravity as indicated with arrow A11 in FIG. 5E, so as to be removed from the brewing position as shown in FIG. 5F. If desired, the capsule handler 14 may be returned, here downwardly, to the ready position, so that the device 1 is ready to accept another capsule. It will be appreciated that the second chamber portion 12 is moved only after brewing. The second chamber portion 12 is not moved prior to brewing, i.e. between the moment the device is ready to accept a capsule and actually brewing the beverage using that capsule. It will be appreciated that in this example the second chamber portion 12 may start moving simultaneously with the first chamber portion 16. It is also possible that the second chamber portion 12 starts moving earlier or later than the first chamber portion 16.

In this example, the liquid is supplied to the capsule 2 while the capsule handler 14 is in the ready position as shown in FIG. 5C. In a slightly modified embodiment, the liquid may be supplied to the capsule 2 while the capsule handler is in the ejection position as shown in FIG. 5D, or while the capsule handler 14 is moving from the ready position to the ejection position.

It will be appreciated that the device 1 as described with respect to FIGS. 5A-5F may be designed as a top loading device.

In FIGS. 6-16 a fifth example of a device according to the invention is illustrated, limitedly to the members necessary to the comprehension of the invention itself. As already mentioned, it remains understood that the device according to the invention can be inserted inside a more complex machine, for example a coffee machine equipped with additional members known per se, such as a boiler, a pump for feeding hot water, a spout for dispensing coffee, etc.

By referring to FIGS. 6-16, a brewing device according to the invention is designated as a whole with the number 1. It comprises an outer frame 211 with mainly longitudinal development, for example formed by a bottom 211A, two longitudinal walls 211B and a top 211C. Such frame, substantially hollow inside, centrally defines a sliding area 212 for two brewing chamber portions, respectively a first chamber portion 16, corresponding to the aforementioned enclosing member 16, and a second chamber portion 214. The sliding takes place along the central axis X with longitudinal development of the frame, which coincides then with the sliding direction.

In particular, the first portion of brewing chamber 16 has a body 215 preferably with cylindrical geometry, with a shape like a beaker or cup which has inside thereof a cavity 216, forming a receptacle, adapted to receive a capsule 2. In this implementing example, the capsule 2, for example, is of the type with frustoconical body and upper face, hereinbefore referred to as exit face, 8 equipped with a wall, which can be pierced, and annular flange 10. As it can be seen in the figures, when the capsule 2 is housed in the first chamber portion 16, the capsule flange 10 abuts on the ending edge of the cup-like body 215.

The first chamber portion 16 is arranged to translate along a pair of longitudinal guides 217 obtained on the side wall 211B of the frame 211 (in the figures in side section only one is shown, the one seen from the section plane, the other one being defined on the other not visible wall), for example by means of a pair of opposed first cylindrical cursors 215A, which extend laterally outwardly from the cup-like body 216.

In this example, a capsule identifier 16A develops from the bottom of the first chamber portion 16. Still on the bottom of the chamber portion 16, the beginning of the supply duct 16B for the extracting fluid is defined, as better explained later. Upwards of the supply duct 16B there is an anti-dripping/anti-emptying valve 16C of the supply hydraulic circuit.

The second portion of brewing chamber 214 comprises a hollow body 214A which has a first side closed by an intermediate buffer 12, 214B plate, corresponding to the aforementioned brewing plate 12, with a plurality of holes 214C and adapted to close the cup-like body 215 of the first chamber portion 16 when the brewing chamber is closed. The hollow body 214A further has an opposed second side equipped with an outlet duct 214D for the beverage. In this example, the hollow body 214A is restrained to a subframe 214E arranged to translate along the axis X. In particular, the subframe 214E, on opposite sides, has second cursors 214F, for example with rectangular shape, slidingly arranged in the longitudinal guides 217.

The holes 214C of the intermediate closing buffer 12, 214B practically are holes allowing the passage of the beverage extracted from the capsule with the correct pressure. In this example, on the buffer 12, 214B also piercing members are present, not shown in the figures, allowing piercing of the upper face 8 (therefore constituted by a wall which can be pierced) of the capsule 2. The buffer is shaped so as to adhere sealingly onto the flange 10 of the capsule 2 when the brewing chamber is closed.

It is to be noted that in this example the utilized capsule 2 is of the type with the face permeable to the liquids, that is with holes to allow the passage of the brewing liquid. Such face is the one which is to face towards the bottom of the cup-like body 215 of the first chamber portion 16. On such bottom no piercing member is present. Evidently, according to other embodiments of the invention, on such first chamber portion 16 also one or more piercing members could be present, in case of a capsule which can be pierced on both faces. In other embodiments capsules with a wall permeable to the extracting fluid face the buffer can be used, and therefore on this buffer no other piercing members need be present.

As it will be better explained hereinafter, in this example the portions of the brewing chamber 16 and 214 translate between an open position (FIGS. 13a, 13b), wherein the chamber portions are moved apart along the axis X and the capsule 2 can be inserted in the device in order to arrange it in a brewing position P, to a closed position (FIGS. 7, 8, 9, 15a, 15b), wherein the chamber portions 16 and 214 are coupled with the buffer 12, 214B closing the cup-like body 215 and the capsule 2 contained herein. As it will become clearer hereinafter, in this example the brewing position P is fixed with respect to the frame 211. In this example the second chamber portion 214 is at a small distance from the exit face of the capsule 2 upon insertion of the capsule, and is moved towards the capsule upon closing. It will be appreciated that it is also possible that the capsule exit face 8 abuts the second chamber portion 214 upon insertion as demonstrated in FIGS. 5A-5F.

It is to be noted that in this example both the first chamber portion 16 and the second chamber portion 214 are allowed to have some play orthogonal to the siding direction X, e.g. to make a slight oscillation with respect to two horizontal axes intersecting the sliding direction X (and in particular respectively around axes passing though 215A and 214F) in order to recover possible light structural clearances and avoid lockings during the sliding thereof along X.

In order to make the capsule 2 to assume the brewing position P, a positioner, corresponding to the aforementioned capsule handler, 14 is provided, in this example advantageously under the shape of a frame-like body, whereon two opposed parallel guiding channels 60 are defined for opposed portions of the flange 10 of the capsule 2. The guiding channels 60 are spaced apart therebetween by a distance substantially equal or little greater than the outer diameter of the flange of the capsule. Such guiding channels further end in a middle position of the frame-like body 14, at a pair of protrusions, here convexities, 30 protruding from the channels themselves and which act as supporting members or retaining means for the capsule. In fact, such convexities 30 have a smaller distance than the outer diameter of the capsule flange and therefore when the latter is inserted in the guiding channels 14 by means of the insertion area 64 arranged on the top of the frame 211C, the capsule falls along the channels as far as the convexities 30, which will retain it. It will be appreciated that hence when the positioner 14 is in the ready position, ready to accept insertion of the capsule 2, the retaining means 30 are positioned so as to allow the capsule 2 to fall into the brewing position P. In this example, the second chamber portion 214 is moved to a position at a distance from the positioner 14 when the positioner is ready to accept insertion of the capsule 2. It will be appreciated that it is also possible that the second chamber portion 214 is adjacent to or abuts the positioner 14 when the positioner is ready to accept insertion of the capsule 2. In the latter situation, the exit face 8 may abut the plate 12 immediately when the capsule 2 inserted into the positioner 14 reaches the brewing position P.

In this embodiment, the positioner 14 assumes a position along the longitudinal axis X of the sliding area 212 which is substantially fixed. This does not mean that the positioner 14 is not mobile (as better explained later, such positioner can translate vertically, that is orthogonally to the axis X) but simply that it cannot be moved along the axis X, that is the sliding direction of the portions of the brewing chamber 16 and 214. In a preferred embodiment, the orientation of such positioner with frame-like shape is substantially orthogonal to the axis X, that is the channels 60 are orthogonal to the sliding direction of the brewing chamber portions.

Hereinafter the kinematic components allowing the operation of the device will be described. Evidently, hereinafter, for the sake of simplicity, such components will be mentioned singularly, whereas in a preferred embodiment in reality they are (as it is well visible from the figures) constituted by pairs of components arranged symmetrically with respect to a vertical plane in which the axis X lies.

As mentioned, in this example the brewing chamber portions 16 and 214 can translate one with respect to the other one and with respect to the frame 211 along the axis X. In order to allow opening or closing the brewing chamber, there is a control lever 48 connected to a kinematic chain of joined motion of the two chamber portions 16 and 214 between the closed and open configurations and vice versa.

In this example, the control lever 48 is hinged to the frame 211 according to an axis Z orthogonal to the axis X and orthogonal to the channels 60, in this example a horizontal axis. Such lever 48 is connected by means of an intermediate group to a first pushing piston rod 223 articulated to the projection 215A of the first brewing chamber portion 16 according to a horizontal articulation axis F and intersecting the axis X. The push of the first piston rod 223 on the first chamber portion 16 allows the translation thereof along the axis X. More in particular, in this example the above-mentioned intermediate group comprises a crank 224A hinged at an end to the first pushing piston rod 223 and with the opposite end to the frame 211 by means of a horizontal axis H intersecting the axis X (as it can be seen in the figures, the rotation of the crank is limited angularly, that is it does not perform a complete rotation, not being necessary to the purposes of the motion of the first chamber portion). The intermediate group further comprises a rocker arm 224B hinged coaxially to the crank 224A, which has two opposed rabbetings 224B' and 224B" spaced apart angularly therebetween with respect to the rotation axis H. The crank 224A is arranged between said rabbetings 224B' and 224B" and therefore the same rabbetings 224B' and 224B" are adapted to collide alternatively against said crank 224A according to the sense of rotation of the rocker arm around a H. At last, the intermediate group comprises a second piston rod 225 the ends of which are hinged respectively in an intermediate position of the rocker arm 224B and to a projection 48' of the lever 48 about opposite to the hinging axis Z.

In this example the second piston rod 225 has an arcuate configuration to partially follow the course of the hinging pin according to the axis H of the rocker arm 224B when the lever 48 is raised upwards (to which the open configuration of the brewing chamber corresponds; see FIGS. 13a, 13b, 14a, 14b). In this configuration, that is with the lever 48 raised upwards, the crank 224A and the first pushing piston rod 223 form an acute angle with a vertex facing downwards. From this configuration, a lowering of the control lever 48 causes a raising of the second piston rod 225 and consequent rotation upwards of the rocker arm 224A which rotates for a predetermined angle comprised between the rabbetings 224B' and 224B" without any effect until the second rabbeting (the lowest one) 224B" collides onto the crank 224A, to which corresponds the raising of the end of the same crank 224A and of the first piston rod 223 hinged thereto and the consequent pushing of the brewing chamber portion 16 towards the brewing position P correspond.

As mentioned above, the kinematic chain which from the control lever 48 allows moving the first brewing chamber portion 16, in this example at the same time it even allows the coordinated and joined motion of the second portion of brewing chamber 214. This takes place thanks to a third motion piston rod 226 which is hinged, according to a horizontal axis G intersecting the sliding axis X, at one end to a pin 214F projecting laterally from the second portion of brewing chamber 214. In this example, such pin 214F is integral with the second portion of brewing chamber 214 and it translates integrally therewith. At the opposite end, such third piston rod 226 is hinged in an eccentric way to the hinging pin with respect to the axis H of the crank 224A. Practically, a rotary motion of the crank 224A by means of the control lever 48, thanks to the eccentric hinging, causes an eccentric rotation and therefore a lowering or raising of the hinging end of the piston rod 226 and a consequent motion of the axis G along a direction parallel to the axis X, that is it causes a translation of the second portion of brewing chamber 214 along the axis X. Therefore, a rotation of the lever 48 from the top downwards leads to a translation of the first brewing chamber portion 16 towards the brewing position P and consequently a concomitant translation of the second chamber portion 214 towards the brewing position P to close the chamber itself; a rotation of the lever 48 from the bottom upwards leads to a translation of the first chamber portion 16 from the brewing position P to open the chamber itself with consequent translation in opposite direction of the second portion of chamber 214. It will be appreciated that if a motion of the second chamber portion is desired according to FIGS. 5A-5F the construction using the third motion piston rod 226 may be slightly modified.

It is to be noted that in this example the third piston rod 226 is outside the frame 211. Evidently the pin 214E is a through pin through an opening (not shown in the figures) defined on the side 211B of the frame 211 elongated in direction of the axis X to allow the translation of the pin itself.

From a dimensional point of view, the translation of the first chamber portion 16 is much larger with respect to the translation of the second chamber portion 214 in this example. The latter, in reality, is very limited; for example it is given by the difference of the segments T' and T" shown in FIGS. 13a and 15a, respectively.

In order to complete the description of the device it is necessary to explain the way in which the removal of the capsule 2 from the brewing position P takes place, once the chamber 16, 214 is opened after having performed the brewing.

According to the invention, this takes place without moving the capsule from the position P, being the retaining members 30 are moved so as to free on the lower side the capsule and allow the falling thereof downwards.

According to a preferred embodiment of the invention, there is motion means for the retaining members which allows a motion thereof on a plane substantially coincident or parallel to the lying plane of the development axes of the guiding channels 60, that is, in the example in the description, according to a vertical direction. In the example, the positioner, in its shape of frame-like body 14, is translated vertically by means of a moving member, or more in particular, a translator upwards 227 formed by a group of components described hereinafter. Such translator 227 can be seen in FIGS. 13 to 16 marked with the letter "b" and in FIG. 10.

Figure 14B:
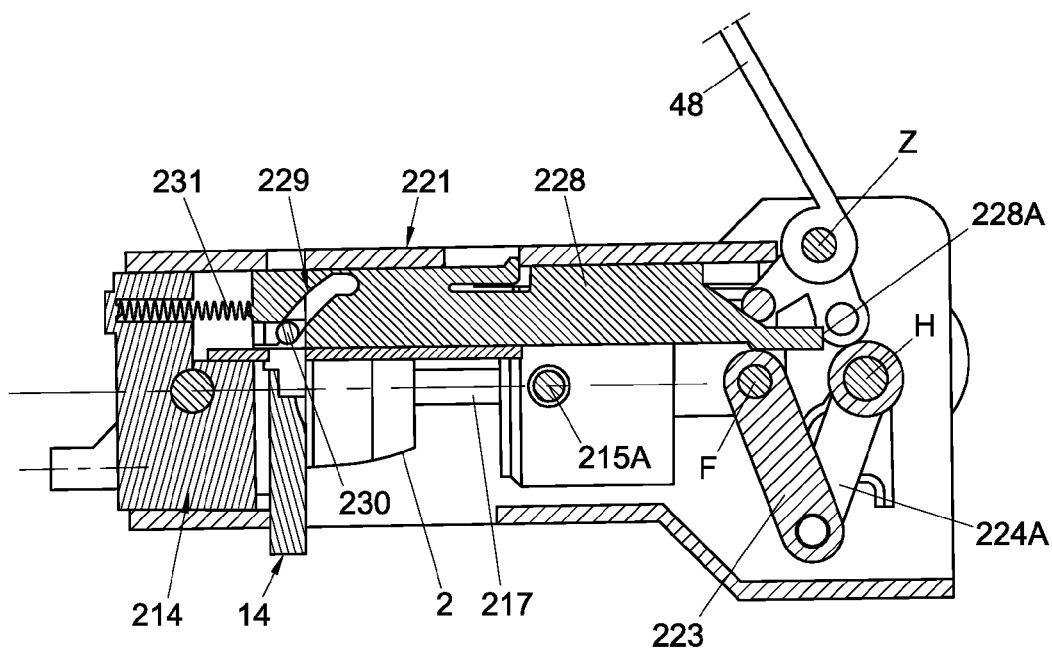
FIG. 14B represents a side section of the device of FIG. 8 in the exemplary working phase depicted in FIG. 14A and taken along the line B-B in FIG. 8, which is parallel to line A-A.
Figure 15A:
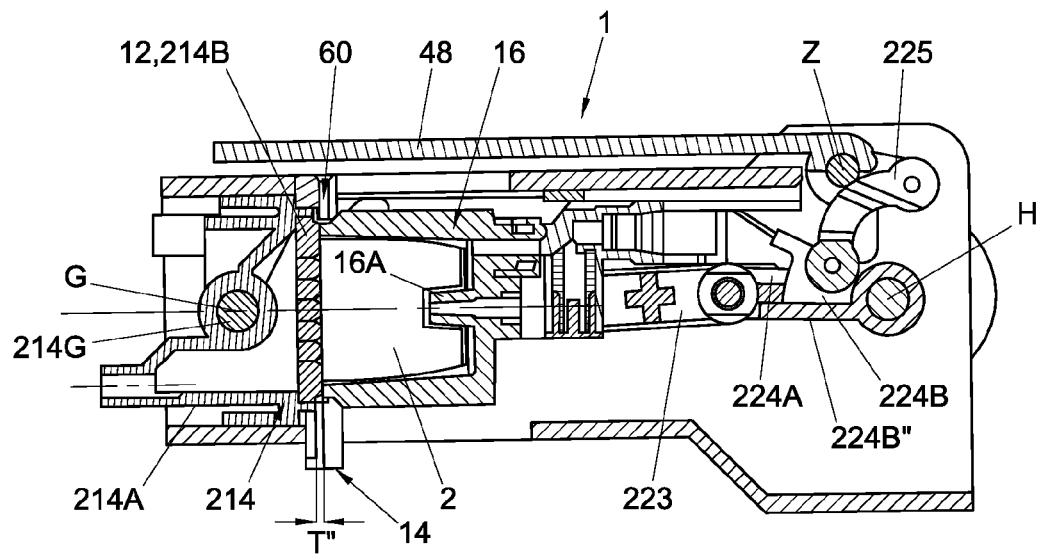
FIG. 15A represents a side section of the device of FIG. 8 in another exemplary working phase and taken along the line A-A in FIG. 8.
Figure 15B:
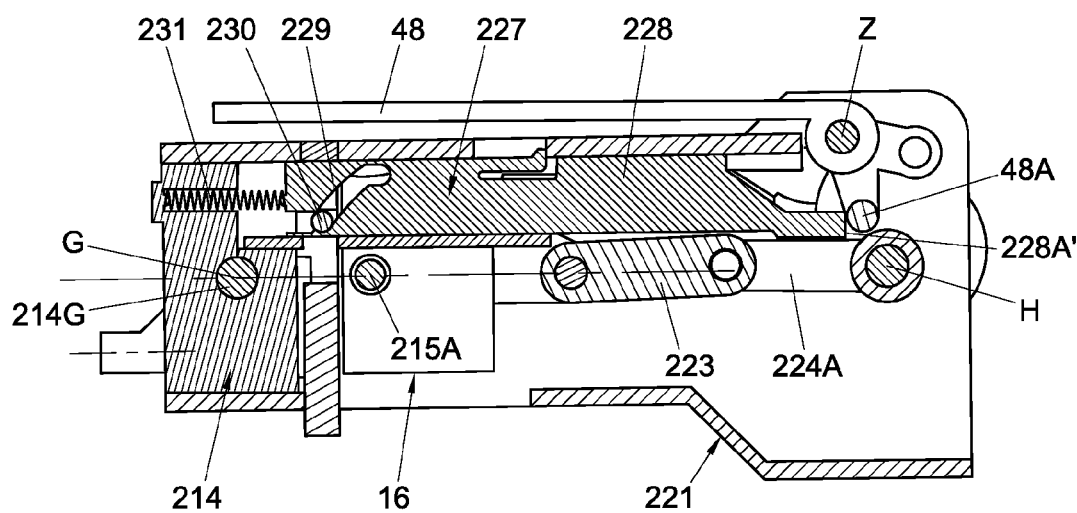
FIG. 15B represents a side section of the device of FIG. 8 in the exemplary working phase depicted in FIG. 15A and taken along the line B-B in FIG. 8, which is parallel to line A-A.
Figure 16A:
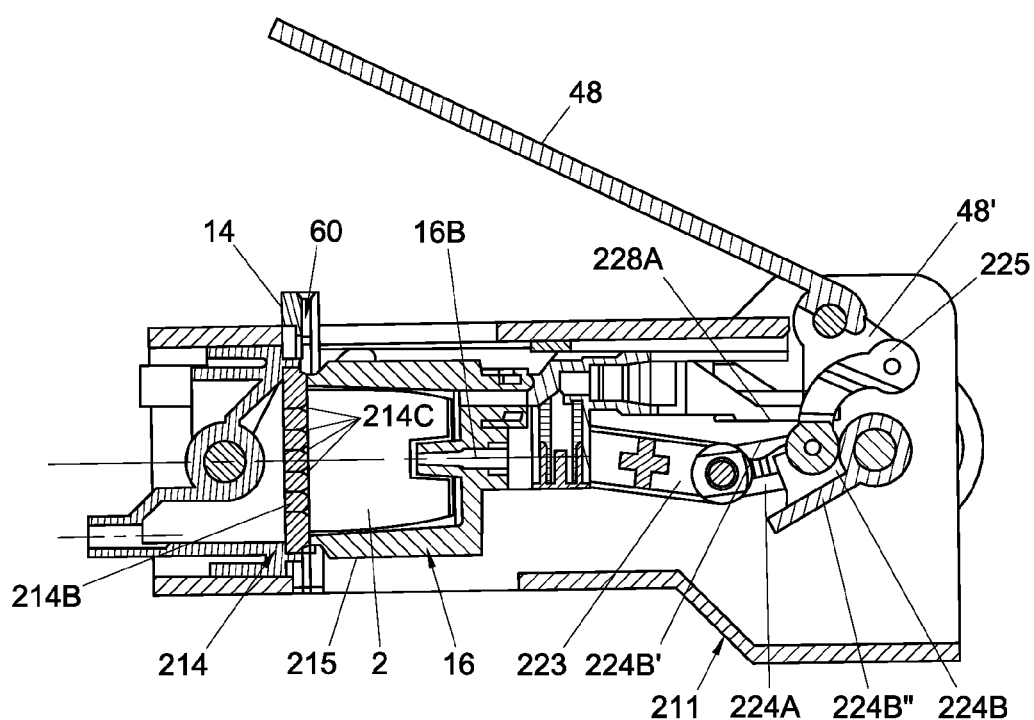
FIG. 16A represents a side section of the device of FIG. 8 in another exemplary working phase and taken along the line A-A in FIG. 8.
Figure 16B:
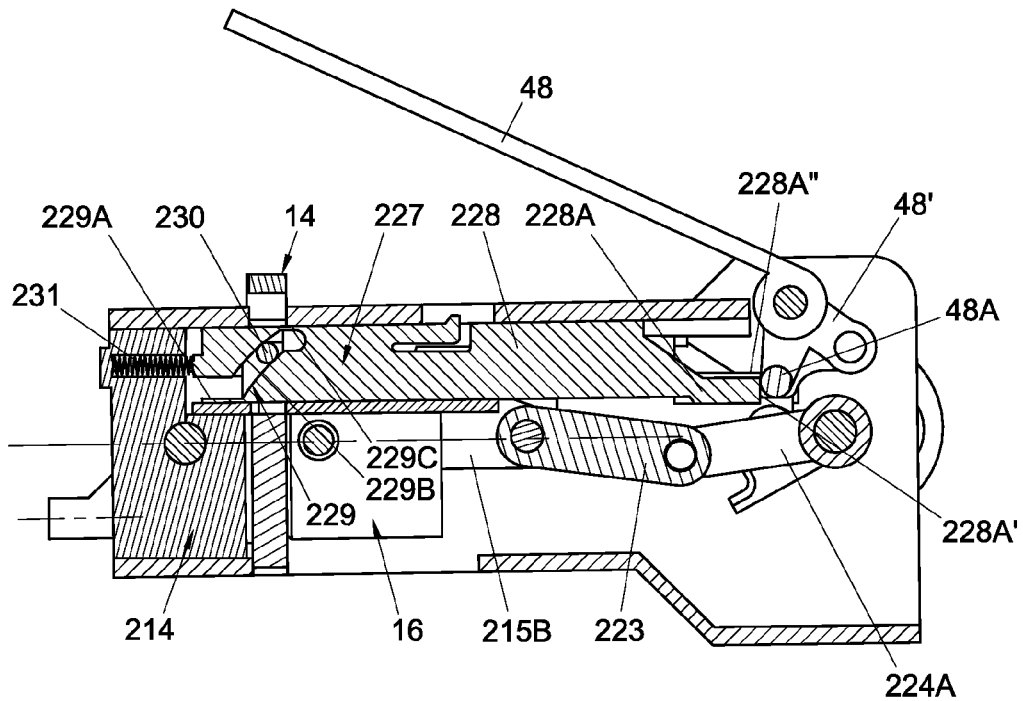
FIG. 16B represents a side section of the device of FIG. 8 in the exemplary working phase depicted in FIG. 16A and taken along the line B-B in FIG. 8, which is parallel to line A-A.

The translator 227 comprises a kinematic mechanism with linear cam restrained to the frame 211 and interacting both with the lever 48 and the positioner 14, so that the positioner 14 in the configuration supporting the capsule 2 (FIGS. 13b and 14b) correspond to a raised position of the lever 48, whereas the chamber closing and the capsule support both by the first chamber portion 16 and by the retaining members 30 of the guiding channels 60 (the positioner 14 has not moved with respect to the previous configuration) corresponds to a rotation of the lever downwards (FIG. 15b, 16b). In this configuration usually the brewing process takes place. From this point, a rotation of the lever 48 upwards (FIG. 16b) causes a vertical raising of the positioner 14 without any motion of the first chamber portion 16 nor of the capsule 2, which remains locked in the brewing chamber, closed; practically in this example there is a delay in the first 26° of lever rotation imposed by the structure with double rabbeting 224B'-224B" of the rocker arm 224B (in the first rotation portion, the rocker arm does not push the crank 224A, until the first rabbeting 224B" meets the same crank, by pushing it downwards) which causes that the chamber does not open. Such vertical motion of the positioner 14 with the blocked capsule 2 has the effect of forcing the retaining convexities 30 on the diametral ends of the flange 10 of the capsule, deforming the latter and allowing the arrangement of the convexities above the same diametral ends. In fact, the convexities 30 do not support the capsule any more.

By continuing the rotation upwards of the control lever 48, the brewing chamber opens (the portions 16 and 214 of chamber are moved apart as above described). The capsule 2 blocked axially by the channels 60 remains in the brewing position P as long as it is not wholly freed from the cup-like body of the first chamber portion 16. Once it is no more contained therein, the capsule is not supported anymore by anything and therefore it falls downwards, freeing the brewing position P. Continuing the rotation of the lever 48, with the capsule fallen down, the positioner 14 is lowered again in the initial position to receive a new capsule.

The kinematic mechanism with linear cam 227 comprises for example a pair of elongated slides 228 arranged symmetrically with respect to the longitudinal middle plane. Hereinafter only one of these elongated slides will be referred to, the description being substantially identical to each one thereof. Each slide 228 is arranged to slide on an inner side of the frame 211 parallel to the axis X and it comprises a shaped eyelet with linear cam 229 and in particular formed by a first end tract 229A parallel to the direction of the slide itself, that is horizontal, a second central tract 229B tilted upwards, and a third tract 229C parallel to the first tract. In such shaped eyelet 229 a pin 230 integral to the positioner 14 is slidingly arranged.

From the opposite portion of the slide 228 with respect to the shaped eyelet 229, there is an area for interacting with the lever 48. In particular such area regards an end flap 228A of the slide 228. Such flap is shaped so as to allow the overlapping of a pushing appendix 48A integral to the lever 48 when the same lever is in raised position (FIG. 13b, 14b). The pushing appendix 48A, on the contrary, is locked on the end flap 228A of the slide when the lever 48 is in lowered position (FIG. 15b). The end face 228A' of the end flap 228A of the slide is bevelled towards outside the frame 211 (the bevelling can be seen in FIG. 10), whereas the upper face 228A" of such end flap 228A of the slide is bevelled on the upper portion towards the inside of the frame 211. Additionally, such flap 228A is elastically deformable in a horizontal plane, that is it is flexible horizontally. During a rotation from the top downwards of the lever 48, the pushing appendix 48A creeps on the bevelled upper face 228A" of the end flap 228A, by obliging it to bend towards the outside of the frame and allowing the same appendix 48A to reach a rear position behind the end face 228A' of the flap 228A. During this phase, the slide 228 does not translate.

Upon raising the lever 48 (for about the first 26° of rotation, FIG. 16b), the pushing appendix 48A collides against the end face 228A' of the flap 228A of the slide 228, by pushing it towards the second chamber portion 214, and obliging the pin 230 to travel through the shaped eyelet with linear cam 229, with consequent raising of the positioner 14 when the pin travels through the tilted tract 229A of the shaped eye-let 229. In this phase the supporting member 30 goes vertically beyond the flange 10 of the capsule 2, which is supported only by the brewing chamber. During the forwarding of the slide 228, the same is subjected to means opposing the motion, such as for example an elastic member 231 in the shape of a helical spring arranged between an end of the slide 228 and the second chamber portion 214. Such elastic member 231 compresses during the forwarding of the slide. Therefore, upon continuing the rotation of the control lever 48, the appendix 48A travels upwards as far as positioning above the flap 228A. At this point the elastic force of the spring 231 urges the slide to go back, by making the pin 230 travel through the shaped eyelet 229 in the opposite way, that is by bringing back downwards the positioner 14 (again FIG. 13b). In this phase the capsule is not supported by the first chamber portion 16 which is back (raising phase of the control lever 48) and therefore it falls downwards. The positioner 14 is brought back in the position for receiving a new capsule, in this example corresponding to the brewing position P.

Summarizing, the operation of the device is the following one. It is to be noted that the FIGS. 13 to 16 marked with "a" show the motion of the chamber portions 16 and 214, whereas FIGS. 13 to 16 marked with "b" show the motion of the positioner 14. The same working phase of the device corresponds to equal numbers of figure.

Figure 13A:
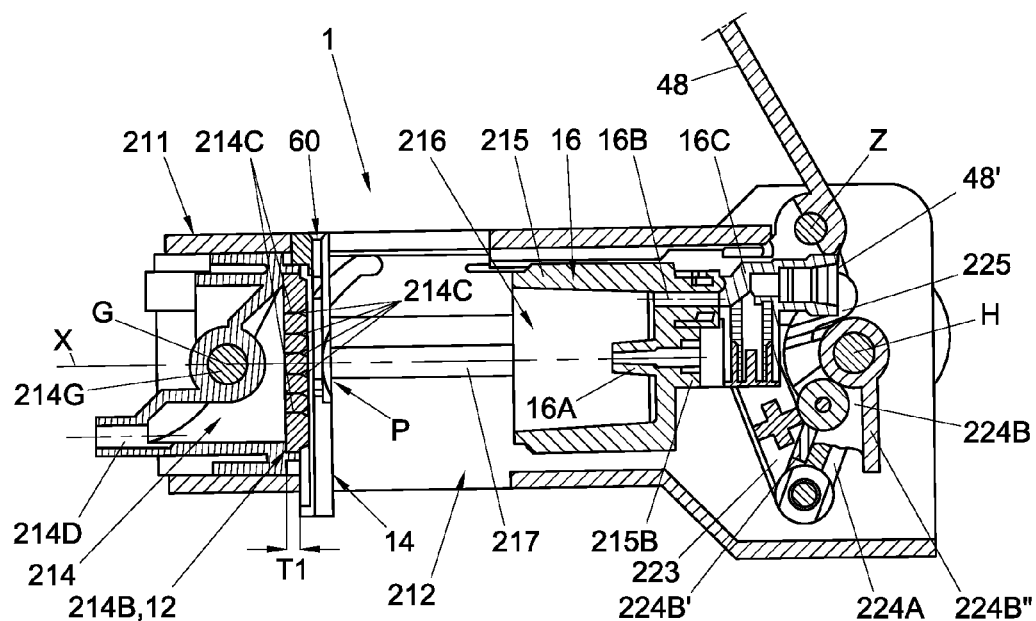
FIG. 13A represents a side section of the device of FIG. 8 in an exemplary working phase and taken along the line A-A in FIG. 8.
Figure 13B:
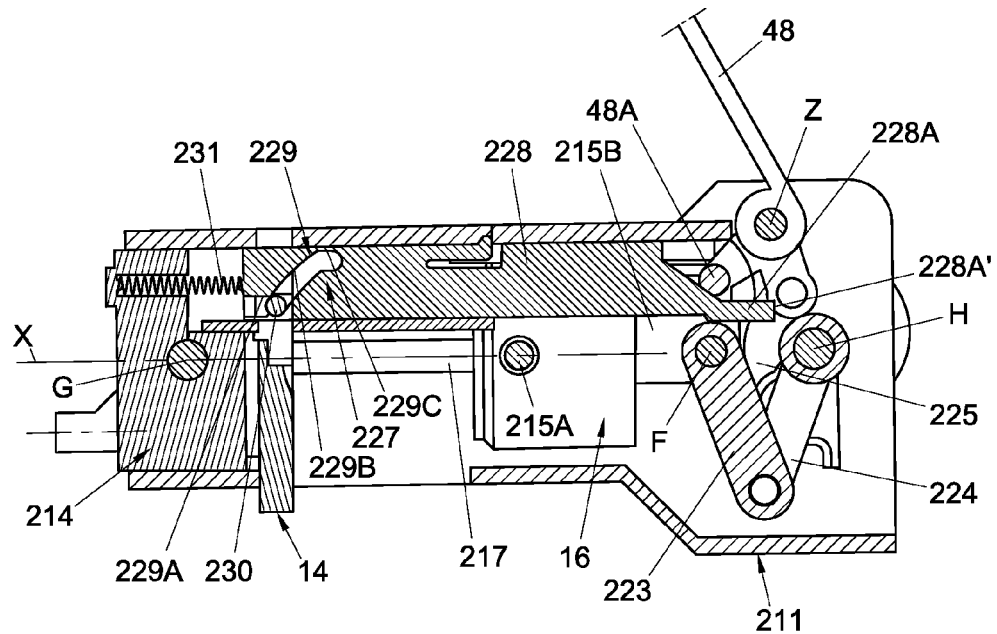
FIG. 13B represents a side section of the device of FIG. 8 in the exemplary working phase depicted in FIG. 13A and taken along the line B-B in FIG. 8, which is parallel to line A-A.

In FIGS. 13a and 13b the device with the open chamber is shown, waiting for the insertion of a capsule. The control lever 48 is raised, the slide 228 is back with the pin 230 of the positioner 14 on the first horizontal end tract 229A of the shaped eyelet 229 and with the pushing appendix 48A of the control lever on the bevelled up-per face 228A" of the small flap 228A. The positioner 228 is lowered to receive a capsule.

Figure 14A:
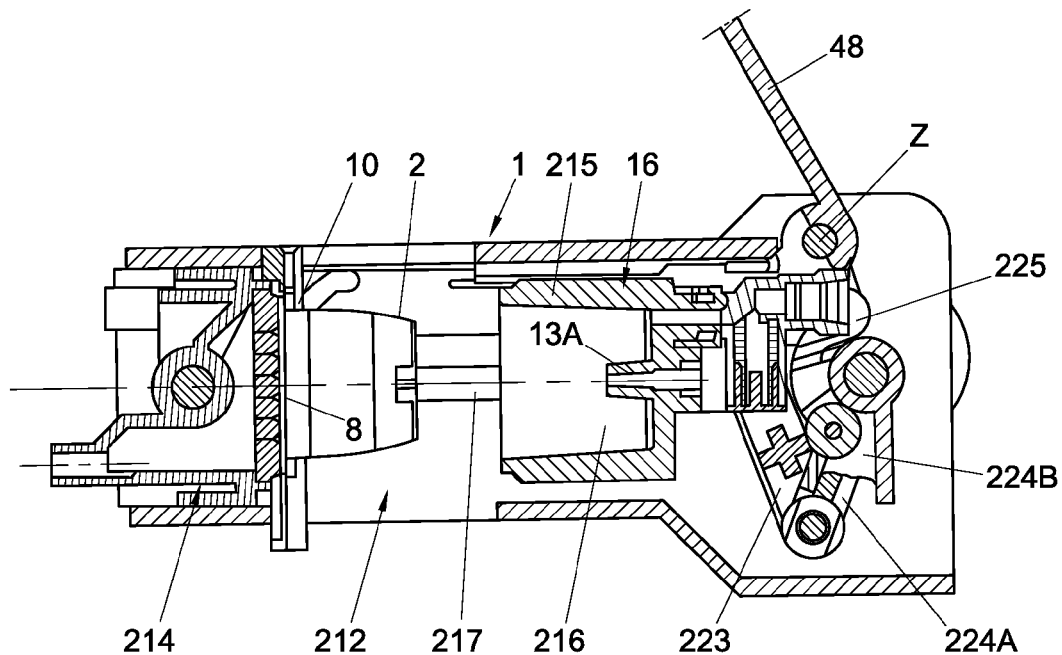
FIG. 14A represents a side section of the device of FIG. 8 in another exemplary working phase and taken along the line A-A in FIG. 8.

In FIGS. 14a and 14b the situation of FIG. 13 is substantially shown, but with a capsule 2 positioned in the guiding channels 60, resting upon the supporting convexities 30, that is in brewing position P. The control lever 48 is still wholly raised.

The control lever 48 is completely rotated towards the frame, so as shown in the FIGS. 15a and 15b. The first chamber portion 16 and the second chamber portion 214 are translated towards the positioner 14 wherein there is the capsule 2, to sealingly close the chamber, by including the capsule therein. In this example, the piercing members pierce the two opposed faces of the capsule.

It is to be noted that in this configuration the crank 224A and the piston rod 223 are almost aligned, with a misalignment of about 3° with mutual articulation point at a higher quote than the axis X. In this descending phase of the lever 48, the pushing appendix bends the small flaps 228A of the slides 228, arranged at the end face 228A' thereof. The slides 228 and consequently the positioner 14 do not move in this descending phase of the lever 48.

In this phase, with the completely lowered lever, the water brewing takes place inside the capsule through supplying ducts 16B. The liquid extracted from the content of the capsule exits from the buffer 214C through the holes 214C and subsequently through the outlet duct 214D and it is routed towards a dispensing area (not shown in the FIGS. 6-16).

Once the dispensing has ended, in order to discharge the just used capsules and to insert a new one, the control lever 48 is raised. For the first 26° of rotation of this (FIG. 16a, 16b) the raising of the positioner 14 takes place (thanks to the motion of the slides 228 imposed by the pushing appendix 48A) so that the convexities 30 pass upwards, locally deforming, the diametral ends of the flange of the capsule. Continuing the rotation of the lever 48, the positioner 14 remains raised and the chamber portions 16 and 214 move away from the positioner, freeing the capsule which, then, is no more supported by anything and it is free to fall down towards an area for collecting exhausted capsules (not shown in figures). The elastic members 231 bring back the slides 228 bringing downwards the positioner 14 (FIGS. 13a and 13b), or in the initial situation.

Evidently the references to "horizontal" and "vertical" used in the description are referred to the particular reference system of the given example, that is with the sliding axis X arranged horizontally like in the drawing tables. In the case wherein the device should be mounted with the non horizontal axis X, the references will vary consequently.

It is further to be noted that the channels 60 of the positioner 14 can be arranged even tilted with respect to the axis X (and not orthogonal, like in the example described above), remaining valid the concept that the position of the capsule does not vary during the motion of the retaining members 30 in order to free the channels on the lower side (one can contemplate, for example, tilted guiding channels and a capsule with tilted (not orthogonal) flange with respect to the axis of the capsule itself). In general, according to one aspect of the invention, the axis of the capsule never changes inclination and preferably it remains parallel to the sliding axis X.

The described structure of the device results in evident advantages in terms of structural and operative simplification. In fact, with such structure the capsule is not moved any more during the various phases of brewing and preparation to the discharge (the chamber portions and the means supporting the capsule do move), thus avoiding complex mechanisms for moving and supporting the capsule itself. Furthermore, the use of a positioner of the capsule with compact shape which moves according to a direction transversal to the axis of the frame allows reducing considerably the overall dimensions.

Evidently, independently from the just described preferred device, the advantages implicit in the invention are reached also with a method for implementing brewing from a capsule by means of a brewing device which in this example comprises, considering what has been described above, a guiding phase of the capsule 2 into a fixed brewing position P with respect to the frame 211 of the device, a phase for retaining the capsule in the brewing position P from the bottom, a phase for approaching from opposite directions of two portions of a brewing chamber 16 and 214 towards the brewing position P with capsule and the subsequent sealingly closing of the chamber.

Therefore the brewing is made to take place by having the chamber with capsule traversed by the brewing liquid and the brewed liquid is directed towards the dispensing or collecting area. Once the brewing phase has ended, the capsule is freed on the lower side, allowing it to fall down directly from the brewing position.

In the specific case, the phase for freeing the capsule to allow it to fall downwards provides a phase of moving upwards of the capsule retaining member 30 from the brewing position P; during the motion of such retaining members 30, the capsule is still in the brewing position and the retaining members 30 deform the capsule portion which is near the same members during the supporting phase. Practically, such capsule portion is an obstacle for the motion upwards of the retaining members 30.

Figure 17A:
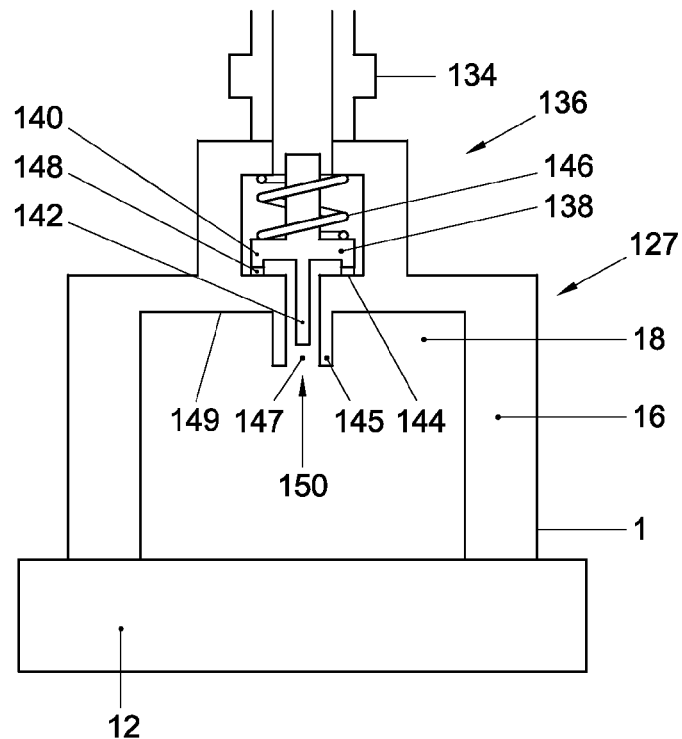
FIGS. 17A and 17B show schematic representations of a sixth example of a system according to the invention.
Figure 17B:
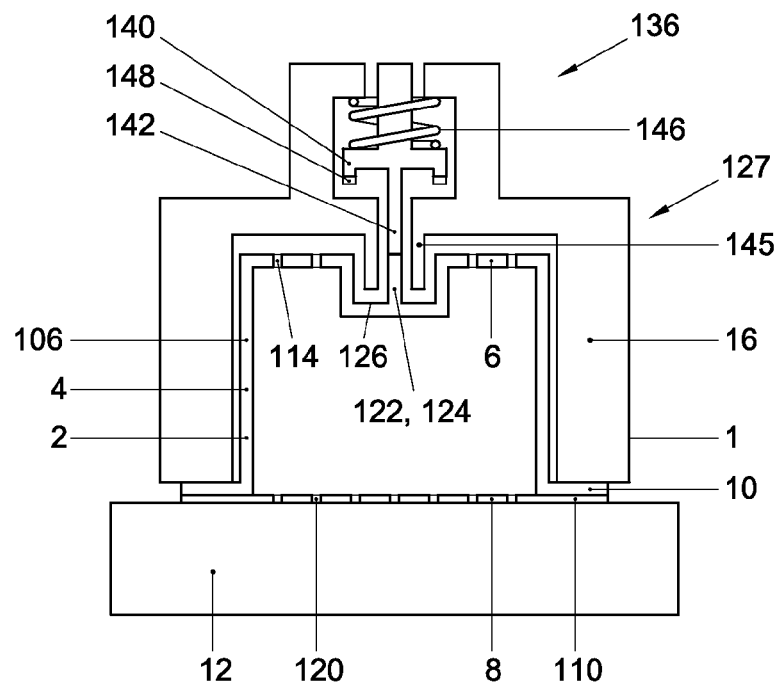

FIGS. 17A and 17B show a schematic representation of a sixth example of a system according to the invention. The system comprises a capsule 2 and a beverage preparation device 1 for preparing a beverage using the capsule 2. The capsule of FIG. 17B is shown in more detail in FIG. 18.

In this example, the capsule 2 comprises a substantially rigid cup-shaped body 106. The cup-shaped body 106 comprises a circumferential wall 4. Here the circumferential wall 4 is depicted as being substantially cylindrical, although it will be appreciated that other shapes are possible, such as frustoconical, (hemi)spherical, polygonal, etc. In this example, the capsule 2 further comprises a lid 110 In the example, the lid 110 closes an open end of the body 106.

In this example the capsule 2 further comprises an entrance face 6. Here, the entrance face 6 is part of the cup-shaped body 106. The entrance face 6 is arranged for allowing a liquid, such as hot water, to enter the capsule 2 for interacting with a beverage ingredient contained within the capsule 2. In this example the entrance face is integral with the cup-shaped body 106, closing the circumferential wall 4 at a first end. Also, in the examples the entrance face 6 is provided with perforations 114 for allowing the liquid to enter the capsule 2. It will be appreciated that the entrance face 6 may also be porous. Alternatively, the entrance face 6 may be fluid tight, e.g. in case the device is arranged for opening, such as by piercing, the entrance face 6 for allowing the liquid to enter the capsule 2.

In this example the capsule 2 further comprises an exit face 8. The exit face 8 is arranged for allowing the beverage and/or liquid to exit the capsule, e.g. after interaction with the beverage ingredient. In this example, the exit face is formed by the lid 110. In the examples the exit face 8 is a separate sheet connected to an outwardly extending flange-like rim 10 of the capsule. Here the rim 10 is integral with the circumferential wall 4. Here the exit face 8 closes the capsule at a second end. In this example the exit face 8 is a sheet comprising a plurality of exit openings 120. It will be appreciated that the exit face 8 may also be porous. Alternatively, the exit face 8 may be fluid tight, e.g. in case the device is arranged for opening, such as by piercing, the exit face 8 for allowing the beverage and/or liquid to exit the capsule.

In this example, the capsule 2 has an axis of symmetry, such that the capsule is rotation symmetric about said axis. In this example the capsule 2 is asymmetrical with respect to the plane in which the rim 10 extends.

Figure 18:
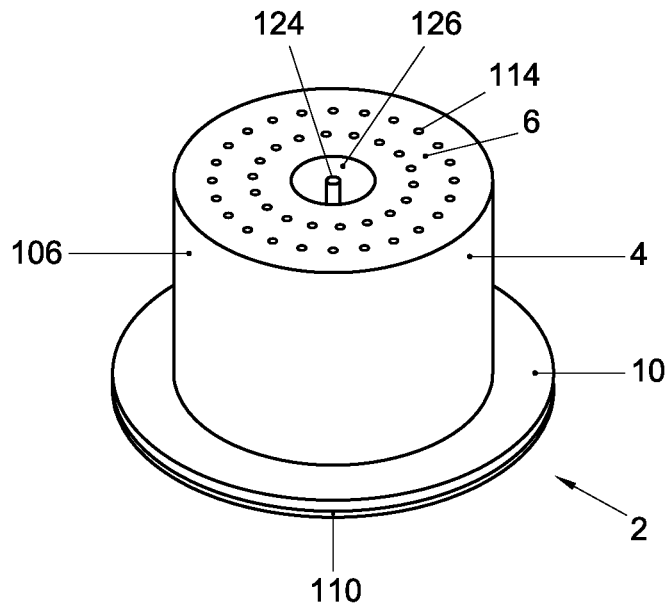
FIG. 18 shows an example of a capsule according to the invention.

As can be seen in FIG. 17B and FIG. 18, the capsule 2 further comprises an actuating member 122. In this example, the actuating member 122 is designed as a projection 124. In this example, the projection 124 is positioned in a recess 126. In FIG. 17B can be seen that the distal end of the projection 124 is substantially flush with the entrance face 6. Hence, the projection 124 substantially resides within an outer contour of the cup-shaped body 106. This provides the advantage that the projection 124 is protected against deformation or other damage during manufacture, transport or handling.

In this example, the actuating member 122 is an integral part of the cup-shaped body 106. In this example, the actuating member 122 is positioned on the axis of symmetry of the capsule. In this example the projection 24 extends along the axis of symmetry of the capsule. In this example, also the recess 126 is positioned symmetrically around the axis of symmetry.

The device 1 of the system, comprises a capsule holder 127 for holding the capsule 2. In this example, the capsule holder 127 comprises an first chamber portion or enclosing member 16 and a second chamber portion, here in the form of a support plate 12. The enclosing member and support plate 12 together enclose a brew chamber 18. When preparing a beverage, a capsule 2 will be positioned within the brew chamber 18.

In this example, the device 1 further comprises a fluid supply unit 134. The fluid supply unit 134 is arranged for supplying a fluid to the capsule 2. In this example the fluid supply unit 134 is arranged for supplying hot water under pressure to the capsule 2.

As can be seen in FIGS. 17A and 17B, the device 1 further comprises a flow control unit 136. The flow control unit 136 is arranged for controlling a flow rate and/or pressure of the fluid to be supplied to the capsule 2. In this example the flow control unit 136 comprises a valve 138. In this example, the valve 138 comprises a valve head 140 and a stem 142. As can be seen in FIG. 17A, in this example the stem 142 extends on both sides of the valve head 140. The valve 138 further comprises a seat 144 and a spring 146. The spring 146 pushes the valve head 140 against the seat 144 to a closed position. It will be appreciated that a flow rate of fluid through the valve 138 can be controlled by controlling the distance the valve head 140 is lifted off the seat 144. In this example, the valve head is provided with grooves 148. The grooves 148 traverse the surface of the valve head 140 that is in contact with the seat 144 in the closed position. As a result, the valve 138 will purposively leak when in the closed position. That is, when the valve head 140 abuts the seat 144, the grooves define a minimum flow rate or minimum pressure of the fluid that passes the valve 138. Said minimum flow rate and said minimum pressure are greater than zero.

The system as described thus far can be operated as follows.

The system can selectively be operated in a first mode and in a second mode. FIG. 17A depicts the system being used in the first mode. FIG. 17B depicts the system being used in the second mode.

In the first mode, in this example, no capsule 2 is inserted into the brew chamber 18. Then, the valve head 140 abuts against the seat 144 and fluid is supplied to the brew chamber 18 at said minimum flow rate and/or said minimum pressure. Herein the stem 142 assumes a first position. Hence, in the first mode the flow rate and/or pressure is adjusted to a first level. The flow rate and/or the pressure is sufficient for rinsing the beverage preparation device 1. It will be appreciated that the minimum flow rate and/or minimum pressure can be chosen so as to reduce the risk of hot water under pressure being dangerously ejected from the brew chamber during rinsing.

In the second mode, in this example, the capsule 2 is inserted into the brew chamber 18. Then, the actuating member 122 of the capsule 2 abuts the stem 142 of the valve 138. The length of the projection 124 and the length of the stem 142 are adapted to each other so that the valve head 140 is automatically lifted off the seat 144 by a predetermined distance when the brew chamber 18 is formed by the enclosing member 16 and the support plate 12 enclosing the capsule 2. Thus, the stem 142 assumes a second position. Hence, the valve 138 is actuated from the closed position to the open position and fluid is supplied to the brew chamber 18 wherein a flow rate and/or pressure is adjusted to a second level. The flow rate and/or the pressure in the second mode will be higher than the flow rate and/or pressure in the first mode. It will be appreciated that the flow rate and/or pressure in the second mode can be chosen according to a desired flow rate and/or pressure for preparing a beverage using the capsule 2.

Also, in the second mode, the fluid will be supplied to the capsule 2. The fluid will enter the capsule 2 through the entrance face 6. In the inner space of the capsule 2, the fluid will interact with the beverage ingredient included in the capsule 2, thus forming the beverage. The beverage exits the capsule 2 through the exit face 8. In this example, the beverage exits the brew chamber through the support plate 12. Thereto the support plate may be provided with openings (not shown) for guiding the beverage towards a container, such as a cup.

Thus, more in general, the flow control unit 136 is arranged for selectively operating in one of a first mode and a second mode. In the first mode the flow rate and/or pressure is adjusted to a first level. In the second mode the flow rate and/or pressure is adjusted to a second level, different from the first level. In general, the flow control unit 136 comprises a switching member 150, here formed by the valve 138, more in particular by the stem 142 of the valve 138, arranged for selectively being engaged by the actuating member 122 of the capsule. Said switching member 150 is coupled with the flow control unit 136, here forms an integral part of the flow control unit 136, such that the flow control unit 136 is switched in the first mode or in the second mode depending on the actuating member 122. In this example, the flow control unit 136 is in the first mode when the switching member is not engaged by the actuating member 122 (the switching member is in a first position), and is in the second mode when the switching member is engaged by the actuating member 122 of the capsule (the switching member is in a second position).

It will be appreciated that the actuating member 122 within the recess 126 can be detected by the switching member. Thus, the recess 126 forms a detection chamber 143 wherein the actuating member 122 can be detected, but is protected from damage.

In the example of FIGS. 17A and 17B, the enclosing member 16 comprises a tubular member 145. The tubular member 145 forms a protruding portion of an inner wall 149 of the enclosing member 16. The stem 142, i.e. the switching member 150, is positioned within a recess 147 of inner wall 149, formed by the tubular member 145. It will be appreciated that the stem 142, i.e. the switching member 150, within the recess 147 can be detected by the projection 124 of the capsule 2. Thus, the recess 147 also forms a detection chamber 143 wherein the actuating member can interact with the stem 142, but wherein both the actuating member 122 and the stem 142, i.e. the switching member 150, are protected from damage.

It will be appreciated that the tubular member 145 may be an elaborate embodiment of the capsule identifier 16A shown i.a. in FIG. 13a. It will also be appreciated that the embodiment including the switching member 150 and associated flow control unit 136 may be used in the embodiment shown in FIGS. 6-16. In fact, it will be clear that the embodiment shown in FIGS. 17A and 17B may be used in conjunction with any embodiment shown in FIGS. 1-16. In fact, the embodiments to be shown hereinbelow in FIGS. 18-21 may also be used in conjunction with any embodiment shown in the FIGS. 1-16.

It will be also appreciated that the actuating member 122, e.g. when designed as a recess 126 in the cup-shaped body of the capsule 2, may be used like the recess 56 as shown e.g. in FIG. 2A. This recess 56 cooperates with a projection 58 of the receptacle 32. Hence the ease of correctly inserting the capsule 2 into the receptacle 32 and into the capsule handler 14 can even be improved further. It will be appreciated that thereto alternatively, or additionally, the capsule 2 may be provided with the projection 124 cooperating with a recess of the receptacle 32.

The capsule identifier 16A or the tubular member 145, and/or the actuating member 122, e.g. the recess 56, 126, may aid in centring the capsule in the device, e.g. in the enclosing member 16. Hence, correct loading of the capsule 2 may be provided in an even more robust way.

It will be appreciated that in this example the capsule comprises the recess 126 which is arranged such that when the capsule 2 is in the first chamber portion 16, the tubular member 145 of the first chamber portion 16 projects into the recess 126, while the tubular member 145 has the recess 147 into which the projection 124 of the capsule 2, located within the recess 26, projects, the recess 47 further housing the switching member 50.

Figure 19:
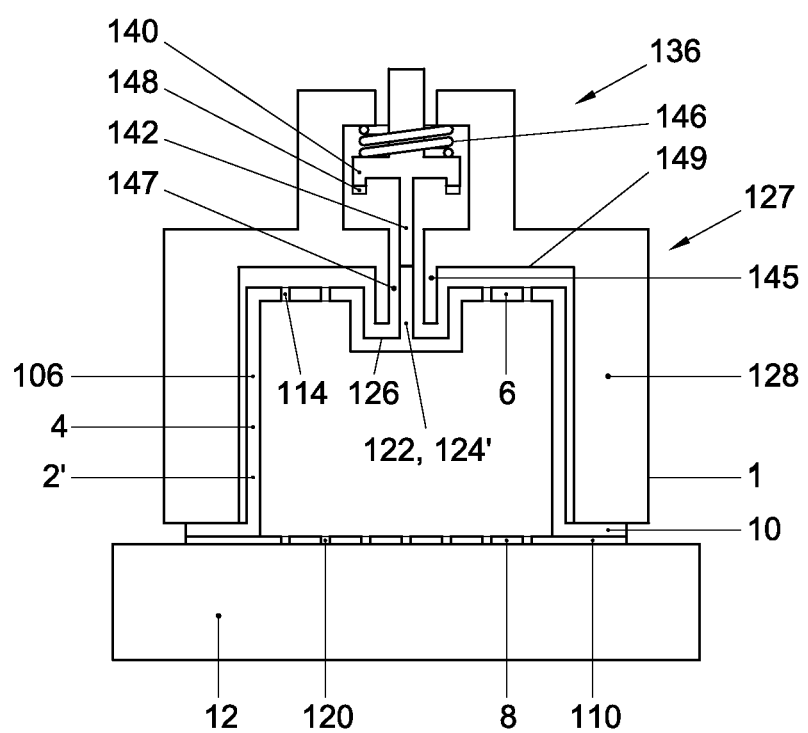
FIG. 19 shows a schematic representation of a seventh example of a system according to the invention.

FIG. 19 shows a schematic representation of a seventh example of a system 1 according to the invention. FIG. 19 is similar to FIG. 17B. The device 1 of the system of FIG. 19 may be identical to the device 1 of the system of FIG. 17B. The system of FIG. 19 comprises a second capsule 2' which differs from the capsule 2 shown in FIG. 17B (also referred to as first capsule 2). In the example of FIG. 19, the second projection 124' of the second capsule 2' is chosen to be taller than the projection 124 (also referred to as first projection 124) of the capsule 2 of FIG. 17B. It will be appreciated that in this example the second projection 124' of the second capsule 2' is identical to the first projection 124 of the first capsule 2 except for its length. The position of the second projection 124' with respect to the second capsule 2' is also identical to the position of the first projection 124 with respect to the first capsule 2.

As a result, in the example of FIG. 19, when the second capsule 2' is inserted into the brew chamber 18. Then, the second projection 124' of the second capsule 2' lifts the valve head 140 off the seat 144 by a greater distance than when the capsule 2 of FIG. 17B is inserted in the brew chamber 18. Hence, the second projection 124' causes the stem 142 to assume a third position. Hence, the valve 138 is operated in a third mode. In the third mode, the flow rate and/or pressure is adjusted to a third level. The flow rate and/or the pressure in the third mode will be higher than the flow rate and/or pressure in the second mode. It will be appreciated that in this example the length of the respective projections 124, 124' is representative of the flow rate and/or the pressure. The length of the projection may be proportional to the flow rate and/or pressure. It will be appreciated that the flow rate and/or pressure in the third mode can be chosen according to a desired flow rate and/or pressure for preparing a second beverage using the second capsule 2'. It will be appreciated that when providing the first capsule 2 having the first projection 124 and providing the second capsule 2' having the second projection 124' it is not a necessity to design the valve 138 such that it leaks in the closed position as the two actuating members 124, 124' provide operation of the device 4 in two distinct modes.

Alternatively, when a third capsule 2" not having an actuating member is introduced into the brew chamber 18, no actuating member will be present, so that the device 1 automatically provides the fluid with the flow rate and/or pressure at the first level. The first level may be set so as to allow a first beverage to be prepared. This also may provide further versatility in the preparation of beverages.

Thus, it is possible to automatically adjust the flow rate and/or pressure of the fluid to be supplied to the capsule depending on the beverage to be prepared. It is for instance possible to prepare a first beverage, such as American coffee at a relatively low pressure and an espresso coffee at a relatively high pressure. The capsule including the beverage ingredient automatically causes the beverage preparation device 1 to supply the fluid at the desired flow rate and/or pressure depending on the actuating member 122. Thus, in general, it is possible to provide two modes to be selectively actuated based on the presence or absence of the actuating member. It is also possible to provide two modes to be selectively actuated based on a dimension of the respective actuating member, such as the length of the protrusion. It is also possible to provide more than two modes to be selectively activated based on the dimension of the respective actuating member, such as the length of the protrusion. It is also possible to provide more than two modes to be selectively activated based on the dimension of the respective actuating member, such as the length of the protrusion and the presence or absence of the actuating member. It will be appreciated that in all of the above cases one of the modes may represent a rinse mode. It will be appreciated that such rinse mode may easily be provided by providing the valve that purposively leaks in the first mode.

For providing choice options to the consumer, it is possible to provide a kit comprising mutually different capsules, e.g. for preparing mutually different beverages. Such kit may include a first capsule comprising no actuating member and a second capsule comprising an actuating member as described above. Alternatively, such kit may comprise a first capsule comprising a first actuating member and a second capsule comprising a second actuating member, different from the first actuating member, as described above. Herein, the first capsule may comprise a first beverage ingredient and the second capsule may comprise a second beverage ingredient. The first beverage ingredient may be different from the second beverage ingredient. The first beverage ingredient may e.g. differ from the second beverage ingredient in one or more of type, origin, volume, mass, density, composition, grind size, or the like.

It will be appreciated that the first capsule and second capsule of such kit may differ in the presence or absence of the actuating member, or a shape and/or dimension of the respective actuating members. It will be appreciated that it is possible that apart from this a geometry of the first capsule and second capsule of such kit are identical. The first capsule and second capsule of such kit may also differ in the beverage ingredient contained therein.

In the examples of FIGS. 17A, 17B and 19, the valve 138 is mechanically actuated by the actuating member 122 of the capsule. This provides for a mechanically simple and reliable system.

Figure 20A:
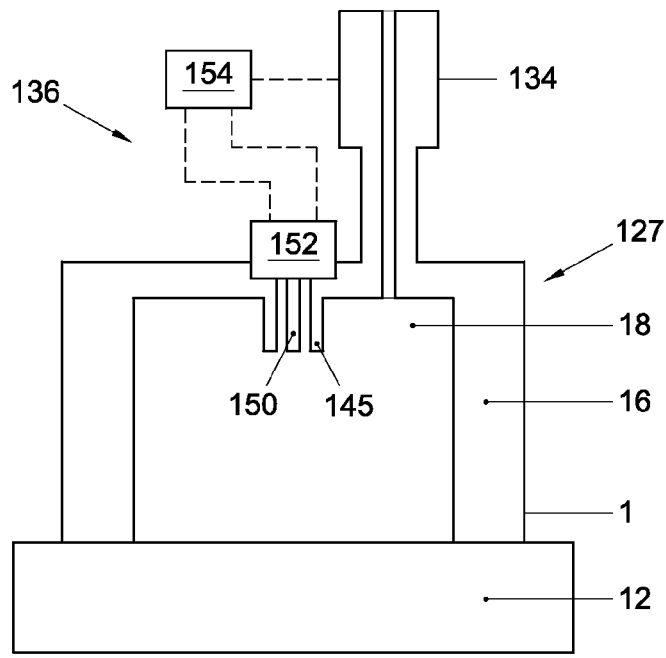
FIGS. 20A and 20B show a schematic representation of a eighth example of a system according to the invention.
Figure 20B:
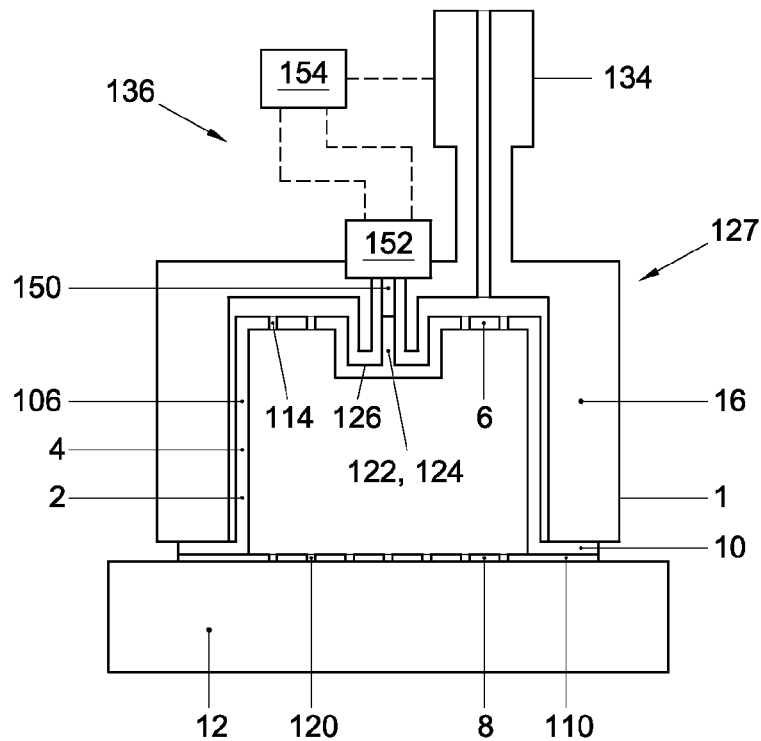

FIGS. 20A and 20B show a schematic representation of an eighth example of a system according to the invention. In this example, the switching member 150 is formed by the lever of a switch 152. The switch 152 is connected to a controller 154. In this example, the controller 154 is arranged for controlling the fluid supply unit 134. The controller 154 and fluid supply unit 134 are arranged such that the controller 154 can adjust the flow rate and/or pressure of the fluid supplied by the fluid supply unit 134. Thereto, the controller 154 may e.g. control a pump of the fluid supply unit. In this example the flow control unit 136, includes the controller 154 and the switch 152.

The system as shown in FIGS. 20A and 20B can be operated as follows. The system can selectively be operated in a first mode and in a second mode. FIG. 20A depicts the system being used in the first mode. FIG. 20B depicts the system being used in the second mode.

In the first mode, in this example, no capsule 2 is inserted into the brew chamber 18. Then, the switch 152 is not actuated so that the switching member 150 is in the first position as depicted in FIG. 20A. The controller 154 detects the switch 152 not being actuated and instructs the fluid supply unit 134 to supply the fluid to the capsule, such that the flow rate and/or pressure is adjusted to a first level. The flow rate and/or the pressure at the first level is in this example chosen to be sufficient for rinsing the beverage preparation device 1.

In the second mode, in this example, the capsule 2 is inserted into the brew chamber 18. Then, the actuating member 122 of the capsule 2 actuates the switch 152. The length of the projection 124 and a dimension and/or location of a switch lever 150 can be adapted to each other so that the switch detects the presence of the actuating member 122. The switching member 150 is in a second position as depicted in FIG. 20B. The controller 154 detects the switch 152 being actuated and instructs the fluid supply unit 134 to supply the fluid to the capsule, such that the flow rate and/or pressure is adjusted to a second level. The flow rate and/or the pressure at the second level in this example is higher than the flow rate and/or pressure at the first level. It will be appreciated that the flow rate and/or pressure in the second mode can be chosen according to a desired flow rate and/or pressure for preparing a beverage using the capsule 2.

Also, in the second mode, the fluid will be supplied to the capsule 2. The fluid will enter the capsule 2 through the entrance face 6. In the inner space of the capsule 2, the fluid will interact with the beverage ingredient included in the capsule 2, thus forming the beverage. The beverage exits the capsule 2 through the exit face 8. In this example, the beverage exits the brew chamber through the support plate 12. Thereto the support plate may be provided with openings (not shown) for guiding the beverage towards a container, such as a cup.

It will be appreciated that the switch 152 may also be arranged to detect a difference between the switching member 150 being depressed over a first distance and over a different second distance. In such case, the system as described with respect to FIGS. 20A and 20B may also be arranged, mutatis mutandis, to be operated in the third mode as described with respect to FIG. 19.

Thus, the system as shown in FIGS. 20A and 20B may be operated in one of at least the first mode and the second mode. The device may be arranged to, in the first mode, supply the fluid to the first capsule with the flow rate and/or pressure adjusted to the first level, and, in the second mode, supply the fluid to the second capsule with the flow rate and/or pressure adjusted to the second level, different from the first level. It will be appreciated that it is also possible that the controller 154 instructs the fluid supply unit 134 to adjust other parameters, such as volume of the fluid to be supplied to the capsule, time duration supplying the fluid to the capsule, volume and/or pressure of fluid to be supplied to the capsule as a function of time (volume flow and/or pressure profile), and/or temperature of the fluid, e.g. depending on detection of the first or second actuating member.

It is also possible that the switch 152 is designed as a displacement sensor. Hence, a dimension of the actuating member may be determined by the displacement sensor. Thus, a stepless control of the flow rate and/or pressure may be obtained.

Figure 21A:
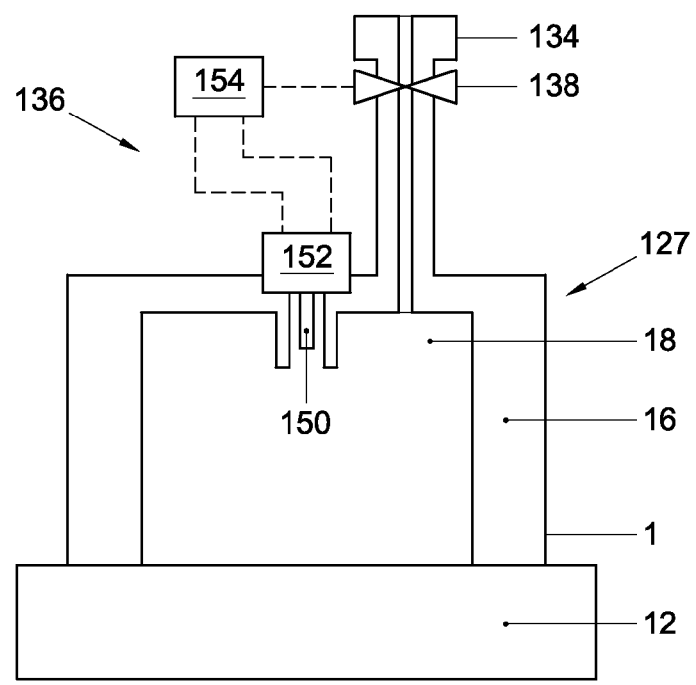
FIGS. 21A and 21B show a schematic representation of a ninth example of a system according to the invention.
Figure 21B:
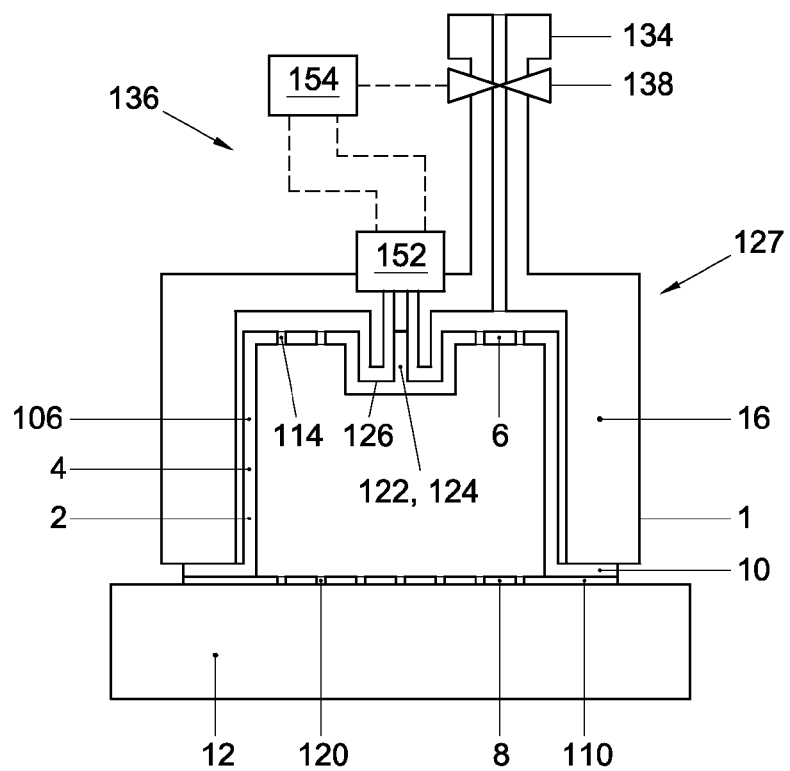

FIGS. 21A and 21B show a schematic representation of a ninth example of a system according to the invention. In this example, the switching member 150 is part of a switch 152, similar to the switch shown in FIGS. 20A and 20B. In this example, the controller 154 is arranged for controlling a valve 138 in a fluid flow path from the fluid supply unit 134 to the brew chamber 18. In this example the flow control unit 136, includes the controller 154, the valve 138 and the switch 152.

The system as shown in FIGS. 21A and 21B can be operated as follows. The system can selectively be operated in a first mode and in a second mode. FIG. 21A depicts the system being used in the first mode. FIG. 21B depicts the system being used in the second mode.

In the first mode, in this example, no capsule 2 is inserted into the brew chamber 18. Then, the switch 152 is not actuated so that the switching member is in the first position as depicted in FIG. 20A. The controller 154 detects the switching member 150 being in the first position and adjusts the valve 138, such that the flow rate and/or pressure is adjusted to a first level. The flow rate and/or the pressure at the first level is in this example chosen to be sufficient for rinsing the beverage preparation device 1.

In the second mode, in this example, the capsule 2 is inserted into the brew chamber 18. Then, the actuating member 122 of the capsule 2 actuates the switch 152 so that the switching member 150 is in the second position as depicted in FIG. 21B. The length of the projection 124 and a dimension and/or location of a switching member 150 can be adapted to each other so that the switch detects the presence of the actuating member 122. The controller 154 detects the switching member 150 being in the second position and adjusts the valve 138, such that the flow rate and/or pressure is adjusted to a second level. The flow rate and/or the pressure at the second level in this example is higher than the flow rate and/or pressure at the first level. It will be appreciated that the flow rate and/or pressure in the second mode can be chosen according to a desired flow rate and/or pressure for preparing a beverage using the capsule 2.

Also, in the second mode, the fluid will be supplied to the capsule 2. The fluid will enter the capsule 2 through the entrance face 6. In the inner space of the capsule 2, the fluid will interact with the beverage ingredient included in the capsule 2, thus forming the beverage. The beverage exits the capsule 2 through the exit face 8. In this example, the beverage exits the brew chamber through the support plate 12. Thereto the support plate may be provided with openings (not shown) for guiding the beverage towards a container, such as a cup.

It will be appreciated that the switch 152 may also be arranged to detect a difference between the switching member 150 being depressed over a first distance and over a different second distance. In such case, the system as described with respect to FIGS. 21A and 21B may also be arranged, mutatis mutandis, to be operated in the third mode as described with respect to FIG. 19.

Thus, the system as shown in FIGS. 21A and 21B may be operated in one of at least the first mode and the second mode. The device may be arranged to, in the first mode, supply the fluid to the first capsule with the flow rate and/or pressure adjusted to the first level, and, in the second mode, supply the fluid to the second capsule with the flow rate and/or pressure adjusted to the second level, different from the first level. It will be appreciated that it is also possible that the controller 154 instructs the fluid supply unit 134 to adjust other parameters, such as volume of the fluid to be supplied to the capsule and/or temperature of the fluid, depending on detection of the first or second actuating member.

It is also possible that the switch 152 is designed as a displacement sensor. Hence, a dimension of the actuating member may be determined by the displacement sensor. Thus, a stepless control of the valve 138, and hence of the flow rate and/or pressure may be obtained.

In the example of FIGS. 21A and 21B the valve 138 is adjusted by electronic control. Alternatively, or additionally, the valve may be actuated by an electric, magnetic, pneumatic and/or hydraulic actuator.

In the examples of FIGS. 20A, 20B, 21A and 21B, the switch 152 comprises an electrical switch. The switch may also comprise a pneumatic or hydraulic switch actuation of which causes the valve to be actuated electrically, magnetically, pneumatically and/or hydraulically and/or causing the controller to instruct the fluid supply unit accordingly.

It is possible that the switch 152 is arranged for optically determining a position of the switching member 150. A possible embodiment is shown in FIGS. 22A-22D. In the example of FIGS. 22A-22D the switching member 150 comprises a vane 156. The switch 152 comprises a first light barrier unit 158A and a second light barrier unit 158B. The first light barrier unit 158A comprises a first light source 160A and a first light detector 162A (see FIG. 22D). The first light detector 162A is positioned to receive light emitted by the first light source 160A along a first optical path 164A. The second light barrier unit 158B comprises a second light source 160B and a second light detector 162B arranged similarly.

In this example, when the switching member is not actuated (see FIG. 22A), the vane 156 is positioned in a first position such that it obstructs the first optical path 164A and the second optical path 164B. Hence, the light detectors 162A and 162B detect no light emitted by the sources 160A and 160B, respectively.

When the switching member is actuated, the vane 156 is moved in an axial direction of the switching member 150. When the switching member is depressed over a first distance, the vane 156 may be moved into a second position such that the first optical path 164A is no longer blocked by the vane while the second optical path 164B is still obstructed by the vane 56 (see FIG. 22B). Hence, the first light detectors 162A detects light emitted by the first light sources 160A, while the second light source 162B does not detect light emitted by the second light source 160B. In this example, when the switching member is depressed over a second distance, greater than the first distance, the vane 156 may be moved into a third position such that both the first optical path 164A and the second optical path 164B are no longer blocked by the vane (see FIG. 22C). Hence, both the light detectors 162A, 162B detect light emitted by the light sources 160A, 160B.

It will be appreciated that the switch 152 may provide information representative of the detected position of the switching member 150 to the controller 154. The controller may process this information and perform the tasks as described above.

It will be appreciated that it is also possible that the switch comprises a single light barrier unit, for detecting whether the vane is in a first position or in a second position. It is also possible that the switch comprises more than two light barrier units, e.g. for detecting more than three different positions of the vane 156. It is also possible that the switch comprises a plurality of light barrier units for determining whether the vane is in the first or in the second position. This may e.g. provide redundancy in the switch.

Figure 22A:
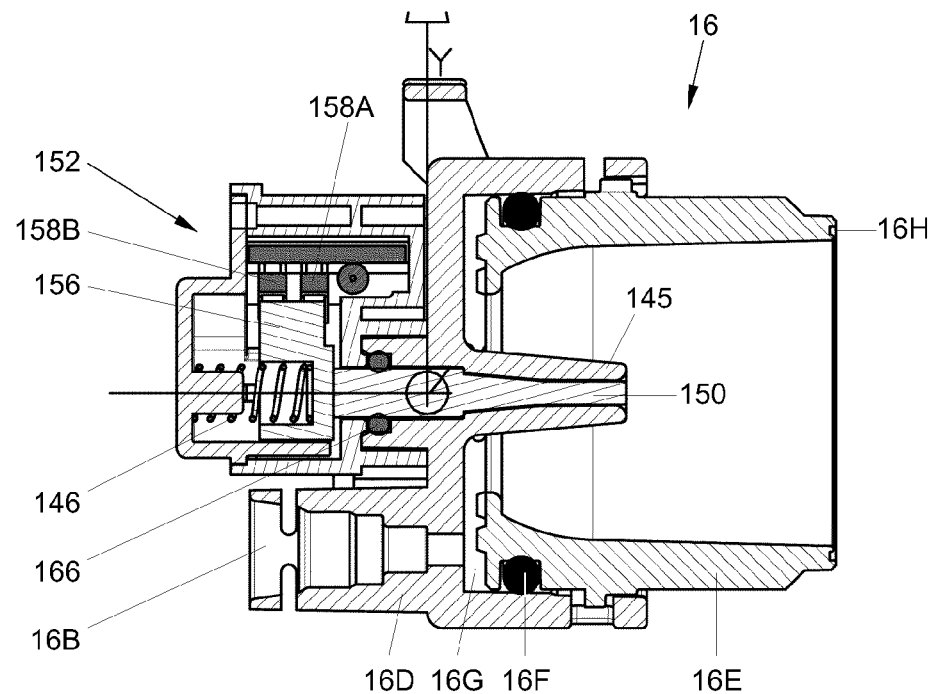
FIGS. 22A-22D show a schematic representation of a tenth example of a system according to the invention.
Figure 22B:
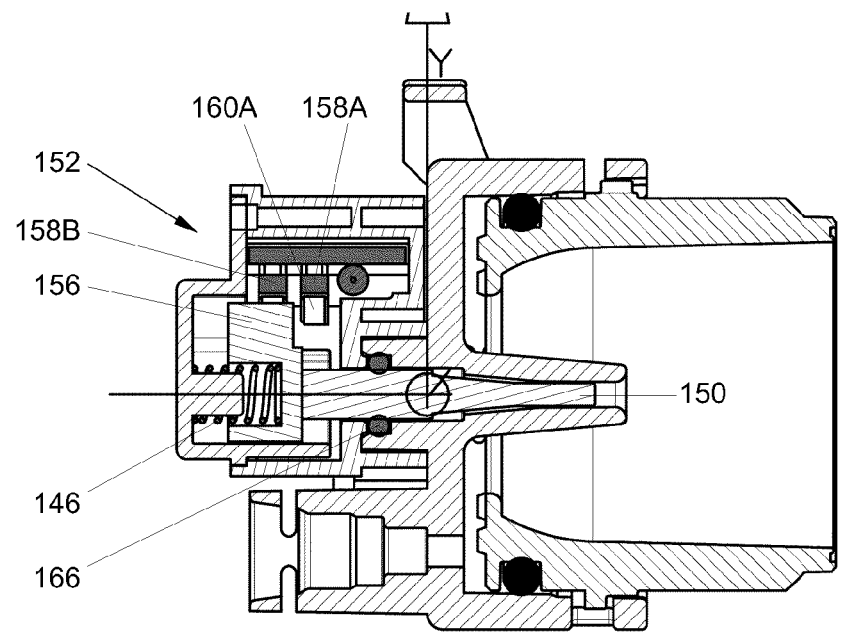
Figure 22C:
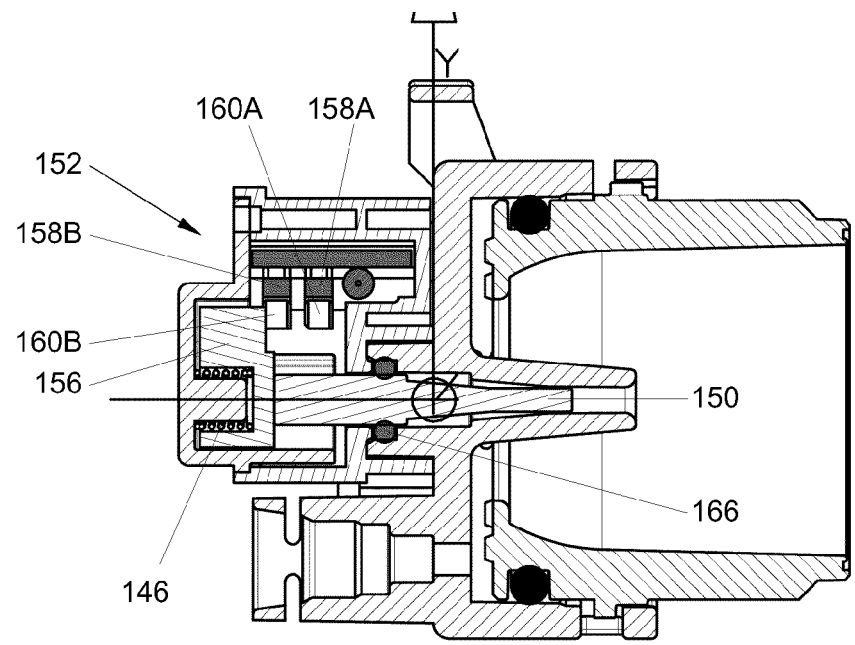
Figure 22D:
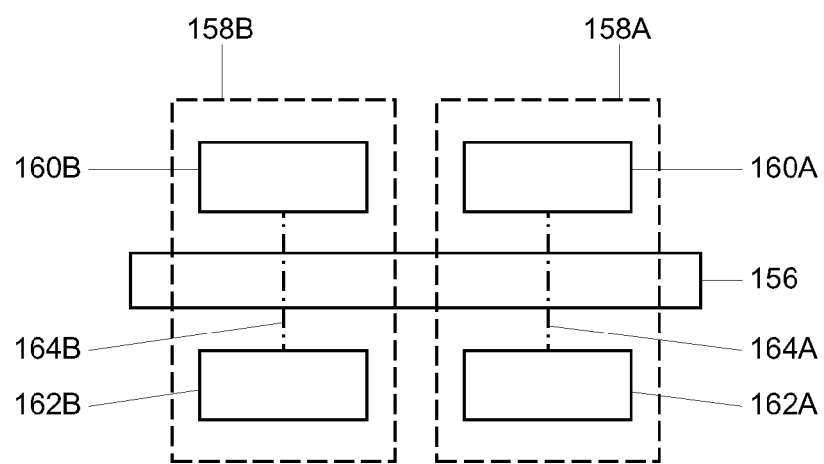

In the example of FIGS. 22A-22C the switch 152 comprises a seal 166 preventing fluid leakage in between the switching member 152 and the enclosing member 128. In the example of FIGS. 22A-22C the spring 146 is arranged for returning the switching member 150 to the first position when not actuated.

In the example of FIGS. 22A-22D, the vane 156 is part of the switching member 150. It will be appreciated that it is also possible that the vane is part of the actuating member of the capsule. Then, the vane of the capsule can selectively obstruct or free the optical path of the (at least one) light barrier unit.

Figure 23A:
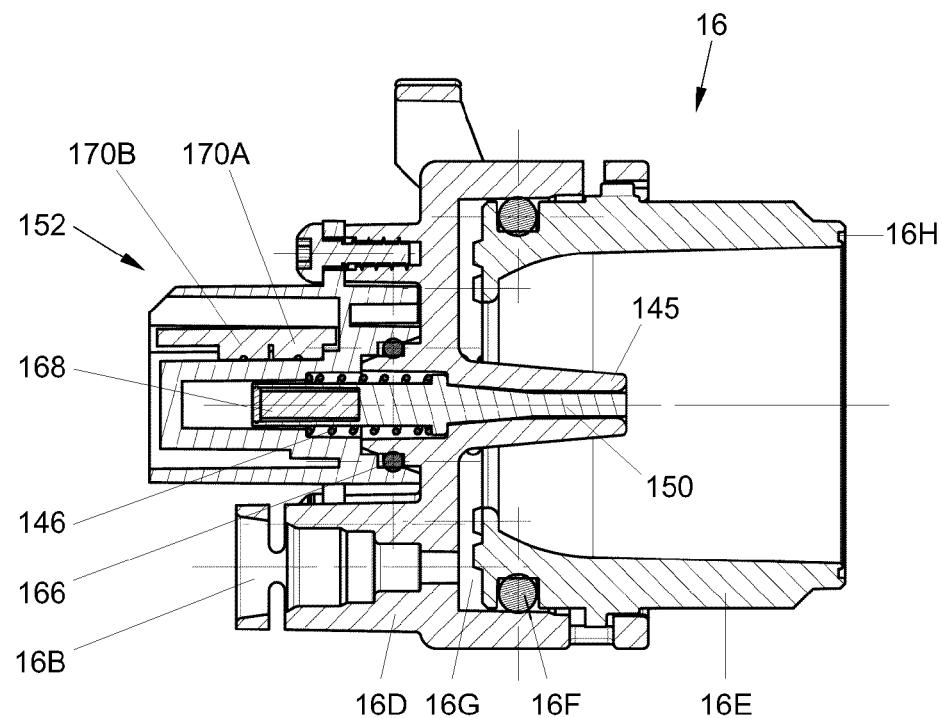
FIGS. 23A-23C show a schematic representation of an eleventh example of a system according to the invention.
Figure 23B:
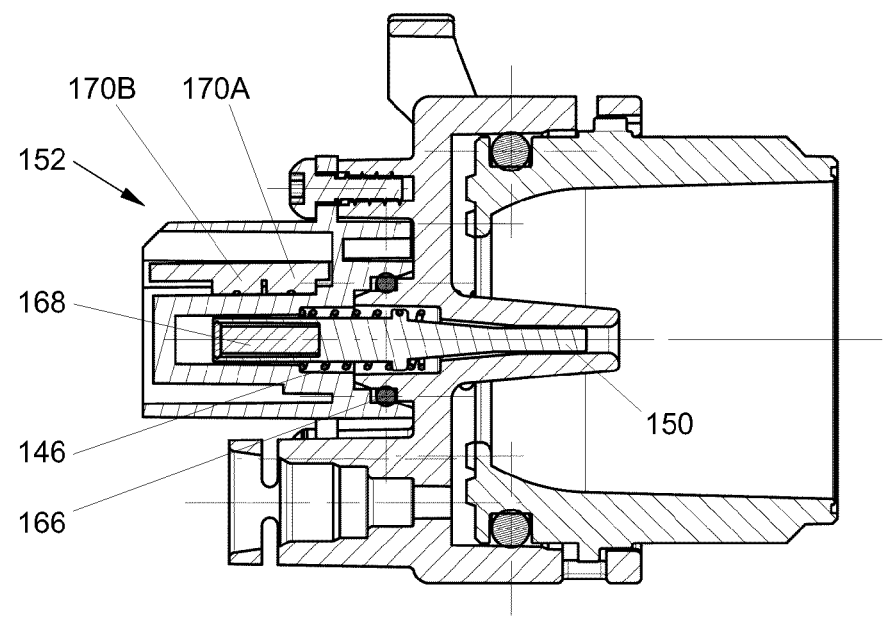
Figure 23C:
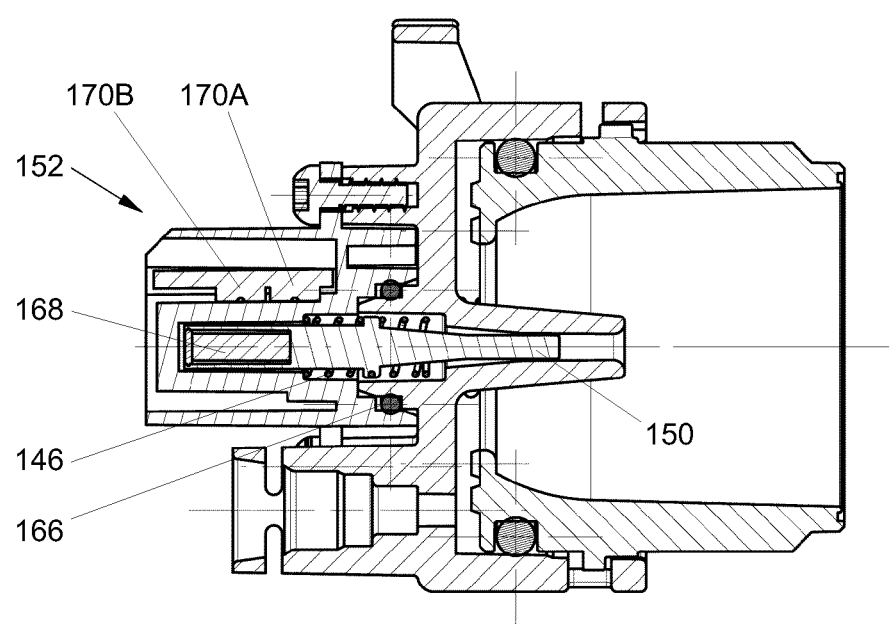

It is also possible that the switch 152 is arranged for magnetically determining a position of the switching member 150. A possible embodiment is shown in FIGS. 23A-23C. In the example of FIG. 23A-23C the switching member 150 comprises a magnetic indicator 168. In this example the magnetic indicator 168 is a permanent magnet. The switch 152 comprises a first magnetic induction sensor 170A and a second magnetic induction sensor 170B. The first magnetic induction sensor 170A in this example comprises a first Hall sensor. The second magnetic induction sensor 170B in this example comprises a second Hall sensor.

In this example, when the switching member is not actuated (see FIG. 23A), the magnet 168 is positioned in a first position such that it is sufficiently near to the first magnetic induction sensor 170A, so that the first magnetic induction sensor 170A detects the presence of the magnet 168. In the first position, the magnet 168 is sufficiently remote from the second magnetic induction sensor 170B, so that the second magnetic induction sensor 170B does not detect the presence of the magnet 168.

When the switching member is actuated, the magnet 168 is moved in an axial direction of the switching member 150. When the switching member is depressed over a first distance, the magnet 168 may be moved into a second position (see FIG. 23B) such that it is sufficiently near to both the first and second magnetic induction sensors 170A, 170B, so that both the first and second magnetic induction sensors 170A, 170B detect the presence of the magnet 168. In this example, when the switching member is depressed over a second distance, greater than the first distance, the magnet 168 may be moved into a third position (see FIG. 23C) such that it is sufficiently remote from the first magnetic induction sensor 170A, so that the first magnetic induction sensor 170A does not detect the presence of the magnet 168, and that the magnet 168 is sufficiently near to the second magnetic induction sensor 170B, so that the second magnetic induction sensor 170B detects the presence of the magnet 168.

It will be appreciated that the switch 152 may provide information representative of the detected position of the switching member 150 to the controller 154. The controller may process this information and perform the tasks as described above.

It will be appreciated that it is also possible that the switch comprises a single magnetic induction sensor, for detecting whether the magnet is in a first position or in a second position. It is also possible that the switch comprises more than two magnetic induction sensors, e.g. for detecting more than three different positions of the magnet 168. It is also possible that the switch comprises a plurality of magnetic induction sensors for determining whether the magnet is in the first or in the second position. This may e.g. provide redundancy in the switch.

In the example of FIGS. 23A-23C the switch 152 comprises a seal 166 preventing fluid leakage in between the switching member 152 and the enclosing member 128. In the example of FIGS. 23A-23C the spring 146 is arranged for returning the switching member 150 to the first position when not actuated.

In the example of FIGS. 23A-23C the magnetic indicator 168 is a permanent magnet. It is also possible that the magnetic indicator is a magnetisable indicator, such as a ferromagnetic material. In such case the magnetic induction detectors 170A, 170B may be provided with magnetising means, such as a permanent magnet or an electromagnet, for magnetising the magnetisable indicator.

In the example of FIGS. 23A-23C, the magnetic indicator 168 is part of the switching member 150. It will be appreciated that it is also possible that the magnetic indicator is part of the actuating member of the capsule. Then, the magnetic indicator of the capsule can selectively be detected by the (at least one) magnetic induction sensor.

In the examples FIGS. 22A-22C and 23A-23C, the enclosing member 16 includes a rear portion 16D and a front portion 16E. The front portion 16E is mobile with respect to the rear portion 16D along an axial direction of the enclosing member 16. The rear portion 16D and front portion 16E are connected via a sealing member 16F. The sealing member sealingly connects the rear portion 16D and the front portion 16E. further, between the rear portion 16D and the front portion 16E a gap 16G is provided. Once liquid is injected into the enclosing member 16 via the supply duct 16B, the liquid fills the gap 16G. Pressure built up in the gap 16G will force the rear portion 16D and the front portion 16E apart. As a result, the front portion 16E, e.g. a leading edge 16H of the front portion 16E, will be pressed against the capsule 2 when present. Preferably, the leading edge 16H is pressed against the flange-like rim 10 of the capsule 2. This may improve sealing of the enclosing member 16 against the capsule 2.

In the foregoing specification, the invention has been described with reference to specific examples of embodiments of the invention. It will, however, be evident that various modifications and changes may be made therein without departing from the broader spirit and scope of the invention as set forth in the appended claims.

In the examples, the circumferential wall of the capsule is depicted as being substantially cylindrical, although it will be appreciated that other shapes are possible, such as frustoconical, (hemi)spherical, polygonal, etc.

In the examples, the device is designed such that the capsule is positioned with its axis of symmetry substantially horizontal during brewing of the capsule. It will be appreciated that during brewing the axis of symmetry may also be sloping downwardly or upwardly.

In the examples, the capsule handler pivots about an axis or is translated substantially linearly. It will be appreciated that the capsule handler may also describe other paths of movement from the loading position to the ready position and from the ready position to the ejection position as the case may be. The capsule handler may e.g. be guided in grooves, guided by rods, cams or the like.

In the examples of FIGS. 1A-1G and 2A-2H the capsule is inserted with the capsule handler in the loading position and is transported by the capsule handler to the brewing position wherein the capsule is substantially immobile with respect to the capsule handler. In the example of FIGS. 3A-3F, 4A-4F and 6-16 the capsule is inserted with the capsule handler in the ready position and is slidingly transported through the capsule handler to the capsule handler. It will be appreciated that it is also possible that in a further embodiment similar to the embodiment shown in FIGS. 3A-3F, 4A-4F or 6-16 when the device is ready for accepting a capsule, the capsule handler is in a loading position different from the ready position. Thereto, the capsule handler may e.g. be positioned in an elevated position as shown in FIG. 3D. Then the capsule may be inserted into the capsule handler and may be transported by the capsule handler downwardly to the brewing position wherein the capsule is substantially immobile with respect to the capsule handler. It will be appreciated that it is also possible that in an embodiment resembling the embodiment the embodiment of FIGS. 1A-1G or FIGS. 2A-2H the capsule handler is modified such that the curved capsule handler comprises curved guides, such as curved grooves, enabling the capsule to slide from the insertion point to the brewing position upon insertion into the capsule handler.

In the examples, the flow control unit is operated to function in one of a plurality of discrete modes. It will be appreciated that the control unit may also be operated in any mode in between these discrete modes. Thus, stepless control of the flow rate and/or pressure between a minimum and maximum level is provided. It is possible that the flow rate is proportional to a length of the projection of the capsule. It is also possible that the pressure is proportional to the length of the projection of the capsule.

In the examples, the switching member 150 is positioned in the recess 147 of the inner wall of the capsule holder, and the actuating member 122 is positioned in the recess 126 of an outer contour of the capsule. It will be appreciated that the advantages of the invention may also, at least partially, be obtained when only the switching member is positioned in the recess of the inner wall of the capsule holder, or when only the actuating member is positioned in the recess of the outer contour of the capsule. Alternatively, neither the switching member nor the actuating member may be recessed.

In the examples, the inner wall of capsule holder comprises the protruding portion, and the switching member is recessed with respect to said protruding portion. It will be appreciated that it is also possible that an outer wall of the capsule, e.g. the cup-shaped body, comprises a protruding portion, and the actuating member is recessed with respect to said protruding portion.

In the example of FIG. 19 the actuating member projects beyond the outer contour of the capsule. It will be appreciated that it is also possible to provide mutually different actuating members, e.g. having mutually different lengths, for providing two or more operating modes, wherein all actuating members remain within the outer contour of the respective capsule.

In the examples, the entrance face and exit face of the capsules were described as perforate. It will be appreciated that it is also possible that the entrance face and/or the exit face is porous. It is also possible that the entrance face and/or exit face is fluid tight, e.g. in case the device is arranged for opening, such as by piercing, the entrance face and/or exit face, respectively.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A system for the preparation of a beverage using a capsule, the system comprising a beverage preparation device and a capsule, wherein the device comprises:
a first chamber portion defining a receptacle; and
a second chamber portion;
wherein the first chamber portion is movable relative to the second chamber portion between an open position and a closed position, wherein in the open position the capsule can be inserted between the first chamber portion and the second chamber portion, and wherein in the closed position the capsule is in a brewing position and received in the receptacle;
a capsule handler arranged to enable insertion therein of the capsule and to position said capsule in the brewing position, the capsule handler comprising guide means for guiding the capsule to the brewing position, the guide means including a first groove and a second groove together defining a guiding direction and arranged for engaging a guiding edge of the capsule;
wherein the capsule handler is movable between a ready position and an ejection position;
wherein the capsule handler holds the capsule in the brewing position when the capsule handler is in the ready position, wherein when the capsule is in the brewing position, the capsule handler is movable between the ready position and the ejection position in a direction substantially parallel to the guiding direction of the grooves, and wherein when the first chamber portion is moved relative to the second chamber from the closed position to the open position, the capsule can fall freely from the brewing position under the influence of gravity when the capsule handler is in the ejection position.

2. The system according to claim 1, wherein the capsule handler comprises retaining means for retaining the capsule in the capsule handler when the capsule handler is in the ready position.

3. The system according to claim 2, wherein the retaining means comprises a first protrusion located in the first groove and a second protrusion located in the second groove, the first protrusion and second protrusion are configured to prevent the capsule from sliding out of the first and second grooves.

4. The system according to claim 3, wherein the capsule comprises a rim, wherein the capsule is held in the capsule handler at its rim by the first groove, the first protrusion, the second groove, and the second protrusion.

5. The system according to claim 4, wherein the first protrusion is located symmetrically opposite to the second protrusion.

6. The system according to claim 1, wherein the guide means are arranged for engaging the capsule both when the capsule handler is in the ready position and in the ejection position.

7. The system according to claim 1, wherein the capsule handler is movable with respect to the first chamber portion and the second chamber portion.

8. The system according to claim 1, wherein the capsule handler is immobile in a direction of movement of the first chamber portion.

9. A beverage preparation device for the preparation of a beverage using a capsule, the beverage preparation device comprising:
a first chamber portion defining a receptacle; and
a second chamber portion,
wherein the first chamber portion is movable relative to the second chamber portion between an open position and a closed position, wherein in the open position the capsule can be inserted between the first chamber portion and the second chamber portion, and wherein in the closed position of the first chamber portion and the second chamber portion the capsule is in a brewing position and received in the receptacle;

a capsule handler arranged to enable insertion therein of the capsule and to position said capsule in the brewing position, the capsule handler comprising guide means for guiding the capsule to the brewing position, the guide means including a first groove and a second groove defining a guiding direction and arranged for engaging a guiding edge of the capsule;

wherein the capsule handler is movable between a ready position and an ejection position;

wherein the capsule handler is in the ready position, wherein when the capsule is in the brewing position the capsule handler is movable between the ready position and the ejection position in a direction substantially parallel to the guiding direction of the grooves, and wherein when the first chamber portion is moved relative to the second chamber from the closed position to the open position, the capsule can fall freely from the brewing position under the influence of gravity when the capsule handler is in the ejection position.

10. The system according to claim 1, wherein the capsule handler is immobile in a direction of movement of the second chamber portion.

* * * * *